United States Patent
Ladde et al.

(10) Patent No.: US 10,719,578 B1
(45) Date of Patent: Jul. 21, 2020

(54) LOCAL LAGGED ADAPTED GENERALIZED METHOD OF MOMENTS DYNAMIC PROCESS

(71) Applicants: Gangaram S. Ladde, Temple Terrace, FL (US); Olusegun Michael Otunuga, Huntington, WV (US); Nathan G. Ladde, Atlanta, GA (US)

(72) Inventors: Gangaram S. Ladde, Temple Terrace, FL (US); Olusegun Michael Otunuga, Huntington, WV (US); Nathan G. Ladde, Atlanta, GA (US)

(73) Assignee: University of South Florida, Tampa, FL (US)

( * ) Notice: Subject to any disclaimer, the term of this patent is extended or adjusted under 35 U.S.C. 154(b) by 978 days.

(21) Appl. No.: 14/923,964

(22) Filed: Oct. 27, 2015

Related U.S. Application Data

(60) Provisional application No. 62/068,848, filed on Oct. 27, 2014, provisional application No. 62/246,189, filed on Oct. 26, 2015.

(51) Int. Cl.
*G06F 17/50* (2006.01)
*G06F 17/18* (2006.01)
*G06Q 10/04* (2012.01)

(52) U.S. Cl.
CPC .......... *G06F 17/5009* (2013.01); *G06F 17/18* (2013.01); *G06F 2217/10* (2013.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 5,627,760 A | * | 5/1997 | Slutsker | G01R 21/133 307/59 |
| 5,708,590 A | * | 1/1998 | Slutsker | G01R 21/133 307/59 |

(Continued)

OTHER PUBLICATIONS

Superlinear convergence via mixed generalized quasilinearization method and generalized monotone method Vinchencia Anderson et al. (pp. 132), 2014 (Year: 2014).*

(Continued)

*Primary Examiner* — Kibrom K Gebresilassie
(74) *Attorney, Agent, or Firm* — Thomas | Horstemeyer, LLP

(57) ABSTRACT

Aspects of a local lagged adapted generalized method of moments (LLGMM) dynamic process are described herein. In one embodiment, the LLGMM process includes obtaining a discrete time data set as past state information of a continuous time dynamic process over a time interval, developing a stochastic model of the continuous time dynamic process, generating a discrete time interconnected dynamic model of local sample mean and variance statistic processes (DTIDMLSMVSP) based on the stochastic model, and calculating a plurality of admissible parameter estimates for the stochastic model using the DTIDMLSM-VSP. Further, in some embodiments, the process further includes, for at least one of the plurality of admissible parameter estimates, calculating a state value of the stochastic model to gather a plurality of state values, and determining an optimal admissible parameter estimate among the plurality of admissible parameter estimates that results in a minimum error among the plurality of state values.

14 Claims, 12 Drawing Sheets

(56) References Cited

U.S. PATENT DOCUMENTS

| | | | |
|---|---|---|---|
| 2009/0209878 A1* | 8/2009 | Sanger | A61B 5/0488 600/546 |
| 2009/0210081 A1* | 8/2009 | Sustaeta | G05B 13/0285 700/99 |
| 2012/0045013 A1* | 2/2012 | Chen | G05B 5/01 375/295 |
| 2013/0124164 A1* | 5/2013 | Jha | G06F 17/50 703/2 |
| 2015/0316907 A1* | 11/2015 | Elbsat | G06Q 10/04 700/275 |
| 2016/0354543 A1* | 12/2016 | Cinar | A61M 5/1723 |
| 2018/0218098 A1* | 8/2018 | Hinkley | G01V 11/00 |
| 2018/0313557 A1* | 11/2018 | Turney | G05D 23/1904 |

OTHER PUBLICATIONS

Andrews, Donald W.K., Generalized Method of Moments Estimation When a Parameter Is on a Boundary, Journal of Business & Economic Statistics, Oct. 2002, vol. 20, No. 4, 2002 American Statistical Association.

Otunuga, Olusegun Michael, Stochastic Modeling and Analysis of Energy commodity Spot Price Processes, University of South Florida Department of Mathematics and Statistics, Jun. 25, 2014.

Assonken, Patrick A. et al, Simulation and Calibration of Options with Levy-Type Stochastic Dynamic Spot Price Under Semi Markov Market Regimes, Department of Mathematics and Statistics, University of South Florida, Sep. 21, 2015.

Bollerslev, Tim et al., ARCH modeling in finance: A review of the theory and empirical evidence, 1992, pp. 55-59, vol. 52, Elsevier, North Holland.

Kulkarni, Ramesh M. et al., Stochastic Stability of Short-Run Market Equilibrium: A Comment, The Quarterly Journal of Economics, Nov. 1979, pp. 731-735, vol. 93, No. 4, Oxford University Press.

Paothong, Arnut et al., Agent-based modeling simulation under local network externality, Journal of Economic Interaction and Coordination, Apr. 2014, pp. 1-26, vol. 9, issue 1, Springer Berlin Heidelberg.

Robinson, P. M., The Estimation of Linear Differential Equations with Constant Coefficients, Econometrica, Jul. 1976, pp. 751-764, vol. 44, No. 4, Econometric Society.

Ronchetti, Elvezio et al., Robust interference with GMM estimators, Journal of Econometrics, 2001, Mar. 2001, pp. 37-69, vol. 101, issue 1.

Trevezas, Samis et al, Variance estimation in the central limit theorem for Markov chains, Journal of Statistical Planning and Inference, Jul. 2009, pp. 2242-2253, vol. 139, issue 7.

Shoji, Isao et al., Comparative Study of Estimation Methods for Continuous Time Stochastic Processes, Journal of Time Series Analysis, Sep. 1997, pp. 485-506, vol. 18, issue 5.

Steiger, Natalie M. et al., ASAP3: A Batch Means Procedure for Steady-State Simulation Analysis, ACM Transactions on Modeling and Computer Simulation, Jan. 2005, pp. 39-73, vol. 15, No. 1.

Apostol, Tom M., Mathematical Analysis, 2nd ed., 1974, pp. 373-375, Addison-Wesley Publishing Company, Inc., Reading, Massachusetts.

Casella, George et al., Statistical Interference, 2nd ed., 2002, pp. 255-267, Duxbury, Australia.

Kenney, J. F. et al, Mathematics of Statistics: Part One, 3rd ed., 1963, D. Van Nostrand, Princeton.

Ladde, G. S., Stability and oscillations in single-species processes with past memory, International Journal of Systems Science, 1979, pp. 621-647, vol. 10, No. 6., Taylor & Francis.

Lucas, James M. et al., Exponentially Weighted Moving Average Control Schemes: Properties and Enhancements, Technometrics, Feb. 1990, pp. 1-12, vol. 32, No. 1, American Statistical Association and the American Society for Quality Control.

Otunuga, Olusegun Michael, Stochastic Modeling and Analysis of Energy Commodity Spot Price Processes, Dissertation, Jun. 27, 2014, University of South Florida.

Phillips, A. W., The Estimation of Parameters in Systems of Stochastic Differential Equations, Biometrika, 1959, pp. 67-76, vol. 46, No. 1-2, Oxford UP.

Singer, Hermann, Continuous-Time Dynamical Systems with Sampled Data, Errors of Measurement and Unobserved Components, Journal of Time Series Analysis, 1993, pp. 527-545, vol. 14, No. 5, Blackwell, Oxford.

Wasserman, Larry, All of Nonparametric Statistics, 2006, pp. 183-191, Springer, New York.

Carlstein, Edward, The Use of Subseries Values for Estimating the Variance of a General Statistic from a Stationary Sequence, The Annals of Statistics, 1986, pp. 1171-1179, vol. 14, No. 3, Institute of Mathematical Statistics.

Chan, K. C. et al., An Empirical Comparison of Alternative Models of the Short-Term Interest Rate, The Journal of Finance, Jul. 1992, pp. 1209-1227, vol. 47, No. 3, Blackwell.

Donnet, Sophie et al., A review on estimation of stochastic differential equations for pharmacokinetic/pharmacodynamic models, Advanced Drug Delivery Reviews, 2013, pp. 929-939, vol. 65, No. 7, Elsevier B.V.

Engle, Robert F., Autoregressive Conditional Heteroscedasticity with Estimates of the Variance of United Kingdom Inflation, Econometrica, Jul. 1982, pp. 987-1007, vol. 50, No. 4, The Econometric Society.

Hansen, Lars Peter, Large Sample Properties of Generalized Method of Moments Estimators, Econometrica, Jul. 1982, pp. 1029-1054, vol. 50, No. 4, The Econometric Society.

Hansen, Lars Peter et al., Back to the Future: Generating Moment Implications for Continuous-Time Markov Processes, Econometrica, Jul. 1995, pp. 767-804, vol. 63, No. 4, The Econometric Society.

Jeisman, Joseph, Estimation of the Parameters of Stochastic Differential Equations, Graduate Thesis, Dec. 2005, Queensland University of Technology.

Grewal, Mohinder S., Kalman Filtering: Theory and Practice Using MATLAB, 3rd ed., 2008, Wiley & Sons, Hoboken.

Ozaki, Tohru, A Bridge Between Nonlinear Time Series Models and Nonlinear Stochastic Dynamical Systems: A Local Linearization Approach, Statistica Sinica, Jan. 1992, pp. 113-135, vol. 2, No. 1, Institute of Statistical Science, Academia Sinica.

Kazmerchuk, Yuriy et al., A Continuous-Time Garch Model for Stochastic Volatility with Delay, Canadian Applied Mathematics Quarterly, Summer 2005, pp. 121-149, vol. 13, No. 2, Applied Mathematics Institute of the University of Alberta.

Czellar, Veronika et al, Indirect robust estimation of the short-term interest rate process, Journal of Empirical Finance, Sep. 2007, pp. 546-563, vol. 14, iss. 4, Elsevier B. V.

Paothong, Arnut et al., Adaptive Expectations and Dynamic Models for Network Goods, Economic Analysis and Policy, Dec. 2013, pp. 353-373, vol. 43, No. 3, Elsevier B. V.

Shoji, Isao, Nonparametric estimation of nonlinear dynamics by metric-based local linear approximation, Statistical Methods and Applications, Aug. 2013, pp. 341-353, vol. 22, iss. 3, Italian Statistical Society.

Wu, Wei Biao, Recursive Estimation of Time-Average Variance Constants, The Annals of Applied Probability, Aug. 2009, pp. 1529-1552, vol. 19, No. 4, Institute of Mathematical Statistics.

Otunuga, Michael, Stochastic Modeling of Energy Commodity Spot Price Processes, Colloquium Slide Presentation, Oct. 21, 2015, Marshall University.

Otunuga, Olusegun et al., Multivariate Stochastic Dynamic Model of Energy Commodities Under External Interventions, AMS Conference Slide Presentation, Jan. 29, 2015, University of South Florida Dept. of Mathematics and Science.

Singer, Hermann, A Survey of Estimation Methods for Stochastic Differential Equations, 6th International Conference on Social Science Methodology, 2004, Amsterdam.

Chandra, J. et al, Multi-Cultural Dynamics on Social Networks under External Random Perturbations, International Journal of Communications, Network and System Sciences, Jun. 2014, pp. 181-195, vol. 7, No. 6, Scientific Research.

(56) References Cited

OTHER PUBLICATIONS

Bollerslev, Tim, Generalized Autoregressive Conditional Heteroskedasticity, Journal of Economics, Apr. 1986, pp. 307-327, vol. 31, Iss. 3, Elsevier, North Holland.

\* cited by examiner

LOCAL LAGGED ADAPTED GENERALIZED METHOD OF MOMENTS DYNAMIC PROCESS

CROSS-REFERENCE TO RELATED APPLICATIONS

This application claims the benefit of U.S. Provisional Application No. 62/068,848, filed Oct. 27, 2014, the entire contents of which are hereby incorporated herein by reference. The application also claims the benefit of U.S. Provisional Application No. 62/246,189, filed Oct. 26, 2015, the entire contents of which are hereby incorporated herein by reference.

GOVERNMENT LICENSE RIGHTS

This invention was made with government support under Grant Numbers W911NF-12-1-0090 and W911NF-15-1-0182 awarded by the Army Research Office. The government has certain rights in the invention.

BACKGROUND

Tools for analyzing and managing large collections of data are becoming increasingly important. For example, data models between various commodities can be analyzed to determine whether a collaborative or competitive relationship exists between the commodities. However, traditional methods of verifying and validating nonlinear time series type data sets can encounter state and parameter estimation errors.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Further, in the drawings, like reference numerals designate corresponding parts throughout the several views.

Figure 1:
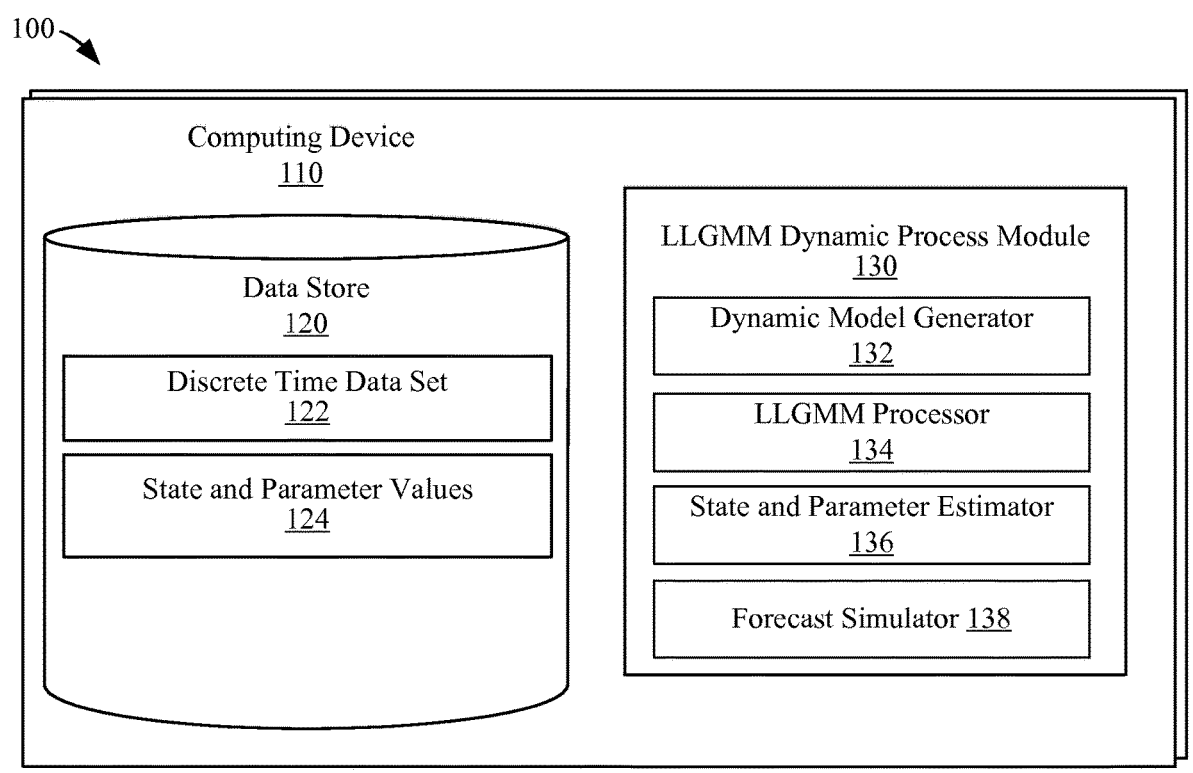
FIG. 1 illustrates an example computing environment for a local lagged adapted generalized method of moments dynamic process according to various aspects of the embodiments described herein.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

1. Introduction

The embodiments described herein are directed to the development and application of a local lagged adapted generalized method of moments (LLGMM) dynamic process. Various embodiments of the approach can include one or more of the following components: (1) developing a stochastic model of a continuous-time dynamic process, (2) developing one or more discrete time interconnected dynamic models of statistic processes, (3) utilizing Euler-type discretized schemes for non-linear and non-stationary systems of stochastic differential equations, (4) employing one or more lagged adaptive expectation processes for developing generalized method of moment/observation equations, (5) introducing conceptual and computational parameter estimation problems, (6) formulating a conceptual and computational state estimation scheme, and (7) defining a conditional mean square $\epsilon$-best sub-optimal procedure.

The development of the LLGMM dynamic process is motivated by and applicable to parameter and state estimation problems in continuous-time nonlinear and non-stationary stochastic dynamic models in biological, chemical, engineering, energy commodity markets, financial, medical, physical and social science, and other fields. The approach result in a balance between model specification and model prescription of continuous-time dynamic processes and the development of discrete time interconnected dynamic models of local sample mean and variance statistic processes (DTIDMLSMVSP). DTIDMLSMVSP is the generalization of statistic (sample mean and variance) for random sample drawn from the static dynamic population problems. Further, it is also an alternative approach to the generalized autoregressive conditional heteroskedasticity (GARCH) model, and it provides an iterative scheme for updating statistic coefficients in a system of generalized method of moment/observation equations. Furthermore, the application of the LLGMM to various time-series data sets demonstrates its performance in forecasting and confidence-interval problems in applied statistics.

Most existing parameter and state estimation techniques are centered around the usage of either overall data sets, batched data sets, or local data sets drawn on an interval of finite length T. This leads to an overall parameter estimate on the interval of length T. The embodiments described herein apply a new approach, the LLGMM. The LLGMM is based on a foundation of: (a) the Itô-Doob Stochastic Calculus, (b) the formation of continuous-time differential equations for suitable functions of dynamic state with respect to original SDE (using Itô-Doob differential formula), (c) constructing corresponding Euler-type discretization schemes, (d) developing general discrete time interconnected dynamic model of local sample mean and variance statistic processes (DTIDMLSMVSP), (e) the fundamental properties of solution process of system of stochastic differential equations, for example: existence, uniqueness, continuous dependence of parameters.

One of the goals of the parameter and state estimation problems is for model validation rather than model misspecification. For continuous-time dynamic model validation, existing real world data sets are utilized. This real world data is time varying and sampled, drawn, or recorded at discrete times on a time interval of finite length. In view of this, instead of using an existing econometric specification/Euler-type numerical scheme, a stochastic numerical approximation scheme is constructed using continuous time stochastic differential equations for the LLGMM process described herein.

In almost all real world dynamic modeling problems, future states of continuous time dynamic processes are influenced by past state history in connection with response/reaction time delay processes influencing the present states. That is, many discrete time dynamic models depend on the past state of a system. The influence of state history, the concept of lagged adaptive expectation process, and the idea of a moving average lead to the development of the general DTIDMLSMVSP. Extensions of the discrete time sample mean and variance statistic processes are: (a) to initiate the use of a discrete time interconnected dynamic approach in parallel with the continuous-time dynamic process, (b) to shorten the computation time, and (c) to significantly reduce state error estimates.

Utilizing the Euler-type stochastic discretization, for example, of the continuous time stochastic differential equations/moment/observations and the discrete time interconnected dynamic approach in parallel with the continuous-time dynamic process (and the given real world time series data and the method of moments), systems of local moment/observation equations can be constructed. Using the DTIDMLSMVSP and the lagged adaptive expectation process for developing generalized method of moment equations, the notions of data coordination, theoretical iterative and simulation schedule processes, parameter estimation, state simulation and mean square optimal procedures are introduced. The approach described herein is more suitable and robust for forecasting problems than many existing methods. It can also provide upper and lower bounds for the forecasted state of the system. Further, it applies a nested "two scale hierarchic" quadratic mean-square optimization process, whereas existing generalized method of moments approaches and their extensions are "single-shot".

Below, using the role of time-delay processes, the concept of lagged adaptive expectation process, moving average, local finite sequences, local mean and variance, discrete time dynamic sample mean and variance statistic processes, local conditional and sequences, local sample mean and variance, the DTIDMLSMVSP is developed. A local observation system is also constructed from nonlinear stochastic functional differential equations. This can be based on the Itô-Doob stochastic differential formula and Euler-type numerical scheme in the context of the original stochastic systems of differential equations and the given data. In addition, using the method of moments in the context of lagged adaptive expectation process, a procedure is outlined to estimate state parameters. Using the local lagged adaptive process and the discrete time interconnected dynamic model for statistic process, the idea of time series data collection schedule synchronization with both numerical and simulation time schedules induces a chain of concepts further described below.

The existing GMM-based parameter and state estimation techniques for testing/selecting continuous-time dynamic models are centered around discretization and model errors in the context of the use of an entire time-series of data, algebraic manipulations, and econometric specification for formation of orthogonality condition parameter vectors (OCPV). The existing approaches lead to an overall/single-shot state and parameter estimates, and requires the ergodic stationary condition for convergence. Furthermore, the existing GMM-based single-shot approaches are not flexible to correctly validate the features of continuous-time dynamic models that are influenced by the state parameter and hereditary processes. In many real-life problems, the past and present dynamic states influence the future state dynamic. In the formulation of one of the components of the LLGMM approach, we incorporate the "past state history" via a local lagged adaptive process.

As an introduction to an LLGMM dynamic system according to various aspects of the embodiments, FIG. 1 illustrates an example computing environment 100 for LLGMM dynamic processes. The computing environment 100 includes a computing device 110, a data store 120, and an LLGMM dynamic process module 130.

The computing environment 100 can be embodied as one or more computers, computing devices, or computing systems. In certain embodiments, the computing environment 100 can include one or more computing devices arranged, for example, in one or more server or computer banks. The computing device or devices can be located at a single installation site or distributed among different geographical locations. The computing environment 100 can include a plurality of computing devices that together embody a hosted computing resource, a grid computing resource, and/or other distributed computing arrangement. One example structure of the computing environment 100 is described in greater detail below with reference to FIG. 8.

The data store 120 can be embodied as one or more memories that store (or are capable of storing) and/or embody a discrete time data set 122 and state and parameter values 124. In addition, the data store 120 can store (or is capable of storing) computer readable instructions that, when executed, direct the computing device 110 to perform various aspects of the LLGMM dynamic processes described herein. In that context, the data store 120 can store computer readable instructions that embody, in part, the LLGMM dynamic process module 130. The discrete time data set 122 can include as past state information of any number of continuous time dynamic processes over any time intervals, as described in further detail below. Further the state and parameter values 124 can include both admissible parameter estimates for a stochastic model of a continuous time dynamic process and state values of the stochastic model of the continuous time dynamic process as described in further detail below.

The LLGMM dynamic process module 130 includes the dynamic model generator 132, the LLGMM processor 134, the state and parameter estimator 136, and the forecast simulator 138. Briefly, the dynamic model generator 132 can be configured to develop a one or more stochastic models of various continuous time dynamic processes. The LLGMM processor 134 can be configured to generate a DTIDMLSM-VSP based on any one of the stochastic models of the continuous time dynamic processes developed by the dynamic model generator 132. The state and parameter estimator 136 is configured to calculate a plurality of admissible parameter estimates for the stochastic model of the continuous time dynamic process using the DTIDMLSM-VSP. The state and parameter estimator 136 can be further configured to calculate a state value of the stochastic model of the continuous time dynamic process for each of the plurality of admissible parameter estimates, to gather a plurality of state values of the stochastic model of the continuous time dynamic process. The state and parameter estimator 136 can be further configured to determine an optimal admissible parameter estimate among the plurality of admissible parameter estimates that results in a minimum error among the plurality of state values. Additionally, the forecast simulator 138 can be configured to forecast at least one future state value of the stochastic model of the continuous-time dynamic process. The functional and operational aspects of the components of the LLGMM dynamic process module 130 are described in greater detail below.

This remainder of this disclosure is organized as follows: in Section 2, using the role of time-delay processes, the concept of lagged adaptive expectation process, moving average, local finite sequence, local mean and variance, discrete time dynamic sample mean and variance statistic processes, local conditional sequence, and local sample mean and variance, we develop a general DTIDMLSMVSP. DTIDMLSMVSP is the generalization of statistic of random sample drawn from the "static" population. In Section 3, a local observation system is constructed from a nonlinear stochastic functional differential equations. This is based on the Itô-Doob stochastic differential formula and Euler-type numerical scheme in the context of the original stochastic systems of differential equations and the given data. In addition, using the method of moments in the context of lagged adaptive expectation process, a procedure to estimate the state parameters is outlined.

Using the local lagged adaptive process and the discrete time interconnected dynamic model for statistic process, the idea of time series data collection schedule synchronization with both numerical and simulation time schedules induces a finite chain of concepts in Section 4, namely: (a) local admissible set of lagged sample/data/observation size, (b) local class of admissible lagged-adapted finite sequence of conditional sample/data, (c) local admissible sequence of parameter estimates and corresponding admissible sequence of simulated values, (d) $\epsilon$-best sub-optimal admissible subset of set of $m_k$-size local conditional samples at time $t_k$ in (a), (e) $\epsilon$-sub-optimal lagged-adapted finite sequence of conditional sample/data, and (f) the $\epsilon$-best sub optimal parameter estimates and simulated value at time $t_k$ for k=1, 2, ..., N in a systematic way. In addition, the local lagged adaptive process and DTIDMLSMVSP generate a finite chain of discrete time admissible sets/sub-data and corresponding chain described by simulation algorithm. The usefulness of computational algorithm is illustrated by applying the code not only to four energy commodity data sets, but also to the U.S. Treasury Bill Interest Rate data set and the USD-EUR Exchange Rate data set in finance for the state and parameter estimation problems. Further, we compare the usage of GARCH (1,1) model with the presented DTIDMLSMVSP model. We also compared the DTID-MLSMVSP based simulated volatility U.S. Treasury Bill Yield Interest rate data with the simulated work shown in Chan, K. C., Karolyi, G. Andrew, Longstaff, F. A., Sanders, Anthony B., *An Empirical Comparison of Alternative Models of the Short-Term Interest Rate*, The Journal of Finance, Vol. 47., No. 3, 1992, pp. 1209-1227 ("Chan et al").

In Section 5, the LLGMM is applied to investigate the forecasting and confidence-interval problems in applied statistics. The presented results show the long-run prediction exhibiting a degree of confidence. The use of advancements in electronic communication systems and tools exhibit that almost everything is dynamic, highly nonlinear, non-stationary and operating under endogenous and exogenous processes. Thus, a multitude of applications of the embodiments described herein exist. Some extensions include: (a) the development of the DTIDMLSMVSP and (b) the Aggregated Generalized Method of Moments AGMM of the LLGMM method are presented in Section 6. In fact, we compare the performance of DTIDMLSMVSP model with the GARCH(1,1) model and ex post volatility of Chan et al. Further, using the average of locally estimated parameters in the LLGMM, an aggregated generalized method of moment is also developed and applied to six data sets in Section 6.

In Section 7, a comparative study between the LLGMM and the existing parametric orthogonality condition vector based generalized method of moments (OCBGMM) techniques is presented. In Section 8, a comparative study between the LLGMM and some existing nonparametric methods is also presented. The LLGMM exhibits superior performance to the existing and newly developed OCB-GMM. The LLGMM is problem independent and dynamic. On the other hand, the OCBGMM is problem dependent and static. In appearance, the LLGMM approach seems complicated, but it is user friendly. It can be operated by a limited theoretical knowledge of the LLGMM. Furthermore, we present several numerical results concerning both mathematical and applied statistical results showing the comparison of LLGMM with existing methods.

2. Derivation of Discrete Time Dynamic Model for Sample Mean and Variance Processes The existing GMM-based parameter and state estimation techniques for testing/selecting continuous-time dynamic models are centered around discretization and model mispecifications errors in the context of usage of entire time-series data, algebraic manipulations, and econometric specification for formation of orthogonality condition parameter vectors (OCPV). The existing approaches lead to a single-shot for state and parameter estimates and require the ergodic stationary condition for convergence. Furthermore, the existing GMM-based single-shot approaches are not flexible to correctly validate the features of continuous-time dynamic models that are influenced by the state parameter and hereditary processes. In many real-life problems, the past and present dynamic states influence the future state dynamic. In the formulation of one of the components of the LLGMM approach, we incorporate the "past state history" via local lagged adaptive process.

Further, based on one of the goals of applied mathematical and statistical research, the embodiments described herein are applicable for various processes in biological, chemical, engineering, energy commodity markets, financial, medical, and physical and social sciences. Employing the hereditary influence of a systems, the concept of lagged adaptive expectation process, and the idea of moving average, a general DTIDMLSMVSP is developed with respect to an arbitrary continuous-time stochastic dynamic process. The development of the DTIDMLSMVSP can be motivated by the state and parameter estimation problems of any continuous time nonlinear stochastic dynamic model. Further, the idea of DTIDMLSMVSP was primarily based on the sample mean and sample variance ideas as statistic for a random sample drawn from a static population in the descriptive statistics. Using the DTIDMLSMVSP, the problems of long-term forecasting and interval estimation problems with a high degree of confidence can be addressed.

For the development of the DTIDMLSMVSP, various definitions and notations are described herein. Let $\tau$ and $\gamma$ be finite constant time delays such that $0<\gamma\leq\tau$. Here, $\tau$ characterizes the influence of the past performance history of state of dynamic process, and $\gamma$ describes the reaction or response time delay. In general, these time delays are unknown and random variables. These types of delay play a role in developing mathematical models of continuous time and discrete time dynamic processes. Based upon the nature of data collection, it may be necessary to either transform these time delays into positive integers or to design the data collection schedule in relations with these delays. For this purpose, the discrete version of time delays of $\tau$ and $\gamma$ are defined as $$r = \left[\left|\frac{\tau}{\Delta t_i}\right|\right] + 1, \text{ and } q = \left[\left|\frac{\gamma}{\Delta t_i}\right|\right] + 1, \quad (1)$$

respectively. For simplicity, we assume that $0<\gamma<1$ ($q=1$).

Definition 1.

Let x be a continuous time stochastic dynamic process defined on an interval $[-\tau, T]$ into $\Re$, for some $T>0$. For $t\in[-\tau, T]$, let $\mathcal{F}_t$ be an increasing sub-sigma algebra of a complete probability space for which $x(t)$ is $\mathcal{F}_t$ measurable. Let P be a partition of $[-\tau, T]$ defined by $$P := \{t_i = -\tau + (r+i)\Delta t\}, \text{ for } i \in I_{-r}(N), \quad (2)$$

where $$\Delta t = \frac{\tau + T}{N},$$

and $I_i(k)$ is defined by $I_i(k) = \{j \in \mathbb{Z} \mid i \leq j \leq k\}$.

Let $\{x(t_i)\}_{i=-r}^{N}$ be a finite sequence corresponding to the stochastic dynamic process x and partition P in Definition 1. Further, $x(t_i)$ is $\mathcal{F}_{t_i}$ measurable for $i \in I_{-r}(N)$. The definition of forward time shift operator F is given by:

$$F^i x(t_k) = x(t_{k+i}). \quad (3)$$

Additionally, $x(t_i)$ is denoted by $x_i$ for $i \in I_{-r}(N)$.

Definition 2.

For $q=1$ and $r \geq 1$, each $k \in I_0(N)$, and each $m_k \in I_2(r+k-1)$, a partition $P_k$ of closed interval $[t_{k-m_k}, t_{k-1}]$ is called local at time $t_k$ and it is defined by $$P_k := t_{k-m_k} < t_{k-m_k+1} < \ldots < t_{k-1}. \quad (4)$$

$P_k$ is referred as the $m_k$-point sub-partition of the partition P in (2) of the closed sub-interval $[t_{k-m_k}, t_{k-1}]$ of $[-\tau, T]$.

Definition 3.

For each $k \in I_0(N)$ and each $m_k \in I_2(r+k-1)$, a local finite sequence at a time $t_k$ of the size $m_k$ is restriction of $\{x(t_i)\}_{i=-r}^{N}$ to $P_k$ in (4), and it is defined by $$S_{m_k,k} := \{F^i x_{k-1}\}_{i=-m_k+1}^{0}. \quad (5)$$

As $m_k$ varies from 2 to $k+r-1$, the corresponding local sequence $S_{m_k,k}$ at $t_k$ varies from $\{x_i\}_{i=k-2}^{k-1}$ to $\{x_i\}_{i=-r+1}^{k-1}$. As a result of this, the sequence defined in (5) is also called a $m_k$-local moving sequence. Furthermore, the average corresponding to the local sequence $S_{m_k,k}$ in (5) is defined by $$\overline{S}_{m_k,k} := \frac{1}{m_k} \sum_{i=-m_k+1}^{0} F^i x_{k-1}. \quad (6)$$

The average/mean defined in (6) is also called the $m_k$-local average/mean. Further, the $m_k$-local variance corresponding to the local sequence $S_{m_k,k}$ in (5) is defined by $$s^2_{m_k,k} := \quad (7)$$

$$\begin{cases} \frac{1}{m_k} \sum_{i=-m_k+1}^{0} \left(F^i x_{k-1} - \frac{1}{m_k} \sum_{j=-m_k+1}^{0} F^j x_{k-1}\right)^2 & \text{for small } m_k \\ \frac{1}{m_k-1} \sum_{i=-m_k+1}^{0} \left(F^i x_{k-1} - \frac{1}{m_k} \sum_{j=-m_k+1}^{0} F^j x_{k-1}\right)^2 & \text{for large } m_k \end{cases}$$

Definition 4.

For each fixed $k \in I_0(N)$, and any $m_k \in I_2(k+r-1)$, the sequence $\{\overline{S}_{i,k}\}_{i=k-m_k}^{k-1}$ is called a $m_k$-local moving average/mean process at $t_k$. In other words, the LLGMM dynamic process includes, for each $m_k$-local moving sequence, calculating an $m_k$-local average to generate an $m_k$-moving average process (e.g., reference numeral 310 in FIG. 3). Further, the sequence $\{s_{i,k}^2\}_{i=k-m_k}^{k-1}$ is called a $m_k$-local moving variance process at $t_k$. That is, for each $m_k$-local moving sequence, the process includes calculating an $m_k$-local variance to generate an $m_k$-local moving variance process (e.g., reference numeral 312 in FIG. 3).

Definition 5.

Let $\{x(t_i)\}_{i=-r}^{N}$ be a random sample of continuous time stochastic dynamic process collected at partition P in (2). The local sample average/mean in (6) and local sample variance in (7) are called discrete time dynamic processes of sample mean and sample variance statistics.

Definition 6.

Let $\{x(t_i)\}_{i=-r}^{N}$ be a random sample of continuous time stochastic dynamic process collected at partition P in (2). The $m_k$-local moving average and variance defined in (6) and (7) are called the $m_k$-local moving sample average/mean and local moving sample variance at time $t_k$, respectively. Further, $m_k$-local sample average and $m_k$-local sample variance are referred to as local sample mean and local sample variance statistics for the local mean and variance of the continuous time stochastic dynamic process at time $t_k$, respectively. $\overline{S}_{m_k}$ and $s_{m_k}^2$ are called sample statistic time series processes.

Definition 7.

Let $\{\mathbb{E}[x(t_i)| \mathcal{F}_{t_{i-1}}]\}_{i=-r+1}^{N}$ be a conditional random sample of continuous time stochastic dynamic process with respect to sub-σ-algebra $\mathcal{F}_{t_i}$, $t_i \in P$ in (2). The $m_k$-local conditional moving average and variance defined in the context of (6) and (7) are called the $m_k$-local conditional moving sample average/mean and local conditional moving sample variance, respectively.

The concept of sample statistic time-series/process extends the concept of random sample statistic for static dynamic populations in a natural and unified way. Employing Definition 7, we introduce the DTIDMLSMVSP. As described in detail below, this discrete time algorithm/model plays an important role in state and parameter estimation problems for nonlinear and non-stationary continuous-time stochastic differential and difference equations. Further, it provides feedback for both continuous-time dynamic model and corresponding discrete time statistic dynamic model for modifications and updates under the influence of exogenous and endogenous varying forces or conditions in a systematic and unified way. It is also clear that the discrete time algorithm eases the updates in the time-series statistic. Now, a change in $\overline{S}_{m_k,k}$ and $s_{m_k,k}^2$ with respect to change in time $t_k$ can be stated.

Lemma 1. (DTIDMLSMVSP).

Let $\{\mathbb{E}[x(t_i)| \mathcal{F}_{t_{i-1}}]\}_{i=-r+1}^{N}$ be a conditional random sample of continuous time stochastic dynamic process with respect to sub-σ-algebra $\mathcal{F}_{t_i}$, $t_i$ belong to partition P in. Let $\overline{S}_{m_k,k}$ and $s_{m_k,k}^2$ be $m_k$-local conditional sample average and local conditional sample variance at $t_k$ for each $k \in I_0(N)$. Using these inputs (e.g., reference numeral 314 in FIG. 3), an example DTIDMLSMVSP can be described by $$\begin{cases} \overline{S}_{m_{k-p+1},k-p+1} = \frac{m_{k-p}}{m_{k-p+1}} \overline{S}_{m_{k-p+1},k-p} + \\ \qquad \eta_{m_{k-p},k-p}, \overline{S}_{m_0,0} = \overline{S}_0 \\ S_{m_k,k}^2 = \begin{cases} \frac{m_{k-1}}{m_k} \left[ \sum_{i=1}^{p} \left[ \frac{m_{k-i}}{\prod_{j=0}^{i-1} m_{k-j}} \right] s_{m_{k-i},k-i}^2 + \right. \\ \left. \left[ \frac{m_{k-p}}{\prod_{j=0}^{p-1} m_{k-j}} \overline{S}_{m_{k-p},k-p}^2 \right] + \right. \\ \left. \varepsilon_{m_{k-1},k-1}, \right. & \text{for small } m_k, \\ & m_{k-1} \leq m_k \\ \sum_{i=1}^{p} \left[ \frac{m_{k-i}-1}{\prod_{j=0}^{i-1} m_{k-j}} \right] s_{m_{k-i},k-i}^2 + \\ \frac{m_{k-p}}{\prod_{j=0}^{p-1} m_{k-j}} \overline{S}_{m_{k-p},k-p}^2 + \\ \epsilon_{m_{k-1},k-1}, & \text{for large } m_k, \\ & m_{k-1} \leq m_k \\ s_{m_i,i}^2 = s_i^2, i \in I_{-p}(0), & \text{initial conditions} \end{cases} \end{cases}$$

(8)

where $$\begin{cases} \eta_{m_{k-p},k-p} = \frac{1}{m_{k-p+1}} \left[ \sum_{i=-m_{k-p+1}+1}^{-m_{k-p}+1} F^i x_{k-p} - \right. \\ \qquad \left. F^{-m_{k-p}+1} x_{k-p} - F^{-m_{k-p}} x_{k-p} + F^0 x_{k-p} \right], \\ \varepsilon_{m_{k-1},k-1} = \frac{m_k-1}{m_k} \left[ \sum_{i=1}^{p} \frac{(F^{-i+1} x_{k-1})^2}{\prod_{j=0}^{i-1} m_{k-j}} - \right. \\ \qquad \sum_{i=1}^{p} \frac{(F^{-i+1-m_{k-i}} x_{k-1})^2}{\prod_{j=0}^{i-1} m_{k-j}} - \\ \qquad \sum_{i=1}^{p} \frac{(F^{-i+2-m_{k-i}} x_{k-1})^2}{\prod_{j=0}^{i-1} m_{k-j}} + \\ \qquad \frac{m_k-1}{m_k} \left[ \sum_{i=1}^{p} \left[ \frac{\sum_{l=-i+2-m_{k-i+1}}^{-i+2-m_{k-i}} (F^l x_{k-1})^2}{\prod_{j=0}^{i-1} m_{k-j}} \right] \right] + \\ \qquad \sum_{i=1}^{p} \left[ \frac{\sum_{\substack{l,s=-i+2-m_{k-i+1} \\ l \neq s}}^{-i+1} F^l x_{k-1} F^s x_{k-1}}{\prod_{j=0}^{i-1} m_{k-j}} \right] - \\ \qquad \frac{1}{m_k} \sum_{\substack{l,s=-m_k+1 \\ l \neq s}}^{0} F^l x_{k-1} F^s x_{k-1}, \end{cases}$$

(9)

$$\begin{cases} \epsilon_{m_{k-1},k-1} = \sum_{i=1}^{p} \frac{(F^{-i+1} x_{k-1})^2}{\prod_{j=0}^{i-1} m_{k-j}} - \sum_{i=1}^{p} \frac{(F^{-i+1-m_{k-i}} x_{k-1})^2}{\prod_{j=0}^{i-1} m_{k-j}} - \\ \sum_{i=1}^{p} \frac{(F^{-i+2-m_{k-i}} x_{k-1})^2}{\prod_{j=0}^{i-1} m_{k-j}} + \sum_{i=1}^{p} \left[ \frac{\sum_{l=-i+2-m_{k-i+1}}^{-i+2-m_{k-i}} (F^l x_{k-1})^2}{\prod_{j=0}^{i-1} m_{k-j}} \right] + \\ \sum_{i=1}^{p} \left[ \frac{\sum_{\substack{l,s=-i+2-m_{k-i+1} \\ l \neq s}}^{-i+1} F^l x_{k-1} F^s x_{k-1}}{\prod_{j=0}^{i-1} m_{k-j}} \right] - \frac{1}{m_k-1} \sum_{\substack{l,s=-m_k+1 \\ l \neq s}}^{0} F^l x_{k-1} F^s x_{k-1} \end{cases}$$

Remark 1.

The interconnected dynamic statistic system (8) can be re-written as the one-step Gauss-Sidel dynamic system of iterative process described by $$X(k; p) = A(k, X(k-1; p); p) X(k-1; p) + e(k; p), \quad (10)$$

where $X(k; p) = \begin{pmatrix} X_1(k; p) \\ X_2(k; p) \end{pmatrix}$, $$X_1(k;p) = \overline{S}_{m_{k-p+1},k-p+1}, \quad X_2(k) = \begin{pmatrix} S^2_{m_{k-p+1},k-p+1} \\ S^2_{m_{k-p+2},k-p+2} \\ \vdots \\ S^2_{m_{k-1},k-1} \\ S^2_{m_k,k} \end{pmatrix},$$

$$A(k, X(k-1;p); p) = \begin{pmatrix} A_{11}(k;p) & A_{12}(k;p) \\ A_{21}(k, X(k-1;p);p) & A_{22}(k;p) \end{pmatrix},$$

$$A_{11}(k;p) = \frac{m_{k-p}}{m_k - p + 1},$$

$$A_{12}(k;p) = (0 \; 0 \; \ldots \; 0),$$

$$A_{21}(k;p) = \begin{cases} \begin{pmatrix} 0 \\ 0 \\ \vdots \\ 0 \\ \frac{(m_k-1)m_{k-p}}{m_k \prod_{j=0}^{p-1} m_{k-j}} \overline{S}_{m_{k-p},k-p} \end{pmatrix}, & \text{for small } m_k \\ \begin{pmatrix} 0 \\ 0 \\ \vdots \\ 0 \\ \frac{m_{k-p}}{\prod_{j=0}^{p-1} m_{k-j}} \overline{S}_{m_{k-p},k-p} \end{pmatrix}, & \text{for large } m_k, \end{cases}$$

$$A_{22}(k;p) = \begin{cases} \begin{pmatrix} 0 & 1 & 0 & 0 & \ldots & 0 \\ 0 & 0 & 1 & 0 & \ldots & 0 \\ \vdots & 0 & 0 & 0 & \ddots & \vdots \\ 0 & \ldots & 0 & 0 & 0 & 1 \\ \frac{(m_k-1)m_{k-p}}{m_k \prod_{j=0}^{p-1} m_{k-j}} & \frac{(m_k-1)m_{k-p+1}}{m_k \prod_{j=0}^{p-2} m_{k-j}} & \ldots & \frac{(m_k-1)m_{k-p+i-1}}{m_k \prod_{j=0}^{p-i} m_{k-j}} & \ldots & \frac{(m_k-1)m_{k-1}}{m_k^2} \end{pmatrix}, & \text{for small } m_k, \end{cases}$$

and $$\begin{pmatrix} 0 & 1 & 0 & 0 & \ldots & 0 \\ 0 & 0 & 1 & 0 & \ldots & 0 \\ \vdots & 0 & 0 & 0 & \ddots & \vdots \\ 0 & \ldots & 0 & 0 & 0 & 1 \\ \frac{m_{k-p}-1}{\prod_{j=0}^{p-1} m_{k-j}} & \frac{m_{k-p+1}-1}{\prod_{j=0}^{p-2} m_{k-j}} & \ldots & \frac{m_{k-p+i-1}-1}{\prod_{j=0}^{p-i} m_{k-j}} & \ldots & \frac{m_{k-1}-1}{m_k^2} \end{pmatrix}, \text{for large } m_k$$

$$e(k;p) = \begin{pmatrix} e_1(k;p) \\ e_2(k;p) \end{pmatrix},$$

$$e_1(k;p) = \eta_{m_{k-p},k-p},$$

$$e_2(k;p) = \begin{pmatrix} 0 \\ 0 \\ \vdots \\ \epsilon^*_{m_{k-1},k-1} \end{pmatrix},$$

$$\epsilon^*_{m_{k-1},k-1} = \begin{cases} \epsilon_{m_{k-1},k-1}, & \text{for small } m_k \\ \epsilon_{m_{k-1},k-1}, & \text{for large } m_k \end{cases}$$

Remark 2.

For each $k \in I_0(N)$, $p=2$, and small $m_k$, the inter-connected system (8) reduces to the following special case $$X(k;2) = A(k, \mathbb{X}(k-1;2);2)X(k-1;2) + e(k;2), \quad (11)$$

where $X(k;2)$, $A(k;2)$ and $e(k;2)$ are defined by $$X(k;2) = \begin{pmatrix} X_1(k;2) \\ X_2(k;2) \end{pmatrix},$$

$$X_1(k;2) = \overline{S}_{m_{k-1},k-1},$$

$$X_2(k;2) = \begin{pmatrix} S^2_{m_{k-1},k-1} \\ S^2_{m_k,k} \end{pmatrix}, \quad A(k;2) = \begin{pmatrix} A_{11}(k;2) & A_{12}(k;2) \\ A_{21}(k;2) & A_{22}(k;2) \end{pmatrix},$$

$$A_{11}(k;2) = \frac{m_{k-2}}{m_k-1}, \quad A_{12}(k;2) = (0 \; 0),$$

$$A_{21}(k;2) = \begin{pmatrix} 0 \\ \frac{(m_k-1)m_{k-2}}{m_k^2 m_{k-1}} \overline{S}_{m_{k-2},k-2} \end{pmatrix},$$

$$A_{22}(k;2) = \begin{pmatrix} 0 & 1 \\ \frac{(m_k-1)m_{k-2}}{m_k^2 m_{k-1}} & \frac{(m_k-1)m_{k-1}}{m_k^2} \end{pmatrix},$$

$$e(k;2) = \begin{pmatrix} e_1(k;2) \\ e_2(k;2) \end{pmatrix}; \; e_1(k;2) = \eta_{m_{k-2},k-2},$$

-continued $$e_2(k; 2) = \begin{pmatrix} 0 \\ \varepsilon_{m_{k-1},k-1} \end{pmatrix}$$

$$\begin{cases} \eta_{m_{k-2},k-2} = \frac{1}{m_k}\left[\sum_{i=-m_{k-1}+1}^{-m_{k-2}+1} F^i x_{k-2} - F^{-m_{k-2}+1}x_{k-2} - F^{-m_{k-2}}x_{k-2} + F^0 x_{k-2}\right], \\ \varepsilon_{m_{k-1},k-1} = \frac{m_k - 1}{m_k}\left[\frac{(F^0 x_{k-1})^2 - (F^{-m_{k-1}}x_{k-1})^2 - (F^{1-m_{k-1}}x_{k-1})^2}{m_k} + \frac{(F^{-1}x_{k-1})^2 - (F^{-1-m_{k-2}}x_{k-1})^2 - (F^{-m_{k-2}}x_{k-1})^2}{m_k m_{k-1}}\right] + \\ \frac{m_k - 1}{m_k}\left[\frac{\sum_{i=-m_{k-1}}^{-m_{k-2}}(F^i x_{k-1})^2}{m_k m_{k-1}} + \frac{\sum_{\substack{i,j=-m_{k-1} \\ i \neq j}}^{-1} F^i x_{k-1} F^j x_{k-1}}{m_k m_{k-1}} + \frac{\sum_{i=1-m_k}^{1-m_{k-1}}(F^i x_{k-1})^2}{m_k}\right] - \frac{\sum_{\substack{i,j=1-m_k \\ i \neq j}}^{0} F^i x_{k-1} F^j x_{k-1}}{m_k^2}. \end{cases}$$

Remark 3.
Define $$\varphi_1 = \frac{m_k - 1}{m_k}\frac{m_{k-1}}{m_k}, \varphi_2 = \frac{m_k - 1}{m_k}\frac{m_{k-2}}{m_k m_{k-1}}, \text{ and } \varphi_3 = \frac{m_{k-2}}{m_{k-1}}.$$

For small $m_k$, $m_{k-1} \leq m_k$, $\forall k$, we have $\varphi_1 < 1$, $\varphi_2 < 1$, and $\varphi_3 \leq 1$. From $0 < \varphi_i$, $i=1, 2, 3$, and the fact that $$\varphi_1 + \varphi_2 = \frac{m_k - 1}{m_k^2}\left[m_{k-1} + \frac{m_{k-2}}{m_{k-1}}\right] \leq \frac{m_k - 1}{m_k^2}[m_{k-1} + 1] \leq \frac{m_k^2 - 1}{m_k^2} < 1,$$

the stability of the trivial solution (e.g., X(k; 2)=0) of the homogeneous system corresponding to (10) follows. Further, under the above stated conditions, the convergence of solutions of (10) also follows.

Remark 4.

From Remark 2, the local sample variance statistics at time $t_k$ depends on the state of the $m_{k-1}$ and $m_{k-2}$-local sample variance statistics at time $t_{k-1}$ and $t_{k-2}$, respectively, and the $m_{k-2}$-local sample mean statistics at time $t_{k-2}$.

Remark 5.

Aspects of the role and scope of the DTIDMLSMVSP can be summarized. First, the DTIDMLSMVSP is the second component of the LLGMM approach. The DTIDMLSM-VSP is valid for a transformation of data. It is generalization of a "statistic" of a random sample drawn from "static" population problems. Further, Lemma 1 provides iterative scheme for updating statistic coefficients in the local systems of moment/observation equations in the LLGMM approach. This accelerates the speed of computation. The DTID-MLSMVSP does not require any type of stationary condition. The DTIDMLSMVSP plays a significant role in the local discretization and model validation errors. Finally, the approach to the DTIDMLSMVSP is more suitable for forecasting problems, as further emphasized in the subsequent sections.

Remark 6.

The usefulness of the DTIDMLSMVSP arises in estimation of volatility process of a stochastic differential or difference equations. This model provides an alternative approach to the GARCH(p,q) model. Below, the $m_k$-local sample variance statistics are compared with the GARCH (p,q) model to show that the $m_k$-local sample variance statistics give a better forecast than the GARCH(p,q) model.

3. Theoretical Parametric Estimation Procedure

In this section, a foundation based on a mathematically rigorous theoretical state and parameter estimation procedure is formulated for a very general continuous-time nonlinear and non-stationary stochastic dynamic model described by a system stochastic differential equations. This work is not only motivated by the continuous-time dynamic model validation problem in the context of real data energy commodities, but also motivated by any continuous-time nonlinear and non-stationary stochastic dynamic model validation problems in biological, chemical, engineering, financial, medical, physical and social sciences, among others. This is because of the fact that the development of the existing Orthogonality Condition Based GMM (OCBGMM) procedure is primarily composed of the following five components: (1) testing/selecting continuous-time stochastic models for a particular dynamic process described by one or more stochastic differential equations, (2) using either a Euler-type discretization scheme, a discrete time econometric specification, or other discretization scheme regarding the stochastic differential equation specified in (1), (3) forming an orthogonality condition parameter vector (OCPV) using algebraic manipulation, (4) using (2), (3) and the entire time series data set, finding a system of moment equations for the OCBGMM, and (5) single-shot parameter and state estimates using positive-definite quadratic form. The existing OCBGMM lacks the usage of Itô-Doob calculus, properties of stochastic differential equations, and a connection with econometric based discretization schemes, the orthogonality conditional vector, and the quadratic form.

In this section, an attempt is made to eliminate the drawbacks, operational limitations, and the lack of connectivity and limited scope of the OCBGMM. This is achieved by utilizing (i) historical role played by hereditary process in dynamic modeling, (ii) Itô-Doob calculus, (iii) the fundamental properties of stochastic system of differential equations, (iv) the lagged adaptive process, (v) the discrete time interconnected dynamics of local sample mean and variances statistic processes model in Section 2 (Lemma 1), (vi) the Euler-type numerical schemes for both stochastic differential equations generated from the original stochastic systems of differential equations and the original stochastic systems of differential equations, (vii) systems of moments/observation equations, and (viii) local observation/measurements systems in the context of real world data.

Figure 2:
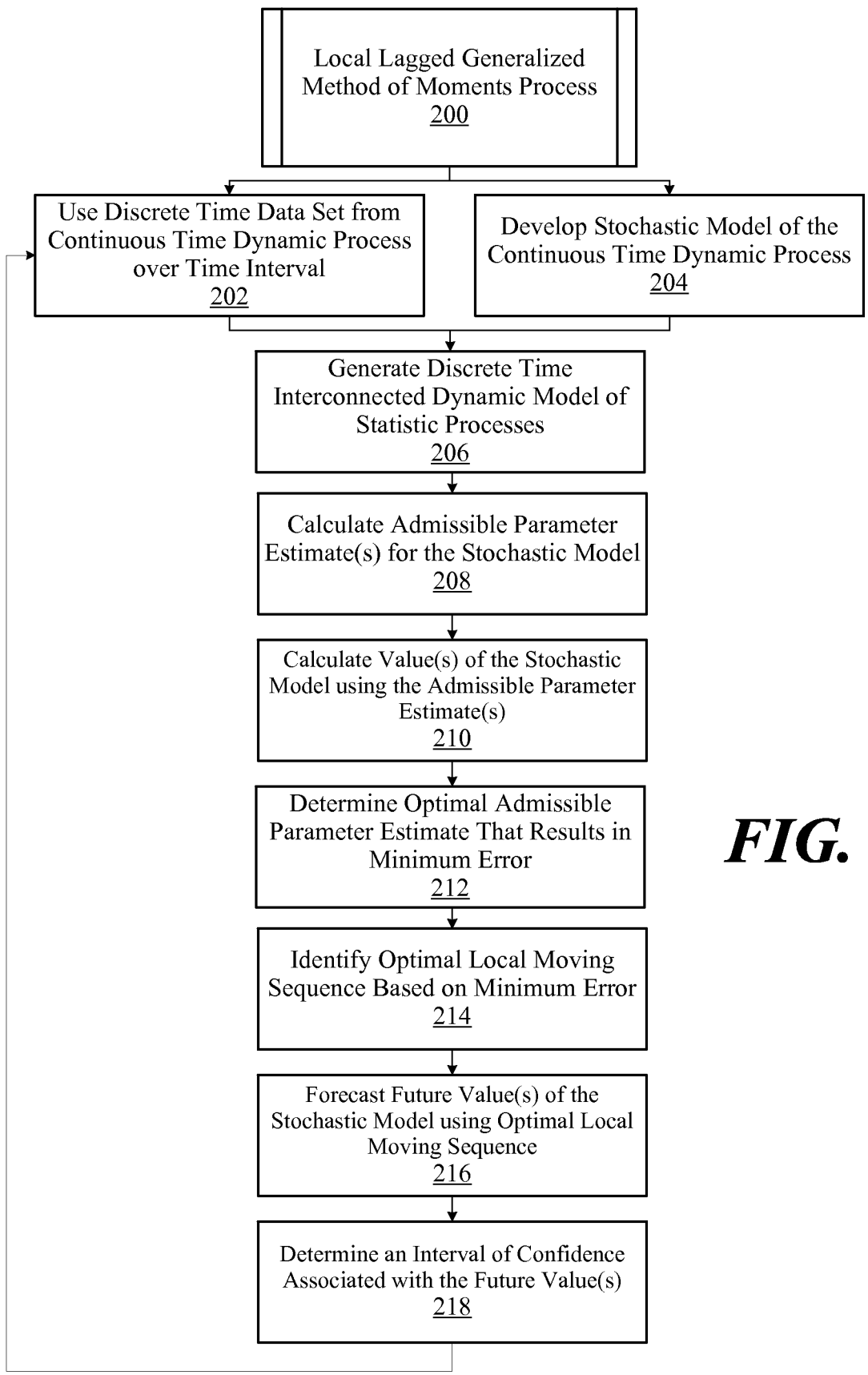
FIG. 2 illustrates a local lagged adapted generalized method of moments dynamic process according to various aspects of the embodiments described herein.

Starting in this section, parts of the the LLGMM dynamic process 200 shown in FIG. 2 are also described. At reference numeral 202, the process 200 includes obtaining a discrete time data set as past state information of a continuous time dynamic process over a time interval, such as the $[-\tau, T]$ described herein. The discrete time data set can be stored in the data store 120 as the discrete time data set 122. Further, at reference numeral 204, the process 200 includes developing a stochastic model of a continuous time dynamic process.

As one example of a stochastic model of a continuous time dynamic process, a general system of stochastic differential equations under the influence of hereditary effects in both the drift and diffusion coefficients is described by $$dy = f(t, y_t)dt + \sigma(t, y_t)dW(t), y_{t_0} = \varphi_0, \quad (12)$$

where, $y_t(\theta) = y(t+\theta)$, $\theta \in [-\tau, 0]$, $f$, $\sigma$: $[0, T] \times C \to \Re^q$ are Lipschitz continuous bounded functionals, $C$ is the Banach space of continuous functions defined on $[-\tau, 0]$ into $\Re^q$ equipped with the supremum norm, $W(t)$ is standard Wiener process defined on a complete filtered probability space $(\Omega, \mathcal{F}, (\mathcal{F})_{t \geq 0}, \mathbb{P})$, $\varphi_0 \in C$, $y_0(t_0+\theta)$ is $\mathcal{F}_{t_0}$ measurable, the filtration function $(\mathcal{F})_{t \geq 0}$ is right-continuous, each $\mathcal{F}_t$ with $t \geq t_0$ contains all $\mathbb{P}$-null events in F, and the solution process $y(t_0, \varphi_0)(t)$ is adapted and non-anticipating with respect to $(\mathcal{F})_{t \geq 0}$.

3.1 Transformation of System of Stochastic Differential Equations (12)

At reference numeral 206, the process 200 includes generating a DTIDMLSMVSP based on the stochastic model of the continuous time dynamic process. As part of the conceptual aspects of generating the DTIDMLSMVSP, at reference numeral 206, the process 200 can include transforming the stochastic model of the continuous time dynamic process into a stochastic model of a discrete time dynamic process utilizing a discretization scheme. For example, let $V \in C[[-\tau, \infty] \times \Re^q, \Re^m]$. Its partial derivatives $V_t$, $$V_t, \frac{\partial V}{\partial y}, \frac{\partial^2 V}{\partial y^2}$$

exist and are continuous. The Itô-Doob stochastic differential formula can be applied to V to obtain $$dV(t, y) = LV(t, y, y_t)dt + V_y(t, y)\sigma(t, y_t)dW(t), \quad (13)$$

where the L operator is defined by $$\begin{cases} LV(t, y, y_t) = V_t(t, y) + V_y(t, y)f(t, y_t) + \frac{1}{2}tr(V_{yy}(t, y)b(t, y_t)) \\ b(t, y_t) = \sigma(t, y_t)\sigma^T(t, y_t). \end{cases} \quad (14)$$

3.2 Euler-Type Discretization Scheme for (12) and (13)

For (12) and (13), the Euler-type discretization scheme can be presented as $$\begin{cases} \Delta y_i = \begin{aligned} & f(t_{i-1}, y_{t_{i-1}})\Delta t_i + \\ & \sigma(t_{i-1}, y_{t_{i-1}})\Delta W_{i-1}, i \in I_1(N) \end{aligned} \\ \Delta V(t_i, y(t_i)) = \begin{aligned} & LV(t_{i-1}, y(t_i), y_{t_{i-1}})\Delta t_i + \\ & V_y(t_{i-1}, y(t_{i-1}))\sigma(t_{i-1}, y_{t_{i-1}})\Delta W(t_i) \end{aligned} \end{cases}, \quad (15)$$

and $\mathcal{F}_{t_{i-1}} \equiv \mathcal{F}_{i-1}$ can be defined as the filtration process up to time $t_{i-1}$.

3.3 Formation of Generalized Moment Equations from (15)

As another part of the conceptual aspects of generating the DTIDMLSMVSP, at reference numeral 206, the process 200 can also include developing a system of generalized method of moments equations from the stochastic model of the discrete time dynamic process. For example, with regard to the continuous time dynamic system (12) and its transformed system (13), the more general moments of $\Delta y(t_i)$ are:

$$\begin{cases} E[\Delta y(t_i) | \mathcal{F}_{i-1}] & = f(t_{i-1}, y_{t_{i-1}})\Delta t_i, \\ E[(\Delta y(t_i) - E[\Delta y(t_i) | \mathcal{F}_{i-1}]) & \quad \sigma(t_{i-1}, y_{t_{i-1}}) \\ (\Delta y(t_i) - E[\Delta y(t_i) | \mathcal{F}_{i-1}])^T | \mathcal{F}_{i-1}] & = \sigma^T(t_{i-1}, y_{t_{i-1}})\Delta t_i, \\ E[\Delta V(t_i, y(t_i)) | \mathcal{F}_{i-1}] & = LV(t_{i-1}, y(t_i), y_{t_{i-1}})\Delta t_i, \\ E[(\Delta V(t_i, y(t_i)) - E[\Delta V(t_i, y(t_i))] & \\ | \mathcal{F}_{i-1}])(\Delta V(t_i, y(t_i)) - & = B(t_{i-1}, y(t_{i-1}), y_{t_{i-1}}) \\ E[\Delta V(t_i, y(t_i)) | \mathcal{F}_{i-1}])^T | \mathcal{F}_{i-1}] & \end{cases}$$

where $B(t_{i-1}, y(t_{i-1}), y_{t_{i-1}}) = V_y(t_{i-1}, y(t_{i-1}))b(t_{i-1}, y_{t_{i-1}})V_y(t_{i-1}, y(t_{i-1}))^T \Delta t$, and T stands for the transpose of the matrix.

3.4 Basis for Local Lagged Adaptive Discrete Time Expectation Process

From (15) and (16), $$\begin{cases} \Delta y_i = \begin{aligned} & E[\Delta y(t_i) | \mathcal{F}_{i-1}] + \\ & \sigma(t_{i-1}, y_{t_{i-1}})\Delta W_{i-1}, i \in I_1(N) \end{aligned} \\ \Delta V(t_i, y(t_i)) = \begin{aligned} & E[\Delta V(t_i, y(t_i)) | \mathcal{F}_{i-1}] + \\ & V_y(t_{i-1}, y(t_{i-1}))\sigma(t_{i-1}, y_{t_{i-1}})\Delta W(t_i) \end{aligned} \end{cases} \quad (17)$$

This provides the basis for the development of the concept of lagged adaptive expectation with respect to continuous time stochastic dynamic systems (12) and (13). This also leads to a formulation of $m_k$-local generalized method of moments at $t_k$.

Remark 7.

(Block Orthogonality Condition Vector for (12) and (13)). From (17), one can define a block vector of orthogonality condition as $$H(t_{i-1}, y(t_i), y(t_{i-1})) = \begin{pmatrix} \Delta y(t_i) - f(t_{i-1}, y(t_{i-1}))\Delta t_i \\ \Delta V(t_{i-1}, y(t_i)) - LV(t_{i-1}, y(t_{i-1}), y_{t_{i-1}}))\Delta t_i \end{pmatrix}. \quad (18)$$

Further, unlike the orthogonality condition vector defined in the literature, the definition of the block vector of orthogonality condition (18) is based on the discretization scheme associated with nonlinear and non-stationary continuous-time stochastic system of differential equations (12) and (13) and the Itô-Doob stochastic differential calculus.

Example 1

For V(t, y) in (13) defined by $$V(t, y) = \|y\|_p^p = \sum_{j=1}^n |y^j|^p, \quad (19)$$

$$dV = \left[ p \sum_{j=1}^n |y^j|^{p-1} \text{sgn}(y^j) f(t, y_t^j) + \frac{p(p-1)}{2} |y^j|^{p-2} \sigma(t, y_t^j) \right] dt +$$

$$p \sum_{j=1}^n |y^j|^{p-1} \text{sgn}(y^j) \sigma(t, y_t^j) dW^j.$$

Hence, the discretized form of (19) is given by $$\Delta V_i = \left[ p \sum_{j=1}^n |y_{i-1}^j|^{p-1} \text{sgn}(y_{i-1}^j) f(t_{i-1}, y_{t_{i-1}}^j) + \right. \quad (20)$$

-continued $$\left.\frac{p(p-1)}{2}|y_{i-1}^j|^{p-2}\sigma(t_{i-1},y_{t_{i-1}}^j)\right]dt +$$

$$p\sum_{j=1}^{n}|y_{i-1}^j|^{p-1}\mathrm{sgn}(y_{i-1}^j)\sigma(t_{i-1},y_{t_{i-1}}^j)dW_i^j.$$

In this special case, (17) reduces to $$\begin{cases} \Delta y_i = \begin{array}{l} E[\Delta y(t_i)|\mathcal{F}_{i-1}] + \\ \sigma(t_{i-1},y_{t_{i-1}})\Delta W_{i-1}, i \in I_1(N) \end{array} \\ \Delta\left(\sum_{j=1}^{n}|y_i^j|^p\right) = \begin{array}{l} E\left[\Delta\left(\sum_{j=1}^{n}|y_i^j|^p\right)\Big|\mathcal{F}_{i-1}\right] + \\ p\sum_{j=1}^{n}|y_{i-1}^j|^{p-1}\mathrm{sgn}(y_{i-1}^j) \\ \sigma(t_{i-1},y_{t_{i-1}}^j)dW_i^j \end{array} \end{cases} \quad (21)$$

Example 2

We consider a multivariate AR(1) model as another example to exhibit the parameter and state estimation problem. The AR(1) model is of the following type $$x_t = a_{t-1}x_{t-1} + \sigma_{t-1}e_t, x(0) = x_0, \text{ for } t=0,1,2,\ldots, \\ t,\ldots,N, \quad (22)$$

where $x_t, x_0 \in \Re^n$, $e_t \in \Re^m$ is $\mathcal{F}_t$ a measurable normalized discrete time Gaussian process, and $a_{t-1}$ and $\sigma_{t-1}$ are n×n and n×m discrete time varying matrix functions, respectively. Here $$\begin{pmatrix} E[x_t|\mathcal{F}_{t-1}] \\ E[x_t x_t^T|\mathcal{F}_{t-1}] \end{pmatrix} = \begin{pmatrix} a_{t-1}x_{t-1} \\ a_{t-1}x_{t-1}(a_{t-1}x_{t-1})^T + \sigma_{t-1}(\sigma_{t-1})^T \end{pmatrix}. \quad (23)$$

In this case, the block orthogonality condition vector is based on a multivariate stochastic system of difference equation and difference calculus for (22) and (23), given by $$H(t_{i-1},x_t,x_{t-1},a_{t-1},\sigma_{t-1}) = \begin{pmatrix} x_t - a_{t-1}x_{t-1} \\ \Delta V(x_t) - LV(t,x_{t-1})\Delta t \end{pmatrix}, \quad (24)$$

where $\Delta$ and $L$ are difference and L operators with respect to $V = x_t x_t^T$ for $x \in \Re^n$, and are defined by $$\begin{cases} \Delta V(x_t) = V(x_t) - V(x_{t-1}), \text{ for } t=1,2,\ldots,t,\ldots,N \\ LV(t,x_{t-1}) = a_{t-1}x_{t-1}((2+a_{t-1})x_{t-1})^T + \sigma_{t-1}\sigma_{t-1}^T \end{cases}, \quad (25)$$

and differential of V with respect to multivariate difference system (22) parallel to continuous-time version (13) is as:

$$\Delta V(x_t) = a_{t-1}x_{t-1}((2+a_{t-1})x_{t-1})^T + \sigma_{t-1}\sigma_{t-1}^T + 2(1+a_{t-1}x_{t-1})(\sigma_{t-1}e_t)^T. \quad (26)$$

From the above, it is clear that the orthogonality condition parameter vector in (24) is constructed with respect to multivariate stochastic system of difference equations and elementary difference calculus.

Remark 8.

From the transformation of system of stochastic differential equations (13) in Sub-section 3.1, the construction of Euler-type Discretization Scheme for (12) and (13) in Sub-section 3.2, the Formation of Generalized Moment Equations from (15) in Sub-section 3.3, and the Basis for Local Lagged Adaptive Discrete time Expectation Process in Sub-section 3.4, the system is in the correct framework for mathematical reasoning, logical, and interconnected/interactive within the context of the continuous-time dynamic system (12).

Further, a continuous-time state dynamic process described by systems of stochastic differential equations (12) moves forward in time. The theoretical parameter estimation procedure in this section adapts to and incorporates the continuous-time changes in the state and parameters of the system and moves into a discrete time theoretical numerical schemes in (15) as a model validation of (12). It further successively moves in the local moment equations within the context of local lagged adaptive, local discrete time statistic and computational processes in a natural, systematic, and coherent manner. On the other hand, the existing OCBGMM approach is "single-shot" with a global approach, and it is highly dependent on the second component of the OCBGMM. That is, the use of either Euler-type discretization scheme or a discrete time econometric specification regarding the stochastic differential equation. We refer to OCBGMM as the single-shot or global approach with formation of a single moment equation in a quadratic form.

Below, a result is stated that exhibits the existence of solution of system of non linear algebraic equations. For the sake of reference, the Implicit Function Theorem is stated without proof.

Theorem 2 (Implicit Function Theorem).

Let $F = \{F_1, F_2, \ldots, F_q\}$ be a vector-valued function defined on an open set $S \in \Re^{q+k}$ with values in $\Re^q$. Suppose $F \in C'$ on $S$. Let $(u_0; v_0)$ be a point in $S$ for which $F(u_0; v_0) = 0$ and for which the q×q determinant $\det[D_j F_i(u_0; v_0)] \neq 0$. Then there exists a k-dimensional open set $T_0$ containing $v_0$ and unique vector-valued function g, defined on $T_0$ and having values in $\Re^q$, such that $g \in C'$ on $T_0$, $g(v_0) = u_0$, and $F(g(v); v) = 0$ for every $v \in T_0$.

Illustration 1: Dynamic Model for Energy Commodity Price.

As one example, the stochastic dynamic model of energy commodities described by the following nonlinear stochastic differential equation is considered:

$$dy = ay(\mu - y)dt + \sigma(t, y_t)y dW(t), y_{t_0} = \varphi_0, \quad (27)$$

where $y_t(\theta) = y(t+\theta)$; $\theta \in [-\tau, 0]$, $\mu$, $a \in \Re$, the initial process $\varphi_0 = \{y(t_0 + \theta)\}_{\theta \in [-\tau, 0]}$ is $\mathcal{F}_{t_0}$—measurable and independent of $\{W(t), t \in [0,T]\}$, $W(t)$ is a standard Wiener process defined in (12), $\sigma: [0, T] \times C \to \Re^+$ is a Lipschitz continuous and bounded functional, and C is the Banach space of continuous functions defined on $[-\tau, 0]$ into $\Re$ equipped with the supremum norm.

Transformation of Stochastic Differential Equation (27).

A Lyapunov function $V(t,y) = \ln(y)$ in (13) is picked for (27). Using Itô-differential formula, $$d(\ln(y)) = \left[a(\mu - y) - \frac{1}{2}\sigma^2(t, y_t)\right]dt + \sigma(t, y_t)dW. \quad (28)$$

The Euler-Type Discretization Schemes for (27) and (28).

By setting $\Delta t_i = t_i - t_{i-1}$, $\Delta y_i = y_i - y_{i-1}$, the combined Euler discretized scheme for (27) and (28) is $$\begin{cases} \Delta y_i &= \begin{aligned} & ay_{i-1}(\mu - y_{i-1})\Delta t_i + \\ & \sigma(t_{i-1}, y_{t_{i-1}})y_{i-1}\Delta W(t_i), \; y_{t_0} = \varphi_0, \end{aligned} \\ \Delta(\ln(y_i)) &= \begin{aligned} & \left[a(\mu - y_{i-1}) - \frac{1}{2}\sigma^2(t_{i-1}, y_{t_{i-1}})\right] \\ & \Delta t_i + \sigma(t_{i-1}, y_{t_{i-1}})\Delta W(t_i), \; y_{t_0} = \varphi_0. \end{aligned} \end{cases} \quad (29)$$

where $\varphi_0 = \{y_i\}_{i=-r}^0$ is a given finite sequence of $\mathcal{F}_0$-measurable random variables, and it is independent of $\{\Delta W(t_i)\}_{i=0}^N$.

Generalized Moment Equations.

Applying conditional expectation to (29) with respect to $$\mathcal{F}_{t_{i-1}} \equiv \mathcal{F}_{i-1}, \quad (30)$$

$$\mathbb{E}[\Delta y_i \mid \mathcal{F}_{i-1}] = ay_{i-1}(\mu - y_{i-1})\Delta t$$

$$\mathbb{E}[\Delta(\ln(y_i)) \mid \mathcal{F}_{i-1}] = \left[a(\mu - y_{i-1}) - \frac{1}{2}\sigma^2(t_{i-1}, y_{t_{i-1}})\right]\Delta t.$$

$$\mathbb{E}[(\Delta(\ln(y_i)) - \mathbb{E}[\Delta(\ln(y_i)) \mid \mathcal{F}_{i-1}])^2 \mid \mathcal{F}_{i-1}] = \sigma^2(t_{i-1}, y_{t_{i-1}})\Delta t.$$

Basis for Lagged Adaptive Discrete Time Expectation Process.

From (30), (29) reduces to $$\begin{cases} \Delta y_i &= \mathbb{E}[\Delta y_i \mid \mathcal{F}_{i-1}] + \sigma(t_{i-1}, y_{t_{i-1}})y_{i-1}\Delta W(t_i) \\ \Delta(\ln(y_i)) &= \mathbb{E}[\Delta(\ln(y_i)) \mid \mathcal{F}_{i-1}] + \sigma(t_{i-1}, y_{t_{i-1}})\Delta W(t_i) \end{cases}. \quad (31)$$

Equation (31) provides the basis for the development of the concept of lagged adaptive expectation process with respect to continuous time stochastic dynamic systems (27) and (28).

Remark 9. Orthogonality Condition Vector for (27) and (28).

Following Remark 7 and using (29), (30), and (31), the orthogonality condition vector with respect to continuous-time stochastic dynamic model (27) is represented by $$H(t_{i-1}, y(t_i), y(t_{i-1})) = \begin{pmatrix} \Delta y(t_i) - ay(t_{i-1})(\mu - y(t_{i-1}))\Delta t_i \\ \Delta \ln(y(t_i)) - L\ln(y(t_{i-1}), y_{t_{i-1}})\Delta t_i \\ (\Delta \ln(y(t_i)) - L\ln(y(t_{i-1}), y_{t_{i-1}})\Delta t_i)^2 - \sigma^2(t_{i-1}, y_{t_{i-1}})\Delta t_i \end{pmatrix}, \quad (32)$$

wherein L ln $$(y(t_{i-1}), y_{t_{i-1}})\Delta t_i = \left(a(\mu - y(t_{i-1})) - \frac{1}{2}\sigma^2(t_{i-1}, y_{t_{i-1}})\right)\Delta t_i.$$

Unlike the orthogonality condition vector defined in the literature, this orthogonality condition vector is based on the discretization scheme (29) associated with nonlinear continuous-time stochastic differential equations (27) and (28) and the Itô-Doob stochastic differential calculus.

Local Observation System of Algebraic Equations.

For $k \in I_0(N)$, applying the lagged adaptive expectation process from Definitions 3-7, and using (8) and (31), a local observation/measurement process is formulated at $t_k$ as one or more algebraic functions of $m_k$-local restriction sequence of the overall finite sample sequence $\{y_i\}_{i=-r}^N$ to a subpartition $P_k$ in Definition 2 as:

$$\begin{cases} \frac{1}{m_k}\sum_{i=k-m_k}^{k-1} \mathbb{E}[\Delta y_i \mid \mathcal{F}_{i-1}] &= \left[a\left[\frac{\mu}{m_k}\sum_{i=k-m_k}^{k-1} y_{i-1} - \frac{1}{m_k}\sum_{i=k-m_k}^{k-1} y_{i-1}^2\right]\Delta t,\right. \\ \frac{1}{m_k}\sum_{i=k-m_k}^{k-1} \mathbb{E}[\Delta(\ln(y_i)) \mid \mathcal{F}_{i-1}] &= \begin{aligned} & a\left[\mu - \frac{1}{m_k}\sum_{i=k-m_k}^{k-1} y_{i-1}\right]\Delta t - \\ & \frac{1}{2m_k}\sum_{i=k-m_k}^{k-1} \mathbb{E}[(\Delta(\ln(y_i)) - \\ & \mathbb{E}[\Delta(\ln(y_i)) \mid \mathcal{F}_{i-1}])^2 \mid \mathcal{F}_{i-1}], \end{aligned} \end{cases} \quad (33)$$

$$\hat{\sigma}_{m_k,k}^2 = \begin{cases} \frac{1}{m_k \Delta t}\sum_{i=k-m_k}^{k-1} \mathbb{E}[(\Delta(\ln(y_i)) - \mathbb{E}[\Delta(\ln(y_i)) \mid \mathcal{F}_{i-1}])^2 \mid \mathcal{F}_{i-1}] & \text{if } m_k \text{ is small} \\ \frac{1}{(m_k - 1)\Delta t}\sum_{i=k-m_k}^{k-1} \mathbb{E}[(\Delta(\ln(y_i)) - \mathbb{E}[\Delta(\ln(y_i)) \mid \mathcal{F}_{i-1}])^2 \mid \mathcal{F}_{i-1}] & \text{if } m_k \text{ is large.} \end{cases}$$

From the third equation in (33), it follows that the average volatility square $\hat{\sigma}_{m_k,k}^2$ is given by $$\hat{\sigma}_{m_k,k}^2 = \frac{s_{m_k,k}^2}{\Delta t}, \quad (34)$$

where $s_{m_k,k}^2$ is the local sample variance statistics for volatility at $t_k$ in the context of $x(t_i) = \Delta(\ln(y_i))$.

We define $$F_1(\mathbb{E}[\Delta y_i \mid \mathcal{F}_{i-1}], \mathbb{E}[\Delta(\ln y_i) \mid \mathcal{F}_{i-1}]; a, \mu) = \quad (35)$$

$$\frac{\sum_{i=k-m_k}^{k-1} \mathbb{E}[\Delta y_i \mid \mathcal{F}_{i-1}]}{m_k} - a\left[\mu \frac{\sum_{i=k-m_k}^{k-1} y_{i-1}}{m_k} - \frac{\sum_{i=k-m_k}^{k-1} y_{i-1}^2}{m_k}\right]\Delta t$$

$$F_2(\mathbb{E}[\Delta y_i \mid \mathcal{F}_{i-1}], \mathbb{E}[\Delta(\ln y_i) \mid \mathcal{F}_{i-1}]; a, \mu) =$$

$$\frac{1}{m_k}\sum_{i=k-m_k}^{k-1} \mathbb{E}[\Delta(\ln y_i) \mid \mathcal{F}_{i-1}] - a\left[\mu - \frac{1}{m_k}\sum_{i=k-m_k}^{k-1} y_{i-1}\right]\Delta t + \frac{s_{m_k,k}^2}{2}.$$

Then, we have $$\begin{cases} F_1(\mathbb{E}[\Delta y_i \mid \mathcal{F}_{i-1}], \mathbb{E}[\Delta(\ln y_i) \mid \mathcal{F}_{i-1}]; a, \mu) &= 0, \\ F_2(\mathbb{E}[\Delta y_i \mid \mathcal{F}_{i-1}], \mathbb{E}[\Delta(\ln y_i) \mid \mathcal{F}_{i-1}]; a, \mu) &= 0. \end{cases} \quad (36)$$

Let $F=\{F_1, F_2\}$. The determinant of the Jacobian matrix of F is given by $$JF(a, \mu) = -\frac{a}{m_k}\left[\sum_{i=k-m_k}^{k-1} y_{i-1}^2 - \frac{1}{m_k}\left(\sum_{i=k-m_k}^{k-1} y_{i-1}\right)^2\right](\Delta t)^2 = \quad (37)$$

$$-a\operatorname{var}\left(y(t_{i-1})_{i=k-m_k}^{k-1}\right)(\Delta t)^2 \neq 0,$$

provided that $a \neq 0$ or the sequence $\{x(t_{i-1})\}_{i=-r+1}^{N}$ is neither zero nor a constant. This fulfils the hypothesis of Theorem 2.

Thus, by the application of Theorem 2 (Implicit Function Theorem), we conclude that for every non-constant $m_k$-local sequence $\{x(t_i)\}_{i=k-m_k}^{k-1}$, there exists a unique solution of system of algebraic equations (36), $\hat{a}_{m_k,k}$ and $\hat{\mu}_{m_k,k}$ as a point estimates of $a$ and $\mu$, respectively.

We also note that the estimated values of $a$ and $\mu$ change at each time $t_k$. For instance, at time $t_0=0$ and the given $\mathcal{F}_{-1}$ measurable discrete time process $y_{-r+1}, y_{-r+2}, \ldots, y_{-1}$, (33) reduces to $$\begin{cases} \dfrac{1}{m_0}\sum_{i=-m_0}^{0} \Delta y_i &= a\left[\dfrac{\mu}{m_0}\sum_{i=-m_0}^{0} y_{i-1} - \dfrac{1}{m_0}\sum_{i=-m_0}^{0} y_{i-1}^2\right]\Delta t, \\ \dfrac{1}{m_0}\sum_{i=-m_0}^{0} \Delta(\ln y_i) &= a\left[\mu - \dfrac{1}{m_0}\sum_{i=-m_0}^{0} y_{i-1}\right]\Delta t - \dfrac{s_{m_0,0}^2}{2}, \\ \hat{\sigma}_{m_0,0}^2 &= \dfrac{s_{m_0,0}^2}{\Delta t}. \end{cases} \quad (38)$$

The initial solution of algebraic equations (38) at time $t_0$ is given by $$\begin{cases} \hat{a}_{m_0,0} = \dfrac{\left(\dfrac{1}{m_0}\sum_{i=-m_0}^{0}\Delta(\ln y_i) + \dfrac{s_{m_0,0}^2}{2}\right)\left(\dfrac{1}{m_0}\sum_{i=-m_0}^{0} y_{i-1}\right) - \dfrac{1}{m_0}\sum_{i=-m_0}^{0}\Delta y_i}{\dfrac{1}{m_0}\left[\sum_{i=-m_0}^{0} y_{i-1}^2 - \dfrac{1}{m_0}\left(\sum_{i=-m_0}^{0} y_{i-1}\right)^2\right]\Delta t}, \\ \hat{\mu}_{m_0,0} = \dfrac{\dfrac{1}{m_0\Delta t}\sum_{i=-m_0}^{0}\Delta(\ln y_i) + \dfrac{s_{m_0,0}^2}{2\Delta t} + \dfrac{\hat{a}_{m_0,0}}{m_0}\left(\sum_{i=-m_0}^{0} y_{i-1}\right)}{\hat{a}_{m_0,0}}, \\ \hat{\sigma}_{m_0,0}^2 = \dfrac{s_{m_0,0}^2}{\Delta t}. \end{cases} \quad (39)$$

At time $t_1=1$ and the given $\mathcal{F}_0$ measurable discrete time process $y_{-r}, y_{-r+1}, \ldots, y_{-1}, y_0$, (33) reduces to $$\begin{cases} \dfrac{1}{m_1}\sum_{i=1-m_1}^{0} \Delta y_i &= a\left[\dfrac{\mu}{m_1}\sum_{i=1-m_1}^{0} y_{i-1} - \dfrac{1}{m_1}\sum_{i=1-m_1}^{0} y_{i-1}^2\right]\Delta t, \\ \dfrac{1}{m_1}\sum_{i=1-m_1}^{0} \Delta(\ln y_i) &= a\left[\mu - \dfrac{1}{m_1}\sum_{i=1-m_1}^{0} y_{i-1}\right]\Delta t - \dfrac{s_{m_1,1}^2}{2}, \\ \hat{\sigma}_{m_1,1}^2 &= \dfrac{s_{m_1,1}^2}{\Delta t}. \end{cases} \quad (40)$$

The solution of algebraic equations (40) is given by $$\begin{cases} \hat{a}_{m_1,1} = \dfrac{\left(\dfrac{1}{m_1}\sum_{i=1-m_1}^{0}\Delta(\ln y_i) + \dfrac{s_{m_1,1}^2}{2}\right)\left(\dfrac{1}{m_1}\sum_{i=1-m_1}^{0} y_{i-1}\right) - \dfrac{1}{m_1}\sum_{i=1-m_1}^{0}\Delta y_i}{\dfrac{1}{m_1}\left[\sum_{i=1-m_1}^{0} y_{i-1}^2 - \dfrac{1}{m_1}\left(\sum_{i=1-m_1}^{0} y_{i-1}\right)^2\right]\Delta t}, \\ \hat{\mu}_{m_1,1} = \dfrac{\dfrac{1}{m_1\Delta t}\sum_{i=1-m_1}^{0}\Delta(\ln y_i) + \dfrac{s_{m_1,1}^2}{2\Delta t} + \dfrac{\hat{a}_{m_1,1}}{m_1}\left(\sum_{i=1-m_1}^{0} y_{i-1}\right)}{\hat{a}_{m_1,1}}, \\ \hat{\sigma}_{m_1,1}^2 = \dfrac{s_{m_1,1}^2}{\Delta t}. \end{cases} \quad (41)$$

Likewise, for $k=2$, we have $$\begin{cases} \hat{a}_{m_2,2} = \dfrac{\left(\dfrac{1}{m_2}\sum_{i=2-m_2}^{1}\Delta(\ln y_i) + \dfrac{s_{m_k,k}^2}{2}\right)\left(\dfrac{1}{m_2}\sum_{i=2-m_2}^{1} y_{i-1}\right) - \dfrac{1}{m_2}\sum_{i=2-m_2}^{1}\Delta y_i}{\dfrac{1}{m_2}\left[\sum_{i=2-m_2}^{1} y_{i-1}^2 - \dfrac{1}{m_2}\left(\sum_{i=2-m_2}^{1} y_{i-1}\right)^2\right]\Delta t}, \\ \hat{\mu}_{m_2,2} = \dfrac{\dfrac{1}{m_2\Delta t}\sum_{i=2-m_2}^{1}\Delta(\ln y_i) + \dfrac{s_{m_2,2}^2}{2\Delta t} + \dfrac{\hat{a}_{m_2,2}}{m_2}\left(\sum_{i=2-m_2}^{1} y_{i-1}\right)}{\hat{a}_{m_2,2}}, \\ \hat{\sigma}_{m_2,2}^2 = \dfrac{s_{m_2,2}^2}{\Delta t}. \end{cases} \quad (42)$$

Hence, from (33) and applying the principle of mathematical induction, we have $$\begin{cases} \hat{a}_{m_k,k} = \dfrac{\left(\dfrac{1}{m_k}\sum_{i=k-m_k}^{k-1}\Delta(\ln y_i) + \dfrac{s_{m_k,k}^2}{2}\right)\left(\dfrac{1}{m_k}\sum_{i=k-m_k}^{k-1} y_{i-1}\right) - \dfrac{1}{m_k}\sum_{i=k-m_k}^{k-1}\Delta y_i}{\dfrac{1}{m_k}\left[\sum_{i=k-m_k}^{k-1} y_{i-1}^2 - \dfrac{1}{m_k}\left(\sum_{i=k-m_k}^{k-1} y_{i-1}\right)^2\right]\Delta t}, \\ \hat{\mu}_{m_k,k} = \dfrac{\dfrac{1}{m_k\Delta t}\sum_{i=k-m_k}^{k-1}\Delta(\ln y_i) + \dfrac{s_{m_k,k}^2}{2\Delta t} + \dfrac{\hat{a}_{m_k,k}}{m_k}\left(\sum_{i=k-m_k}^{k-1} y_{i-1}\right)}{\hat{a}_{m_k,k}}, \\ \hat{\sigma}_{m_k,k}^2 = \dfrac{s_{m_k,k}^2}{\Delta t}. \end{cases} \quad (43)$$

Remark 10.

We note that without loss in generality, the discrete time data set $\{y_{-r+i}: i \in I_1(r-1)\}$ is assumed to be close to the true values of the solution process of the continuous-time dynamic process. This assumption is feasible in view of the uniqueness and continuous dependence of solution process of stochastic functional or ordinary differential equation with respect to the initial data.

Remark 11.

If the sample $\{y_i\}_{i=k-m_k-1}^{k-1}$ is a constant sequence, then it follows from (43) and the fact that $\Delta(\ln y_i)=0$ and $s_{m_k,k}^2=0$, that $$\hat{\mu}_{m_k,k} \to \frac{1}{m_k}\sum_{i=k-m_k}^{k-1} y_{i-1}.$$

Hence, it follows from (33) that $\hat{a}_{m_k,k}=0$.

Remark 12.

The estimated parameters a, $\mu$, and $\sigma^2$ depend upon the time at which data point is drawn. This is expected because of the nonlinearity of the dynamic model together with environmental stochastic perturbations generate non stationary solution process. Using this locally estimated parameters of the continuous-time dynamic system, we can find the average of these local parameters over the entire size of data set as follows:

$$\begin{cases} \overline{a} = \frac{1}{N}\sum_{i=0}^{N} a_{\hat{m}_i,i}, \\ \overline{\mu} = \frac{1}{N}\sum_{i=0}^{N} \mu_{\hat{m}_i,i}, \\ \overline{\sigma^2} = \frac{1}{N}\sum_{i=0}^{N} \sigma_{\hat{m}_i,i}^2. \end{cases} \quad (44)$$

Here, $\overline{a}$, $\overline{\mu}$, and $\overline{\sigma^2}$ are referred to as aggregated parameter estimates of a, $\mu$, and $\sigma^2$ over the given entire finite interval of time, respectively.

Remark 13.

The DTIDMLSMVSP and its transformation of data are utilized in (33), (34), (35), (43), and (44) for updating statistic coefficients of equations in (30). This accelerates the computation process. Furthermore, the DTIDMLSMVSP plays a significant role in the local discretization and model validation errors.

Illustration 2: Dynamic Model for U.S. Treasury Bill Interest Rate and the USD-EUR Exchange Rate.

As noted above, at reference numeral 204 in FIG. 2, the process 200 includes developing a stochastic model of a continuous time dynamic process. As another example of this, the scheme presented above can be applied for estimating parameters of a continuous-time model for U.S. Treasury Bill Interest Rate and USD-EUR Exchange Rate processes. By employing dynamic modeling process, a continuous time dynamic model of interest rate process under random environmental perturbations can be described by $$dy=(\beta y+\mu y^\delta)dt+\sigma y^\gamma dW(t), y(t_0)=y_0, \quad (45)$$

where $\beta$, $\mu$, $\delta$, $\sigma$, $\gamma \in \Re$; $y(t, t_0, y_0)$ is adapted, non-anticipating solution process with respect to $\mathcal{F}_t$, the initial process $y_0$ is $\mathcal{F}_{t_0}$ measurable and independent of $\{W(t), t \in [t_0, T]\}$, and $W(t)$ is a standard Wiener process defined on a filtered probability space $(\Omega, \mathcal{F}, (\mathcal{F})_{t\geq 0}, \mathbb{P})$.

Transformation of Stochastic Differential Equation (45).

As part of the conceptual aspects of generating the DTIDMLSMVSP, at reference numeral 206 in FIG. 2, process 200 can include transforming the stochastic model of the continuous time dynamic process into a stochastic model of a discrete time dynamic process utilizing a discretization scheme. As another example of this, for (45), the Lyapunov functions $V_1(t,y)=\frac{1}{2}y^2$ and $V_2(t,y)=\frac{1}{3}y^3$ as in (13) are considered. The Itô-differentials of $V_i$, for i=1, 2, are given by $$\begin{cases} dV_1 = \left[y(\beta y+\mu y^\delta)+\frac{1}{2}\sigma^2 y^{2\gamma}\right]dt+\sigma y^{\gamma+1}dW \\ dV_2 = [y^2(\beta y+\mu y^\delta)+\sigma^2 y^{2\gamma+1}]dt+\sigma y^{\gamma+2}dW \end{cases} \quad (46)$$

The Euler-Type Numerical Schemes for (45) and (46)).

Following the approach in Section 3.5, the Euler discretized scheme (Delta=1) for (45) is defined by $$\begin{cases} \Delta y_i = (\beta y_{i-1}+\mu y_{i-1}^\delta)+\sigma y_{i-1}^\gamma \Delta W(t_i) \\ \frac{1}{2}\Delta(y_i^2) = y_{i-1}(\beta y_{i-1}+\mu y_{i-1}^\delta)+\frac{1}{2}\sigma^2 y_{i-1}^{2\gamma}+\sigma y_{i-1}^{\gamma+1}\Delta W_i \\ \frac{1}{3}\Delta(y_i^3) = y_{i-1}^2(\beta y_{i-1}+\mu y_{i-1}^\delta)+\sigma^2 y_{i-1}^{2\gamma+1}+\sigma y_{i-1}^{\gamma+2}\Delta W_i \end{cases} \quad (47)$$

Generalized Moment Equations.

As another part of the conceptual aspects of generating the DTIDMLSMVSP, at reference numeral 206 in FIG. 2, the process 200 can also include developing a system of generalized method of moments equations from the stochastic model of the discrete time dynamic process. As another example of this, applying conditional expectation to (47) with respect to $\mathcal{F}_{i-1}$, $$\begin{aligned} \mathbb{E}[\Delta y_i | \mathcal{F}_{i-1}] &= \beta y_{i-1}+\mu y_{i-1}^\delta \\ \frac{1}{2}\mathbb{E}[\Delta(y_i^2)|\mathcal{F}_{i-1}] &= \beta y_{i-1}^2+\mu y_{i-1}^{\delta+1}+\frac{1}{2}\sigma^2 y_{i-1}^{2\gamma} \\ \frac{1}{3}\mathbb{E}[\Delta(y_i^3)|\mathcal{F}_{i-1}] &= \beta y_{i-1}^3+\mu y_{i-1}^{\delta+2}+\frac{1}{2}\sigma^2 y_{i-1}^{2\gamma+1} \\ \mathbb{E}[(\Delta y_i-\mathbb{E}[\Delta y_i|\mathcal{F}_{i-1}])^2|\mathcal{F}_{i-1}] &= \sigma^2 y_{i-1}^{2\gamma}, \\ \frac{1}{4}\mathbb{E}[(\Delta(y_i^2)\mathbb{E}[\Delta(y_i^2)])^2|\mathcal{F}_{i-1}] &= \sigma^2 y_{i-1}^{2\gamma+2} \end{aligned} \quad (48)$$

Basis for Lagged Adaptive Discrete Time Expectation Process.

From (48), (47) reduces to $$\begin{cases} \Delta y_i = \mathbb{E}[\Delta y_i|\mathcal{F}_{i-1}]+\sigma y_{i-1}^\gamma \Delta W(t_i) \\ \frac{1}{2}\Delta(y_i^2) = \frac{1}{2}\mathbb{E}[\Delta(y_i^2)|\mathcal{F}_{i-1}]+\sigma y_{i-1}^{\gamma+1}\Delta W_i \\ \frac{1}{3}\Delta(y_i^3) = \frac{1}{3}\mathbb{E}[\Delta(y_i^3)|\mathcal{F}_{i-1}]+\sigma y_{i-1}^{\gamma+2}\Delta W_i \end{cases} \quad (49)$$

Remark 14. (Orthogonality Condition Vector for (45) and (46)).

Again, imitating Remarks 7, 8 and 9 in the context of (45), (46), (47), (48), and (49), the orthogonality condition vector with respect to the continuous-time stochastic dynamic model (45) is $$H(t_{i-1}, y(t_i), y(t_{i-1})) = \tag{50}$$

$$\begin{pmatrix} \Delta y(t_i) - (\beta y(t_{i-1}) + \mu y^\delta(t_{i-1}))\Delta t_i \\ \frac{1}{2}\Delta(y^2(t_i)) - L(y^2(t_{i-1}))\Delta t_i \\ \frac{1}{3}\Delta(y^3(t_i)) - L(y^3(t_{i-1}))\Delta t_i \\ (y(t_i) - (\beta y(t_{i-1}) + \mu y^\delta(t_{i-1}))\Delta t_i)^2 - \sigma^2 y^{2\gamma}(t_{i-1})\Delta t_i \\ \left(\frac{1}{2}\Delta(y^2(t_i)) - L(y^2(t_{i-1}))\Delta t_i\right)^2 - \sigma^2 y^{2\gamma+2}(t_{i-1})\Delta t_i \end{pmatrix},$$

where $$L(y^2(t_{i-1}))\Delta t_i = \left(y(t_{i-1})(\beta y(t_{i-1}) + \mu y^\delta(t_{i-1})) + \frac{1}{2}\sigma^2 y^{2\gamma}(t_{i-1})\right)\Delta t_i$$

and $$L(y^3(t_{i-1}))\Delta t_i = (y^2(t_{i-1})(\beta y(t_{i-1}) + \mu y^\delta(t_{i-1})) + \sigma^2 y^{2\gamma+1}(t_{i-1}))\Delta t_i.$$

Further, unlike other orthogonality condition vectors, this orthogonality condition vector is based on the discretization scheme (47) associated with nonlinear continuous-time stochastic differential equations (45) and (46).

Local Observation System of Algebraic Equations.

Following the argument used in (33), for $k \in I_0(N)$, applying the lagged adaptive expectation process from Definitions 3-7, and using (8) and (48), we formulate a local observation/measurement process at $t_k$ as a algebraic functions of $m_k$-local functions of restriction of the overall finite sample sequence $\{y_i\}_{i=-r}^N$ to subpartition P in Definition 2, as $$\frac{1}{m_k}\sum_{i=k-m_k}^{k-1} \mathbb{E}[\Delta y_i | \mathcal{F}_{i-1}] = \beta \frac{\sum_{i=k-m_k}^{k-1} y_{i-1}}{m_k} + \mu \frac{\sum_{i=k-m_k}^{k-1} y_{i-1}^\delta}{m_k} \tag{51}$$

$$\frac{1}{2m_k}\sum_{i=k-m_k}^{k-1} [\mathbb{E}[\Delta(y_i^2) | \mathcal{F}_{i-1}] - \mathbb{E}[(\Delta y_i \mathbb{E}[\Delta y_i | \mathcal{F}_{i-1}])^2 | \mathcal{F}_{i-1}]] = \beta \frac{\sum_{i=k-m_k}^{k-1} y_{i-1}^2}{m_k} + \mu \frac{\sum_{i=k-m_k}^{k-1} y_{i-1}^{\delta+1}}{m_k}$$

$$\frac{1}{m_k}\sum_{i=k-m_k}^{k-1} \left[\frac{1}{3}\mathbb{E}[\Delta(y_i^3) | \mathcal{F}_{i-1}] - \sigma^2 y_{i-1}^{2\gamma+1}\right] = \beta \frac{\sum_{i=k-m_k}^{k-1} y_{i-1}^3}{m_k} + \mu \frac{\sum_{i=k-m_k}^{k-1} y_{i-1}^{\delta+2}}{m_k}$$

$$\frac{1}{m_k}\sum_{i=k-m_k}^{k-1} \mathbb{E}[(\Delta y_i - \mathbb{E}[\Delta y_i | \mathcal{F}_{i-1}])^2 | \mathcal{F}_{i-1}] = \sigma^2 \frac{\sum_{i=k-m_k}^{k-1} y_{i-1}^{2\gamma}}{m_k},$$

$$\frac{1}{4m_k}\sum_{i=k-m_k}^{k-1} \mathbb{E}[(\Delta(y_i^2) - \mathbb{E}[\Delta(y_i^2)])^2 | \mathcal{F}_{i-1}] = \sigma^2 \frac{\sum_{i=k-m_k}^{k-1} y_{i-1}^{2\gamma+2}}{m_k}.$$

Following the approach discussed in Section 5, the solution of $\sigma_{m_k,k}$ is given by $$\sigma_{m_k,k} = \left[\frac{s_{m_k,k}^2}{\frac{1}{m_k}\sum_{i=k-m_k}^{k-1} y_{i-1}^{2\gamma_{m_k,k}}}\right]^{1/2}, \tag{52}$$

and $\gamma_{m_k,k}$ satisfies the following nonlinear algebraic equation $$s_{m_k,k}^2 \sum_{i=k-m_k}^{k-1} y_{i-1}^{2\gamma_{m_k,k}+2} - \frac{1}{4} s_{m_k,k}^2 \sum_{i=k-m_k}^{k-1} y_{i-1}^{2\gamma_{m_k,k}} = 0, \tag{53}$$

where $s_{m_k,k}^2$, and $s_{m_k,k}^2$ denotes the local moving variance of $\Delta y_i$ and $\Delta(y_i^2)$ respectively.

To solve for the parameters $\beta$ and $\mu$, and $\delta$, we define the conditional moment functions $$F_j \equiv F_j(\mathbb{E}[\Delta y_i | \mathcal{F}_{i-1}], \mathbb{E}[\Delta(y_i)^2 | \mathcal{F}_{i-1}], \mathbb{E}[\Delta(y_i)^3 | \mathcal{F}_{i-1}]), j = 1, 2, 3$$

as $$F_1 = \frac{1}{m_k}\sum_{i=k-m_k}^{k-1} \mathbb{E}[\Delta y_i | \mathcal{F}_{i-1}] - \beta \frac{\sum_{i=k-m_k}^{k-1} y_{i-1}}{m_k} - \mu \frac{\sum_{i=k-m_k}^{k-1} y_{i-1}^\delta}{m_k} \tag{54}$$

$$F_2 = \frac{\frac{1}{2m_k}\sum_{i=k-m_k}^{k-1} [\mathbb{E}[\Delta(y_i^2) | \mathcal{F}_{i-1}], \mathbb{E}[(\Delta y_i - \mathbb{E}[(\Delta y_i | \mathcal{F}_{i-1})^2 | \mathcal{F}_{i-1}]] - \beta \frac{\sum_{i=k-m_k}^{k-1} y_{i-1}^2}{m_k} - \mu \frac{\sum_{i=k-m_k}^{k-1} y_{i-1}^{\delta+1}}{m_k}$$

$$F_3 = \frac{\frac{1}{m_k}\sum_{i=k-m_k}^{k-1}\left[\frac{1}{3}\mathbb{E}[\Delta(y_i^3) | \mathcal{F}_{i-1}] - \sigma^2 y_{i-1}^{2\gamma+1}\right] -}{\beta \frac{\sum_{i=k-m_k}^{k-1} y_{i-1}^3}{m_k} - \mu \frac{\sum_{i=k-m_k}^{k-1} y_{i-1}^{\delta+2}}{m_k}}.$$

Using (51), we have $$\begin{cases} F_1 = 0 \\ F_2 = 0 \\ F_3 = 0 \end{cases} \tag{55}$$

Let $F = \{F_1, F_2, F_3\}$. The determinant of the Jacobian matrix of F is given by $$JF(\beta, \mu, \delta) = \qquad (56)$$

$$-\frac{1}{m_k^3} \det \begin{pmatrix} \sum_{i=k-m_k}^{k-1} y_{i-1} & \sum_{i=k-m_k}^{k-1} y_{i-1}^{\delta} & \sum_{i=k-m_k}^{k-1} (\ln y_{i-1}) y_{i-1}^{\delta} \\ \sum_{i=k-m_k}^{k-1} y_{i-1}^2 & \sum_{i=k-m_k}^{k-1} y_{i-1}^{\delta+1} & \sum_{i=k-m_k}^{k-1} (\ln y_{i-1}) y_{i-1}^{\delta+1} \\ \sum_{i=k-m_k}^{k-1} y_{i-1}^3 & \sum_{i=k-m_k}^{k-1} y_{i-1}^{\delta+2} & \sum_{i=k-m_k}^{k-1} (\ln y_{i-1}) y_{i-1}^{\delta+2} \end{pmatrix} \neq 0,$$

provided $\delta \neq 1$ and the sequence $\{y(t_{i-1})\}_{i=k-m_k}^{k-1}$ is neither zero nor a constant sequence. Thus, by the application of Theorem 2 (Implicit Function Theorem), we conclude that for every non-constant $m_k$-local sequence $\{y(t_i)\}_{i=k-m_k}^{k-1}$, $\delta \neq 1$, there exist a solution of system of algebraic equations (55) $\hat{\beta}_{m_k,k}$, $\hat{\mu}_{m_k,k-1}$, $\hat{\delta}_{m_k,k}$ as a point estimates of $\beta$ and $\mu$, and $\delta$ respectively.

The solution of system of algebraic equations (55) is given by $$\begin{cases} \hat{\mu}_{m_k,k} = \dfrac{\dfrac{1}{m_k}\sum_{i=k-m_k}^{k-1}\Delta y_i \sum_{i=k-m_k}^{k-1} y_{i-1}^2 - \dfrac{1}{2}\left[\dfrac{1}{m_k}\sum_{i=k-m_k}^{k-1}\Delta(y_i^2) - s_{m_k,k}^2\right]\sum_{i=k-m_k}^{k-1} y_{i-1}}{\dfrac{1}{m_k}\left[\sum_{i=k-m_k}^{k-1} y_{i-1}^{\delta_{m_k,k}}\sum_{i=k-m_k}^{k-1} y_{i-1}^2 - \sum_{i=k-m_k}^{k-1} y_{i-1}^{1+\delta_{m_k,k}}\sum_{i=k-m_k}^{k-1} y_{i-1}\right]}, \\ \hat{\beta}_{m_k,k} = \dfrac{\sum_{i=k-m_k}^{k-1}\Delta y_i - \hat{\mu}_{m_k,k}\sum_{i=k-m_k}^{k-1} y_{i-1}^{\delta_{m_k,k}}}{\sum_{i=k-m_k}^{k-1} y_{i-1}} \end{cases} \qquad (57)$$

where $\delta_{m_k,k}$ satisfies the third equation in (51) described by $$\frac{1}{3m_k}\sum_{i=k-m_k}^{k-1}\Delta(y_i^3) - \frac{\sigma_{m_k,k}^2}{m_k}\sum_{i=k-m_k}^{k-1} y_{i-1}^{2\gamma_{m_k,k}+1} - \qquad (58)$$

$$\beta\frac{\sum_{i=k-m_k}^{k-1} y_{i-1}^3}{m_k} - \mu\frac{\sum_{i=k-m_k}^{k-1} y_{i-1}^{\delta+2}}{m_k} = 0$$

The parameters of continuous-time dynamic process described by (45) are time-varying functions. This justifies the modifications/correctness needed for the development of continuous-time models of dynamic processes.

Remark 15.

The illustrations presented above exhibit the important features described in Remark 8 of the theoretical parameter estimation procedure. The illustrations further clearly differentiate the Itô-Doob differential formula based formation of orthogonality condition vectors in Remarks 9 and 14 and the algebraic manipulation and discretized scheme using the econometric specification based orthogonality condition vectors.

Remark 16. The DTIDMLSMVSP and its transformation of data are utilized in (51), (52), (53), (57), and (58) for updating statistic coefficient of equations in (45). Again, this accelerates the computation process. Furthermore, the DTIDMLSMVSP plays a significant role in the local discretization and model validation errors.

4. Computational Algorithm

In this section, the computational, data organizational, and simulation schemes are outlined. The ideas of iterative data process and data simulation process time schedules in relation with the real time data observation/collection schedule are also introduced. For the computational estimation of continuous time stochastic dynamic system state and parameters, it is important to determine an admissible set of local conditional sample average and sample variance, in particular, the size of local conditional sample in the context of a partition of time interval $[-\tau, T]$. Further, the discrete time dynamic model of conditional sample mean and sample variance statistic processes in Section 2 and the theoretical parameter estimation scheme in Section 3 coupled with the lagged adaptive expectation process motivate to outline a computational scheme in a systematic and coherent manner. A brief conceptual computational scheme and simulation process summary is described below:

4.1. Coordination of Data Observation, Iterative Process, and Simulation Schedules Without loss of generality, we assume that the real data observation/collection partition schedule P is defined in (2). Now, we present definitions of iterative process and simulation time schedules.

Definition 8.

The iterative process time schedule in relation with the real data collection schedule is defined by $$IP = \{F^{-r}t_i : \text{ for } t_i \in P\}, \qquad (59)$$

where $F^{-r}t_i = t_{i-r}$, and $F^{-r}$ is a forward shift operator.

The simulation time is based on the order p of the time series model of $m_k$-local conditional sample mean and variance processes in Lemma 1 in Section 2.

Definition 9.

The simulation process time schedule in relation with the real data observation schedule is defined by $$SP = \begin{cases} \{F^r t_i : \text{ for } t_i \in P\}, & \text{if } p \leq r \\ \{F^p t_i : \text{ for } t_i \in P\}, & \text{if } p > r \end{cases} \qquad (60)$$

Remark 17.

The initial times of iterative and simulation processes are equal to the real data times $t_r$ and $t_p$, respectively. Further, iterative and simulation process times in (59) and (60), respectively, justify Remark 10. In short, $t_i$ is the scheduled time clock for the collection of the i th observation of the state of the system under investigation. The iterative process and simulation process times are $t_{i+r}$ and $t_{i+p}$, respectively.

4.2. Computational Parameter Estimation Scheme

For the conceptual computational dynamic system parameter estimation, a few concepts are introduced below, including local admissible sample/data observation size, $m_k$-local admissible conditional finite sequence at $t_k \in SP$, and local finite sequence of parameter estimates at $t_k$.

Figure 3:
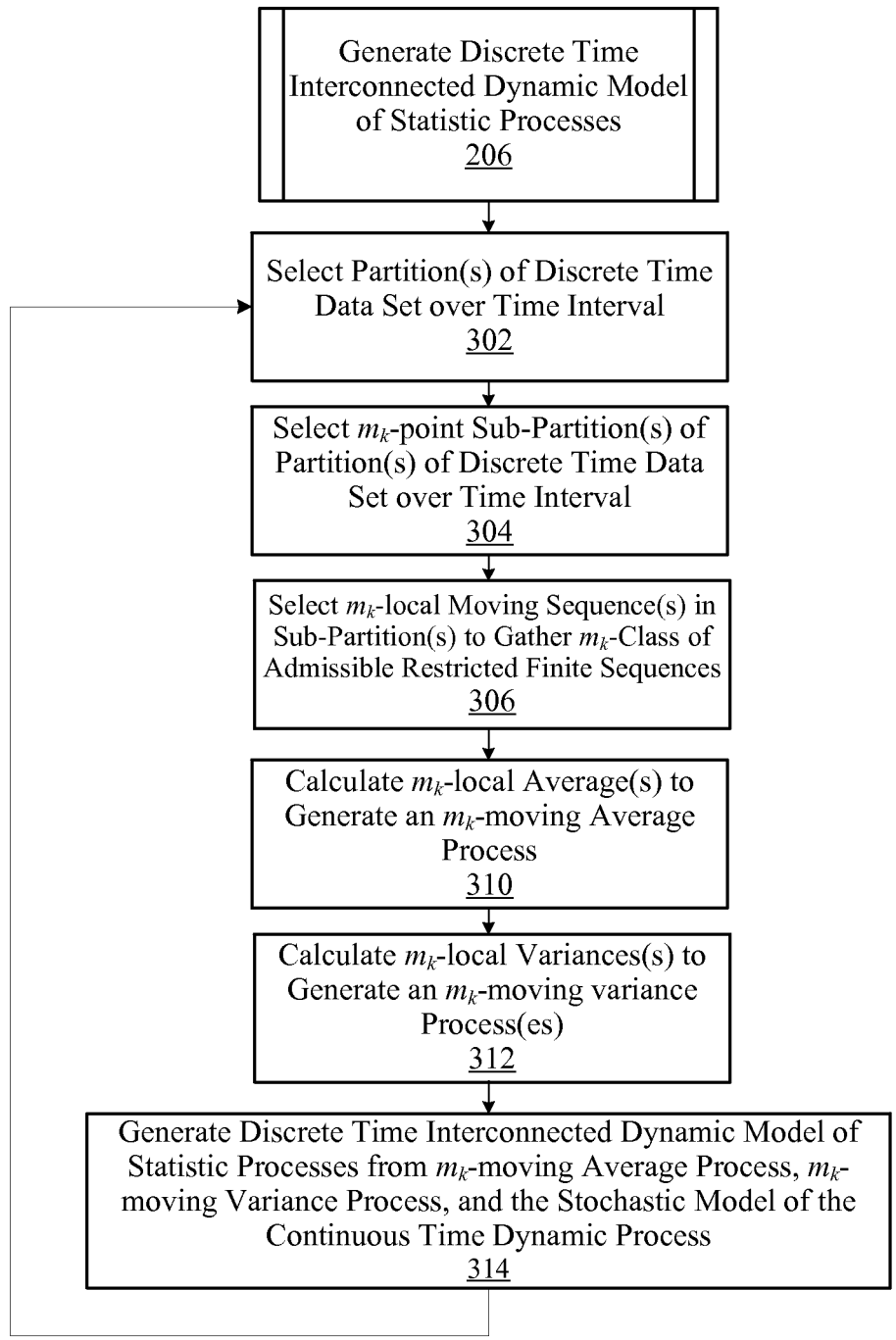
FIG. 3 illustrates a process of generating a discrete time interconnected dynamic model of statistic processes in the process shown in FIG. 2 according to various aspects of the embodiments described herein.

Referring back to the drawings, as part of the computational aspects of generating the DTIDMLSMVSP at reference numeral 206 (FIG. 2), in FIG. 3 the process includes selecting at least one partition P in the time interval $[-\tau, 0]$ of the discrete time data set $[-\tau, T]$ as past state information of a continuous time dynamic process at reference numeral

302. As described herein, multiple partitions P in the time interval $[-\tau,0]$ can be selected in the iterative, nested process.

Definition 10.

For each $k \in I_0(N)$, we define local admissible sample/data observation size $m_k$ at $t_k$ as $m_k \in OS_k$, where $$OS_k = \begin{cases} I_2(r+k-1), & \text{if } p \leq r, \\ I_2(p+k-1), & \text{if } p > r, \end{cases} \quad (61)$$

Further, $OS_k$ is referred as the local admissible set of lagged sample/data observation size at $t_k$. In other words, at reference numeral 304 in FIG. 3, at each time point in the partition P, the process includes selecting an $m_k$-point sub-partition $P_k$ of the partition P, the $m_k$-point sub-partition having a local admissible lagged sample observation size $OS_k$ based on p, r, and a sub-partition time observation index size k.

Definition 11.

For each admissible $m_k \in OS_k$ in Definition 10, an $m_k$-local admissible lagged-adapted finite restriction sequence of conditional sample/data observation at $t_k$ to subpartition $P_k$ of P in Definition 3 is defined by $\{\mathbb{E}[y_i|\mathcal{F}_{i-1}]\}_{i=k-m_k}^{k-1}$. Further, an $m_k$-class of admissible lagged-adapted finite sequences of conditional sample/data observation of size $m_k$ at $t_k$ is defined by $$\mathcal{AS}_k = \{\{\mathbb{E}[y_i|\mathcal{F}_{i-1}]\}_{i=k-m_k}^{k-1} : m_k \in OS_k\} = \{\{\mathbb{E}[y_i|\mathcal{F}_{i-1}]\}_{i=k-m_k}^{k-1}\}_{m_k \in OS_k}. \quad (62)$$

In other words, at reference numeral 306 in FIG. 3, for each $m_k$-point in each sub-partition $P_k$, the process includes selecting an $m_k$-local moving sequence in the sub-partition to gather an $m_k$-class of admissible restricted finite sequences.

Without loss of generality, in the case of energy commodity model, for example, for each $m_k \in OS_k$, the corresponding $m_k$-local admissible adapted finite sequence of conditional sample/data observation at $t_k$, $\{\mathbb{E}[y_i|\mathcal{F}_{i-1}]\}_{i=k-m_k}^{k-1}$ is found. Using this sequence and (43), $\hat{a}_{m_k,k}$, $\hat{\mu}_{m_k,k}$ and $\hat{\sigma}_{m_k,k}^2$ are computed. This leads to a local admissible finite sequence of parameter estimates at $t_k$ defined on $OS_k$ as follows: $\{(\hat{a}_{m_k,k}, \hat{\mu}_{m_k,k}, \hat{\sigma}_{m_k,k}^2)\}_{m_k \in OS_k} = \{(\hat{a}_{m_k,k}, \hat{\mu}_{m_k,k}, \hat{\sigma}_{m_k,k}^2)\}_{m_k=2}^{r+k-1}$ or $\{(\hat{a}_{m_k,k}, \hat{\mu}_{m_k,k}, \hat{\sigma}_{m_k,k}^2)\}_{m_k=2}^{p+k-1}$. It is denoted by $$(\mathcal{A}_k, \mathbb{M}_k, \mathcal{S}_k) = \{(\hat{a}_{m_k,k}, \hat{\mu}_{m_k,k}, \hat{\sigma}_{m_k,k}^2)\}_{m_k \in OS_k}. \quad (63)$$

4.3. Conceptual Computation of State Simulation Scheme:

For the development of a conceptual computational scheme, the method of induction can be employed. The presented simulation scheme is based on the idea of lagged adaptive expectation process. An autocorrelation function (ACF) analysis performed on $s_{m_k,k}^2$ suggests that the discrete time interconnected dynamic model of local conditional sample mean and sample variance statistic in (8) is of order p=2. In view of this, the initial data is identified. Referring to FIG. 3, at reference numeral 308, the process includes, for each of the plurality of admissible parameter estimates, calculating a state value of the stochastic model of the continuous time dynamic process to gather a plurality of state values of the stochastic model of the continuous time dynamic process. For example, it is possible to begin with a given set of initial data $y_{t_0}$, $\{\hat{s}_{m_0,0}^2\}_{m_0 \in OS_0}$, $\{\hat{s}_{m_{-1},-1}^2\}_{m_{-1} \in OS_{-1}}$, and $\{\hat{s}_{m_{-1},-1}^2\}_{m_{-1} \in OS_{-1}}$. Let $y_{m_k,k}^s$ be a simulated value of $\mathbb{E}[y_k|\mathcal{F}_{k-1}]$ at time $t_k$ corresponding to a local admissible lagged-adapted finite sequences of conditional sample/data observation of size $m_k$ at $t_k$ $\{\mathbb{E}[y_i|\mathcal{F}_{i-1}]\}_{i=k-m_k}^{m-1} \in \mathcal{AS}_k$ in (62). This simulated value is derived from the discretized Euler scheme (29) by $$y_{m_k,k}^s = y_{m_k-1,k-1}^s + \hat{a}_{m_k-1,k-1}(\hat{\mu}_{m_k-1,k-1} - y_{m_k-1,k-1}^s) y_{m_k-1,k-1}^s \Delta t + \hat{\sigma}_{m_k-1,k-1} y_{m_k-1,k-1}^s \Delta W_{m_k,k}. \quad (64)$$

Further, let $$\{y_{m_k,k}^s\}_{m_k \in OS_k} \quad (65)$$

be a $m_k$-local admissible sequence of simulated values corresponding to $m_k$-class $\mathcal{AS}_k$ of local admissible lagged-adapted finite sequences of conditional sample/data observation of size $m_k$ at $t_k$ in (62). That is, at reference numeral 208 in FIG. 2, the process 200 can include calculating a plurality of $m_k$-local admissible parameter estimates for the stochastic model of the continuous time dynamic process using the DTIDMLSMVSP.

4.4. Mean-Square Sub-Optimal Procedure

Using the $m_k$-local admissible parameter estimates, at reference numeral 210 in FIG. 2, the process 200 can include calculating a state value of the stochastic model of the continuous time dynamic process for each of the plurality of admissible parameter estimates, to gather a plurality of state values of the stochastic model of the continuous time dynamic process. Further, at reference numeral 312 in FIG. 2, the process 200 includes determining an optimal admissible parameter estimate among the plurality of admissible parameter estimates that results in a minimum error among the plurality of state values. For example, to find the best estimate of $\mathbb{E}[y_k|\mathcal{F}_{k-1}]$ at time $t_k$ from a $m_k$-local admissible finite sequence $\{y_{m_k,k}^s\}_{m_k \in OS_k}$ of a simulated value of $\{\mathbb{E}[y_i|\mathcal{F}_{k-1}]\}$, we need to compute a local admissible finite sequence of quadratic mean square error corresponding to $\{y_{m_k,k}^s\}_{m_k \in OS_k}$. The quadratic mean square error is defined below.

Definition 12.

The quadratic mean square error of $\mathbb{E}[y_k|\mathcal{F}_{k-1}]$ relative to each member of the term of local admissible sequence $\{y_{m_k,k}^s\}_{m_k \in OS_k}$ of simulated values is defined by $$\Xi_{m_k,k,y_k} = (\mathbb{E}[y_k|\mathcal{F}_{k-1}] - y_{m_k,k}^s)^2. \quad (66)$$

For any arbitrary small positive number $\epsilon$ and for each time $t_k$, to find a best estimate from the $m_k$-local admissible sequence $\{y_{m_k,k}^s\}_{m_k \in OS_k}$ of simulated values, the following $\epsilon$-sub-optimal admissible subset of set of $m_k$-size local admissible lagged sample size $m_k$ at $t_k$ ($OS_k$) is defined as $$\mathcal{M}_k = \{m_k : \Xi_{m_k,k,y_k} < \epsilon \text{ for } m_k \in OS_k\}. \quad (67)$$

There are three different cases that determine the $\epsilon$-best sub-optimal sample size $\hat{m}_k$ at time $t_k$.

Case 1: If $m_k \in \mathcal{M}_k$ gives the minimum, then $m_k$ is recorded as $\hat{m}_k$.

Case 2: If more than one value of $m_k \in \mathcal{M}_k$, then the largest of such $m_k$'s is recorded as $\hat{m}_k$.

Case 3: If condition (67) is not met at time $t_k$, (e.g., $\mathcal{M}_k = \emptyset$), then the value of $m_k$ where the minimum $$\min_{m_k} \Xi_{m_k,k,y_k}$$

is attained, is recorded as $\hat{m}_k$. The $\epsilon$-best sub-optimal estimates of the parameters $\hat{a}_{m_k,k}$, $\hat{\mu}_{m_k,k}$ and $\hat{\sigma}_{m_k,k}^2$ at the $\epsilon$-best sub-optimal sample size $\hat{m}_k$ are also recorded as $a_{\hat{m}_k,k}$, $\mu_{\hat{m}_k,k}$ and $\sigma_{\hat{m}_k,k}^2$, respectively. It should be appreciated that the three cases described above present only one example way that a minimum error can be determined, and other ways are within the scope of the embodiments.

At reference numeral 214, the process 200 further includes identifying an optimal $m_k$-local moving sequence $\hat{m}_k$ among the $m_k$-class of admissible restricted finite sequences based on the minimum error. For example, the simulated value $y_{m_k,k}^s$ at time $t_k$ with $\hat{m}_k$ is now recorded as the $\epsilon$-best sub-optimal state estimate for $\mathbb{E}[y_k|\mathcal{F}_{k-1}]$ at time $t_k$. This $\epsilon$-best sub-optimal simulated value of $\mathbb{E}[y_k|\mathcal{F}_{k-1}]$ at time $t_k$ is denoted by $y_{\hat{m}_k,k}^s$.

In addition to comparative statements in Sections 2 together with Remarks 7, 8, 9, 13, 14, 15, and 16, the following comparisons between the LLGMM and the existing OCBGMM are noted: The LLGMM approach is focused on parameter and state estimation problems at each data collection/observation time $t_k$ using the local lagged adaptive expectation process. LLGMM is discrete time dynamic process. On the other hand, the OCBGMM is centered on the state and parameter estimates using the entire data that is to the left of the final data collection time $T_N=T$. Implied weakness in forecasting, as seen in the next section, is explicitly shown with the OCBGMM approach and the ensuing results.

It is noted that Remark 8 exhibits the interactions/interdependence between the first three components of LLGMM, including (1) the development of the stochastic model for continuous-time dynamic process, (2) the development of the discrete time interconnected dynamic model for statistic process, and (3) using the Euler-type discretized scheme for nonlinear and non-stationary system of stochastic differential equations and their interactions. On the other hand, the OCBGMM is partially connected. From the development of the computational algorithm in Section 4, the interdependence/interconnectedness of the four remaining components of the LLGMM, including (4) employing lagged adaptive expectation process for developing generalized method of moment equations, (5) introducing conceptual computational parameter estimation problem, (6) formulating conceptual computational state estimation scheme, and (7) defining conditional mean square $\epsilon$-sub optimal procedure are clearly demonstrated. Further, the components above and the data are directly connected with the original continuous-time SDE. On the other hand, the OCBGMM is composed of single size, single sequence, single estimates, single simulated value, and single error. Hence, the OCBGMM is the "single shot approach". Further, the OCBGMM is highly dependent on its second component rather than the first component.

As discussed above, the LLGMM is a discrete time dynamic system composed of seven interactive interdependent components. On the other hand, the OCBGMM is static dynamic process of five almost isolated components. Furthermore, the LLGMM is a "two scale hierarchic" quadratic mean-square optimization process, but the optimization process of OCBGMM is "single-shot". Further, the LLGMM performs in discrete time but operates like the original continuous-time dynamic process. As further shown below, the performance of the LLGMM approach is superior to the OCBGMM and IRGMM approaches.

The LLGMM does not require a large size data set. In addition, as k increases, it generates a larger size of lagged adapted data set, and thereby it further stabilizes the state and parameter estimation procedure with finite size data set, on the other hand the OCBGMM does not have this flexibility. The local adaptive process component of LLGMM generates conceptual finite chain of discrete time admissible sets/sub-data. The OCBGMM does not possess this feature. The LLGMM generates a finite computational chain. The OCBGMM does not possess this feature. A further comparative summary analysis is described in Sections 6 and 7 in context of conceptual, computational, and statistical settings and exhibiting the role, scope, and performance of the LLGMM.

Remark 19.

The choice of p=2 can be determined based on the statistical procedure known as the Autocorrelation Function Analysis (AFA).

Illustration 1: Application of Conceptual Computational Algorithm to Energy Commodity Data Set.

As one example, the conceptual computational algorithm is applied to the real time daily Henry Hub Natural gas data set for the period 01/04/2000-09/30/2004, the daily crude oil data set for the period 01/07/1997-06/02/2008, the daily coal data set for the period of 01/03/2000-10/25/2013, and the weekly ethanol data set for the period of 03/24/2005-09/26/2013. The descriptive statistics of data for daily Henry Hub Natural gas data set for the period 01/04/2000-09/30/2004, the daily crude oil data set for the period 01/07/1997-06/02/2008, the daily coal data set for the period of 01/03/2000-10/25/2013, and the weekly ethanol data set for the period of 03/24/2005-09/26/2013, are recorded in the Table 1 below.

TABLE 1

Descritive Statistics

| Data Set Y | N | $\hat{Y}$ | Std(Y) |
|---|---|---|---|
| Nat. Gas | 1184 (days) | 4.5504 | 1.5090) |
| Crude Oil | 4165 (days) | 54.0093 | 31.0248 |
| Coal | 3470 (days) | 27.1441 | 17.8394 |
| Ethanol | 438 (weeks) | 2.1391 | 0.4455 |

Sample size, mean, and standard deviation of energy commodities data are computed. N represents the sample size of corresponding data set.

Graphical, Simulation and Statistical Results—Case 1.

Three cases are considered for the initial delay r and show that, as r increases, the root mean square error reduces significantly. Here, we pick r=5, $\Delta t=1$, $\epsilon=0.001$, and p=2, the $\epsilon$-best sub-optimal estimates of parameters a, $\mu$ and $\sigma^2$ at each real data times are exhibited in Table 2.

Table 2 shows the $\epsilon$-best sub-optimal local admissible sample size $\hat{m}_k$ and the parameters $a_{\hat{m}_k,k}$, $\sigma_{\hat{m}_k,k}^2$, and $\mu_{\hat{m}_k,k}$ for four price energy commodity data at time $t_k$. This was based on p≤r, and the initial real data time-delay r=5. We further note that the range of the $\epsilon$-best sub-optimal local admissible sample size $\hat{m}_k$ for any time $t_k \in [5,25] \cup [1145,1165]$, $t_k \in [5,25] \cup [2440,2460]$, $t_k \in [5,25] \cup [2865,2885]$, $t_k \in [5,25] \cup [375,395]$ for natural gas, crude oil, coal and ethanol data, respectively as $$2 \leq \hat{m}_k \leq 5. \tag{68}$$

TABLE 2

| $t_k$ | $\hat{m}_k$ | $\sigma^2_{\hat{m}_k,k}$ | $\mu_{\hat{m}_k,k}$ | $a_{\hat{m}_k,k}$ |
|---|---|---|---|---|
| | | Natural gas | | |
| 5 | 3 | 0.0001 | 2.2231 | 0.6011 |
| 6 | 3 | 0.0002 | 2.2160 | 0.6122 |
| 7 | 3 | 0.0002 | 2.2513 | 0.6087 |
| 8 | 4 | 0.0002 | 2.2494 | 0.1628 |
| 9 | 4 | 0.0002 | 2.2658 | −0.1497 |

TABLE 2-continued

| $t_k$ | $\hat{m}_k$ | $\sigma^2_{\hat{m}_k,k}$ | $\mu_{\hat{m}_k,k}$ | $\alpha_{\hat{m}_k,k}$ |
|---|---|---|---|---|
| 10 | 4 | 0.0003 | 2.1371 | 0.1968 |
| 11 | 4 | 0.0004 | 2.5071 | −0.2781 |
| 12 | 4 | 0.0000 | 2.2550 | 0.3545 |
| 13 | 4 | 0.0005 | 2.5122 | 0.6246 |
| 14 | 4 | 0.0015 | 2.4850 | 0.5604 |
| 15 | 3 | 0.0007 | 2.5378 | 0.4846 |
| 16 | 3 | 0.0007 | 2.5715 | 0.7737 |
| 17 | 5 | 0.0011 | 2.5688 | 0.5984 |
| 18 | 4 | 0.0010 | 2.5831 | 0.5423 |
| 19 | 5 | 0.0007 | 2.5893 | 0.4256 |
| 20 | 5 | 0.0006 | 2.6100 | 0.0683 |
| 21 | 5 | 0.0007 | 2.3171 | 0.2893 |
| 22 | 4 | 0.0015 | 2.7043 | 0.6983 |
| 23 | 3 | 0.0009 | 2.6590 | 0.8316 |
| 24 | 3 | 0.0010 | 2.6917 | 0.1822 |
| 25 | 4 | 0.0017 | 2.5620 | 0.2201 |
| ... | ... | ... | ... | ... |
| ... | ... | ... | ... | ... |
| 1145 | 4 | 0.0003 | 5.7203 | 0.1225 |
| 1146 | 3 | 0.0003 | 5.6651 | 0.2031 |
| 1147 | 3 | 0.0002 | 5.6601 | 0.3133 |
| 1148 | 5 | 0.0006 | 5.6909 | 0.216 |
| 1149 | 3 | 0.0003 | 5.6982 | 0.2404 |
| 1150 | 5 | 0.0006 | 5.6108 | 0.1362 |
| 1151 | 5 | 0.0006 | 5.61 | 0.1089 |
| 1152 | 5 | 0.0006 | 5.4383 | 0.06272 |
| 1153 | 4 | 0.0003 | 5.4307 | 0.1755 |
| 1154 | 5 | 0.0005 | 5.4155 | 0.1569 |
| 1155 | 3 | 0.0004 | 5.3742 | −2.275 |
| 1156 | 5 | 0.0006 | 5.4405 | 0.1392 |
| 1157 | 4 | 0.0003 | 5.4423 | 0.2339 |
| 1158 | 4 | 0.0008 | 5.4276 | 0.1712 |
| 1159 | 5 | 0.0006 | 5.3958 | 0.1309 |
| 1160 | 3 | 0.0002 | 5.3557 | −0.1882 |
| 1161 | 3 | 0.0003 | 5.5081 | −0.0696 |
| 1162 | 4 | 0.0003 | 4.908 | 0.0381 |
| 1163 | 4 | 0.0002 | 5.0635 | 0.1038 |
| 1164 | 3 | 0.0002 | 5.082 | 0 |
| 1165 | 4 | 0.0002 | 5.1099 | −0.2756 |
| Crude oil | | | | |
| 5 | 3 | 0.0001 | 24.4100 | 0.0321 |
| 6 | 3 | 0.0002 | 24.7165 | 0.0341 |
| 7 | 4 | 0.0003 | 25.5946 | 0.0537 |
| 8 | 5 | 0.0006 | 25.5550 | 0.0467 |
| 9 | 4 | 0.0006 | 25.5695 | 0.0499 |
| 10 | 4 | 0.0004 | 25.4787 | 0.0221 |
| 11 | 3 | 0.0001 | 25.7742 | 0.0100 |
| 12 | 3 | 0.0002 | 26.9477 | −0.0157 |
| 13 | 3 | 0.0001 | 25.8786 | −0.0112 |
| 14 | 5 | 0.0005 | 22.1834 | 0.0049 |
| 15 | 5 | 0.0004 | 23.5425 | 0.0010 |
| 16 | 4 | 0.0002 | 23.8500 | 0.0000 |
| 17 | 4 | 0.0002 | 23.8486 | 0.0502 |
| 18 | 5 | 0.0004 | 23.2913 | −0.0113 |
| 19 | 3 | 0.0000 | 24.4715 | 0.1282 |
| 20 | 3 | 0.0004 | 24.3878 | 0.0415 |
| 21 | 5 | 0.0003 | 24.3336 | 0.2067 |
| 22 | 4 | 0.0002 | 23.9993 | 0.0200 |
| 23 | 4 | 0.0001 | 24.1909 | −0.0894 |
| 24 | 3 | 0.0002 | 25.0812 | −0.0252 |
| 25 | 3 | 0.0002 | 22.2942 | 0.0064 |
| ... | ... | ... | ... | ... |
| ... | ... | ... | ... | ... |
| 2440 | 5 | 0.0003 | 58.431 | 0.0141 |
| 2441 | 5 | 0.0003 | 57.205 | 0.0084 |
| 2442 | 4 | 0.0001 | 57.554 | 0.0165 |
| 2443 | 5 | 0.0003 | 57.871 | 0.0168 |
| 2444 | 5 | 0.0003 | 60.441 | 0.0023 |
| 2445 | 5 | 0.0003 | 38.954 | −0.0006 |
| 2446 | 4 | 0.0006 | 59.659 | 0.0165 |
| 2447 | 4 | 0.001 | 59.548 | 0.016 |
| 2448 | 4 | 0.0007 | 58.964 | 0.0115 |
| 2449 | 4 | 0.0005 | 58.415 | 0.0166 |
| 2450 | 5 | 0.0003 | 58.61 | 0.0193 |
| 2451 | 4 | 0.0004 | 59.244 | 0.0091 |
| 2452 | 5 | 0.0003 | 58.955 | 0.0143 |
| 2453 | 4 | 0.0004 | 59.508 | 0.0179 |
| 2454 | 4 | 0.0003 | 59.978 | 0.0193 |
| 2455 | 5 | 0.0003 | 59.957 | 0.0199 |
| 2456 | 4 | 0.0005 | 59.849 | 0.0163 |
| 2457 | 5 | 0.0004 | 59.441 | 0.0095 |
| 2458 | 4 | 0.0003 | 58.479 | 0.0103 |
| 2459 | 4 | 0.0002 | 57.917 | 0.0158 |
| 2460 | 4 | 0.0005 | 56.122 | 0.0062 |
| Coal | | | | |
| 5 | 3 | 0.0001 | 11.5534 | 0.0142 |
| 6 | 3 | 0.0000 | 11.2529 | 0.4109 |
| 7 | 3 | 0.0001 | 9.9161 | 0.0165 |
| 8 | 3 | 0.0002 | 11.4663 | −0.0403 |
| 9 | 3 | 0.0005 | 10.5922 | −0.0843 |
| 10 | 4 | 0.0009 | 8.9379 | 0.0714 |
| 11 | 4 | 0.0023 | 8.9051 | 0.1784 |
| 12 | 3 | 0.0015 | 9.0169 | 0.0855 |
| 13 | 3 | 0.0020 | 8.6231 | 0.0739 |
| 14 | 2 | 0.0001 | 10.0100 | 0.0564 |
| 15 | 5 | 0.0067 | 9.5281 | 0.0741 |
| 16 | 4 | 0.0058 | 6.1821 | 0.0694 |
| 17 | 4 | 0.0015 | 8.8087 | 0.0404 |
| 18 | 4 | 0.0035 | 9.0681 | 0.0652 |
| 19 | 3 | 0.0040 | 9.0752 | 0.1527 |
| 20 | 3 | 0.0049 | 9.0801 | 0.1405 |
| 21 | 4 | 0.0043 | 8.9898 | 0.0946 |
| 22 | 5 | 0.0054 | 8.9148 | 0.0036 |
| 23 | 4 | 0.0018 | 8.6771 | 0.0884 |
| 24 | 5 | 0.0035 | 8.7586 | 0.0985 |
| 25 | 5 | 0.0006 | 8.4779 | −0.1155 |
| ... | ... | ... | ... | ... |
| ... | ... | ... | ... | ... |
| 2865 | 3 | 0.001 | 37.657 | 0.0397 |
| 2866 | 3 | 0.0006 | 37.73 | 0.0468 |
| 2867 | 5 | 0.0014 | 39.6 | 0.0087 |
| 2868 | 3 | 0.0006 | 38.769 | 0.0331 |
| 2869 | 5 | 0.0019 | 38.272 | 0.0245 |
| 2870 | 3 | 0.0014 | 37.627 | 0.0234 |
| 2871 | 3 | 0.0004 | 37.753 | −0.243 |
| 2872 | 4 | 0.0008 | 36.11 | 0.0101 |
| 2873 | 5 | 0.0015 | 33.823 | 0.0042 |
| 2874 | 4 | 0.0009 | 35.221 | 0.0183 |
| 2875 | 5 | 0.0011 | 33.381 | 0.0084 |
| 2876 | 4 | 0.0007 | 34.6 | 0.0228 |
| 2877 | 3 | 0.001 | 34.463 | 0.0441 |
| 2878 | 5 | 0.0009 | 34.583 | 0.0334 |
| 2879 | 5 | 0.0008 | 34.63 | 0.0443 |
| 2880 | 4 | 0.0005 | 35.221 | 0.0207 |
| 2881 | 5 | 0.0007 | 35.249 | 0.0196 |
| 2882 | 3 | 0.0003 | 35.583 | 0.1566 |
| 2883 | 4 | 0.0004 | 36.036 | 0.0224 |
| 2884 | 3 | 0.0005 | 36.276 | 0.0373 |
| 2885 | 4 | 0.0004 | 36.195 | 0.0374 |
| Ethanol | | | | |
| 5 | 2 | 0.0002 | 1.1767 | 0.5831 |
| 6 | 5 | 0.0008 | 1.1717 | 0.5159 |
| 7 | 4 | 0.0007 | 1.1707 | 1.4925 |
| 8 | 5 | 0.0008 | 1.1713 | 1.4791 |
| 9 | 5 | 0.0006 | 1.1709 | 2.1406 |
| 10 | 4 | 0.0004 | 1.1900 | 0.8621 |
| 11 | 3 | 0.0025 | 1.1900 | 0.3719 |
| 12 | 3 | 0.0004 | 1.2188 | 0.5368 |
| 13 | 5 | 0.0004 | 1.1120 | 12.2917 |
| 14 | 5 | 0.0007 | 1.1669 | −0.9289 |
| 15 | 5 | 0.0014 | 0.7492 | −0.0879 |
| 16 | 5 | 0.0011 | 1.7968 | 0.3087 |
| 17 | 5 | 0.0002 | 1.8484 | −0.1901 |
| 18 | 5 | 0.0003 | 1.1650 | −0.1611 |
| 19 | 5 | 0.0022 | 1.8943 | 0.1502 |
| 20 | 5 | 0.0047 | 1.8144 | 0.2073 |
| 21 | 4 | 0.001 | 1.8400 | 0.0464 |
| 22 | 3 | 0.0020 | 3.7350 | 0.1628 |
| 23 | 3 | 0.0008 | 1.9905 | 0.1599 |
| 24 | 3 | 0.0018 | 1.9006 | −3.4926 |
| 25 | 4 | 0.0234 | 2.4827 | 0.1837 |
| ... | ... | ... | ... | ... |
| ... | ... | ... | ... | ... |

TABLE 2-continued

| $t_k$ | $\hat{m}_k$ | $\sigma^2_{\hat{m}_k,k}$ | $\mu_{\hat{m}_k,k}$ | $\alpha_{\hat{m}_k,k}$ |
|---|---|---|---|---|
| 375 | 3 | 0.0008 | 2.1456 | 1.1005 |
| 376 | 4 | 0.0012 | 2.0689 | 0.2666 |
| 377 | 3 | 0.0009 | 2.0538 | 0.4339 |
| 378 | 3 | 0.0008 | 2.054 | 0.7726 |
| 379 | 4 | 0.0007 | 2.0551 | 0.7588 |
| 380 | 3 | 0.0003 | 2.0692 | 4.5252 |
| 381 | 5 | 0.0021 | 1.995 | −0.4407 |
| 382 | 5 | 0.0025 | 1.3252 | −0.048 |
| 383 | 5 | 0.0023 | 0.82891 | −0.04 |
| 384 | 4 | 0.0025 | 2.5937 | 0.3073 |
| 385 | 3 | 0.0064 | 2.6054 | 0.6097 |
| 386 | 5 | 0.0044 | 2.5947 | 0.4157 |
| 387 | 3 | 0.0035 | 2.595 | 0.354 |
| 388 | 3 | 0.0018 | 2.6054 | 0.6561 |
| 389 | 5 | 0.0043 | 2.5992 | 0.3862 |
| 390 | 3 | 0.0009 | 2.5812 | 0.3334 |
| 391 | 4 | 0.0013 | 2.6299 | −0.3594 |
| 392 | 4 | 0.0013 | 2.6776 | −0.2827 |
| 393 | 4 | 0.0011 | 1.5114 | 0.0394 |
| 394 | 3 | 0.0006 | 2.2927 | 0.5982 |
| 395 | 5 | 0.0035 | 2.3275 | 0.3191 |

Remark 20.

From (68), the following conclusions can be drawn:

(a) From (61) and Definition 10 ($OS_k$), at teach time $t_k$ for the four energy price data sets, the $\epsilon$-best sub-optimal local admissible sample size $\hat{m}_k$ is attained on the subset $\{2, 3, 4, 5\}$ of ($OS_k$). Hence, the $\epsilon$-best sub-optimal local state and parameter estimates are obtained in at most four iterates rather than k+r−1.

(b) The basis for the conclusion (a) is due to the fact that the $\epsilon$-best sub-optimization process described in Subsections 4.3 and 4.4 stabilize the local state and parameter estimations at each time $t_k$.

(c) From (a) and (b), we further remark that, in practice, the entire local lagged admissible set $OS_k$ of size $m_k$ at time $t_k$ is not fully utilized. In fact, for any $m_k$ in $OS_k$ and $m_k > \hat{m}_k$ such that as $m_k$ approached to k+r−1, the corresponding state and parameters relative to $m_k$ approach to the $\epsilon$-best sub-optimal local state and parameter estimates relative to the $\epsilon$-best sub-optimal local admissible sample size at time $t_k$. This is not surprising because of the nature of the state hereditary process, that is, as the size of the time-delay $m_k$ increases, the influence of the past state history decreases.

(d) From (c), we further conclude that the second DTID-MLSMVSP and the fourth component (local lagged adaptive process) of the LLGMM are stabilizing agents. This justifies the introduction of the term conceptual computational state and parameter estimation scheme. These components play a role of not only the local $\epsilon$-best suboptimal quadratic error reduction, but also local error stabilization problem depending on the choice of $\epsilon$.

(e) The conclusions (a), (b), (c) and (d) are independent of a "large" data size and stationary conditions.

Remark 21.

We remark that $\{\mu_{\hat{m}_i,i}\}_{i=0}^{N}$ and $\{a_{\hat{m}_i,i}\}_{i=0}^{N}$ are discrete time $\epsilon$-best sub-optimal simulated random samples generated by the scheme described at the beginning of Section 4.5.

Remark 22.

We have used the estimated parameters $a_{\hat{m}_k,k}$, $\mu_{\hat{m}_k,k}$ and $\sigma^2_{\hat{m}_k,k}$ in Table 2 to simulate the daily prices of natural gas, crude oil, coal, and ethanol. Using the computer readable instructions described herein and the parameters described in Table 2, we simulate the daily prices of natural gas, crude oil, coal, and ethanol. For this purpose, we pick $\epsilon = 0.001$; for each time $t_k$, we estimate the simulated prices $y^s_{\hat{m}_k,k}$.

Among the collected values $m_k$, the value that gives the minimum $\Xi_{m_k,k,y_k}$ is recorded as $\hat{m}_k$. If condition (67) is not met at time $t_k$, the value of $m_k$ where the minimum $$\min_{m_k} \Xi_{m_k,k,y_k}$$

is attained, and is recorded as $\hat{m}_k$. The $\epsilon$-best sub-optimal estimates of the parameters $\hat{a}_{m_k,k}$, $\hat{\mu}_{m_k,k}$ and $\hat{\sigma}^2_{m_k,k}$ at $\hat{m}_k$ are also recorded as $a_{\hat{m}_k,k}$, $\mu_{\hat{m}_k,k}$ and $\sigma^2_{\hat{m}_k,k}$, and the value of $y^s_{m_k,k}$ at time $t_k$ corresponding to $\hat{m}_k$, $a_{\hat{m}_k,k}$, $\mu_{\hat{m}_k,k}$ and $\sigma^2_{\hat{m}_k,k}$ is also recorded as the $\epsilon$-best sub-optimal simulated value $y^s_{\hat{m}_k,k}$ of $y_k$. A detailed algorithm is given in Appendix D. In Table 3, the real and LLGMM simulated price values of the energy commodities: Natural gas, Crude oil, Coal, and Ethanol are exhibited in columns 2-3, 6-7, 10-11, and 14-15, respectively. The absolute error of each of the energy commoditys simulated value is shown in columns 4, 8, 12, and 16, respectively.

TABLE 3

Real, Simulation using LLGMM method, and absolute error of simulation with starting delay r = 5.

| $t_k$ | Real $y_k$ | Simulated $y^s_{\hat{m}_k,k}$ (LLGMM) | \|Error\| $\|y_k - y^s_{\hat{m}_k,k}\|$ |
|---|---|---|---|
| | | Natural gas | |
| 5 | 2.216 | 2.216 | 0 |
| 6 | 2.260 | 2.253 | 0.007 |
| 7 | 2.244 | 2.241 | 0.003 |
| 8 | 2.252 | 2.249 | 0.003 |
| 9 | 2.322 | 2.329 | 0.007 |
| 10 | 2.383 | 2.376 | 0.007 |
| 11 | 2.417 | 2.417 | 0.000 |
| 12 | 2.559 | 2.534 | 0.025 |
| 13 | 2.485 | 2.554 | 0.069 |
| 14 | 2.528 | 2.525 | 0.003 |
| 15 | 2.616 | 2.615 | 0.001 |
| 16 | 2.523 | 2.478 | 0.045 |
| 17 | 2.610 | 2.638 | 0.028 |
| 18 | 2.610 | 2.606 | 0.004 |
| 19 | 2.610 | 2.614 | 0.004 |
| 20 | 2.699 | 2.726 | 0.027 |
| 21 | 2.759 | 2.748 | 0.011 |
| 22 | 2.659 | 2.638 | 0.021 |
| 23 | 2.742 | 2.737 | 0.005 |
| 24 | 2.562 | 2.561 | 0.001 |
| 25 | 2.495 | 2.487 | 0.008 |
| ... | ... | ... | ... |
| ... | ... | ... | ... |
| 1145 | 5.712 | 5.709 | 0.003 |
| 1146 | 5.588 | 5.592 | 0.004 |
| 1147 | 5.693 | 5.650 | 0.043 |
| 1148 | 5.791 | 5.786 | 0.005 |
| 1149 | 5.614 | 5.458 | 0.156 |
| 1150 | 5.442 | 5.460 | 0.018 |
| 1151 | 5.533 | 5.571 | 0.038 |
| 1152 | 5.378 | 5.397 | 0.019 |
| 1153 | 5.373 | 5.374 | 0.001 |
| 1154 | 5.382 | 5.420 | 0.038 |
| 1155 | 5.507 | 5.501 | 0.006 |
| 1156 | 5.552 | 5.551 | 0.001 |
| 1157 | 5.310 | 5.272 | 0.038 |
| 1158 | 5.338 | 5.348 | 0.010 |
| 1159 | 5.298 | 5.353 | 0.055 |
| 1160 | 5.189 | 5.207 | 0.018 |
| 1161 | 5.082 | 5.087 | 0.005 |
| 1162 | 5.082 | 5.207 | 0.125 |
| 1163 | 5.082 | 4.783 | 0.299 |

TABLE 3-continued

Real, Simulation using LLGMM method, and absolute error of simulation with starting delay r = 5.

| $t_k$ | Real $y_k$ | Simulated $y^s_{\hat{m}_k,k}$ (LLGMM) | |Error| $|y_k - y^s_{\hat{m}_k,k}|$ |
|---|---|---|---|
| 1164 | 4.965 | 4.849 | 0.116 |
| 1165 | 4.767 | 4.733 | 0.034 |
| Crude oil | | | |
| 5 | 25.200 | 25.200 | 0 |
| 6 | 25.100 | 25.077 | 0.023 |
| 7 | 25.950 | 25.606 | 0.344 |
| 8 | 25.450 | 25.494 | 0.044 |
| 9 | 25.400 | 25.411 | 0.011 |
| 10 | 25.100 | 24.981 | 0.119 |
| 11 | 24.800 | 24.763 | 0.037 |
| 12 | 24.400 | 24.301 | 0.099 |
| 13 | 23.850 | 24.862 | 1.012 |
| 14 | 23.850 | 23.961 | 0.111 |
| 15 | 23.850 | 24.010 | 0.160 |
| 16 | 23.900 | 24.071 | 0.171 |
| 17 | 24.500 | 24.554 | 0.054 |
| 18 | 24.800 | 24.795 | 0.005 |
| 19 | 24.150 | 24.165 | 0.015 |
| 20 | 24.200 | 23.971 | 0.229 |
| 21 | 24.000 | 24.028 | 0.028 |
| 22 | 23.900 | 23.886 | 0.014 |
| 23 | 23.050 | 23.253 | 0.203 |
| 24 | 22.300 | 22.586 | 0.286 |
| 25 | 22.450 | 22.418 | 0.032 |
| ... | ... | ... | ... |
| ... | ... | ... | ... |
| 2440 | 57.350 | 57.298 | 0.052 |
| 2441 | 56.740 | 56.650 | 0.090 |
| 2442 | 57.550 | 57.613 | 0.063 |
| 2443 | 59.090 | 59.152 | 0.062 |
| 2444 | 60.270 | 58.926 | 1.344 |
| 2445 | 60.750 | 59.675 | 1.075 |
| 2446 | 58.410 | 59.408 | 0.998 |
| 2447 | 58.720 | 58.917 | 0.197 |
| 2448 | 58.640 | 58.502 | 0.138 |
| 2449 | 57.870 | 58.721 | 0.851 |
| 2450 | 59.130 | 58.985 | 0.145 |
| 2451 | 60.110 | 60.087 | 0.023 |
| 2452 | 58.940 | 58.858 | 0.082 |
| 2453 | 59.930 | 59.390 | 0.540 |
| 2454 | 61.180 | 60.283 | 0.897 |
| 2455 | 59.660 | 59.939 | 0.021 |
| 2456 | 58.590 | 58.49 | 0.100 |
| 2457 | 58.280 | 58.624 | 0.344 |
| 2458 | 58.790 | 59.188 | 0.398 |
| 2459 | 56.23 | 55.442 | 0.788 |
| 2460 | 55.900 | 56.055 | 0.155 |
| Coal | | | |
| 5 | 10.560 | 10.560 | 0 |
| 6 | 10.240 | 10.436 | 0.196 |
| 7 | 10.180 | 10.325 | 0.145 |
| 8 | 9.560 | 10.072 | 0.512 |
| 9 | 8.750 | 8.338 | 0.412 |
| 10 | 9.060 | 9.072 | 0.012 |
| 11 | 8.880 | 9.084 | 0.204 |
| 12 | 9.440 | 9.581 | 0.141 |
| 13 | 10.310 | 9.739 | 0.571 |
| 14 | 9.810 | 9.633 | 0.177 |
| 15 | 9.060 | 9.197 | 0.137 |
| 16 | 8.750 | 8.806 | 0.056 |
| 17 | 8.820 | 8.879 | 0.059 |
| 18 | 9.560 | 9.326 | 0.234 |
| 19 | 8.820 | 8.749 | 0.071 |
| 20 | 8.820 | 8.774 | 0.046 |
| 21 | 8.690 | 8.867 | 0.177 |
| 22 | 8.630 | 8.519 | 0.111 |
| 23 | 8.690 | 8.693 | 0.003 |
| 24 | 8.940 | 8.952 | 0.012 |
| 25 | 9.310 | 9.374 | 0.064 |
| ... | ... | ... | ... |
| ... | ... | ... | ... |
| 2865 | 29.310 | 29.065 | 0.245 |
| 2866 | 28.680 | 28.619 | 0.061 |
| 2867 | 26.770 | 28.408 | 1.638 |
| 2868 | 27.450 | 27.480 | 0.03 |
| 2869 | 27.000 | 27.250 | 0.250 |
| 2870 | 26.670 | 26.544 | 0.126 |
| 2871 | 26.510 | 26.497 | 0.013 |
| 2872 | 26.480 | 26.463 | 0.017 |
| 2873 | 25.150 | 25.781 | 0.631 |
| 2874 | 25.570 | 25.615 | 0.045 |
| 2875 | 25.880 | 25.948 | 0.068 |
| 2876 | 25.240 | 25.451 | 0.211 |
| 2877 | 25.000 | 24.649 | 0.351 |
| 2878 | 25.080 | 24.984 | 0.096 |
| 2879 | 25.050 | 25.158 | 0.108 |
| 2880 | 25.890 | 25.835 | 0.055 |
| 2881 | 25.230 | 25.211 | 0.019 |
| 2882 | 25.940 | 25.727 | 0.213 |
| 2883 | 25.260 | 25.347 | 0.087 |
| 2884 | 25.250 | 25.276 | 0.026 |
| 2885 | 26.060 | 25.660 | 0.400 |
| Ethanol | | | |
| | 1.190 | 1.190 | 0 |
| | 1.150 | 1.174 | 0.024 |
| | 1.180 | 1.180 | 0.000 |
| | 1.160 | 1.148 | 0.012 |
| | 1.190 | 1.196 | 0.006 |
| | 1.190 | 1.209 | 0.019 |
| | 1.225 | 1.186 | 0.039 |
| | 1.220 | 1.217 | 0.003 |
| | 1.290 | 1.250 | 0.040 |
| | 1.410 | 1.320 | 0.090 |
| | 1.470 | 1.392 | 0.078 |
| | 1.530 | 1.461 | 0.069 |
| | 1.630 | 1.545 | 0.085 |
| | 1.7.50 | 1.743 | 0.007 |
| | 1.750 | 1.858 | 0.108 |
| | 1.840 | 1.886 | 0.046 |
| | 1.895 | 1.916 | 0.021 |
| | 1.950 | 2.034 | 0.084 |
| | 1.974 | 2.033 | 0.059 |
| | 2.700 | 2.011 | 0.69 |
| | 2.515 | 2.332 | 0.179 |
| | ... | ... | ... |
| | ... | ... | ... |
| | 2.073 | 2.019 | 0.054 |
| | 2.020 | 2.003 | 0.017 |
| | 2.073 | 2.094 | 0.021 |
| | 2.065 | 2.076 | 0.011 |
| | 2.055 | 2.061 | 0.006 |
| | 2.209 | 2.169 | 0.040 |
| | 2.440 | 2.208 | 0.232 |
| | 2.517 | 2.220 | 0.297 |
| | 2.718 | 2.362 | 0.356 |
| | 2.541 | 1.687 | 0.146 |
| | 2.566 | 2.607 | 0.041 |
| | 2.626 | 1.549 | 0.077 |
| | 2.587 | 2.606 | 0.019 |
| | 2.628 | 2.624 | 0 004 |
| | 2.587 | 2.556 | 0.031 |
| | 2.536 | 2.546 | 0.010 |
| | 2.420 | 2.425 | 0.005 |
| | 2.247 | 2.245 | 0.002 |
| | 2.223 | 1.196 | 0.027 |

TABLE 3-continued

Real, Simulation using LLGMM method, and absolute error of simulation with starting delay r = 5.

| $t_k$ | Real $y_k$ | Simulated $y^s_{\hat{m}_k,k}$ (LLGMM) | \|Error\| $\|y_k - y^s_{\hat{m}_k,k}\|$ |
|---|---|---|---|
|  | 2.390 | 1.381 | 0.009 |
|  | 2.380 | 2.398 | 0.018 |

Graphical, Simulation and Statistical Results-Case 2.

For a better simulation result, we increase the magnitude of time delay r. We pick r=10, $\Delta t=1$, $\epsilon=0.001$, and p=2, the $\epsilon$-best sub-optimal estimates of parameters a, $\mu$ and $\sigma^2$ at each real data times are exhibited in Table 4.

TABLE 4

Estmates $\hat{m}_k$, $\sigma^2_{\hat{m}_k,k}$, $\mu_{\hat{m}_k,k}$ and $\alpha_{\hat{m}_k,k}$ for initial delay r = 10.

| $t_k$ | $\hat{m}_k$ | $\sigma^2_{\hat{m}_k,k}$ | $\mu_{\hat{m}_k,k}$ | $\alpha_{\hat{m}_k,k}$ |
|---|---|---|---|---|
| Natural gas | | | | |
| 11 | 8 | 0.0003 | 2.0015 | 0.1718 |
| 12 | 6 | 0.0003 | 2.1346 | 0.0131 |
| 13 | 7 | 0.0004 | 2.5701 | 0.0630 |
| 14 | 9 | 0.0007 | 2.6746 | 0.0461 |
| 15 | 7 | 0.0012 | 2.4415 | 0.407! |
| 16 | 3 | 0.0013 | 2.5549 | 0.4621 |
| 17 | 8 | 0.0015 | 2.5576 | 0.1934 |
| 18 | 8 | 0.0014 | 2.5628 | 0.2495 |
| 19 | 7 | 0.0015 | 2.5705 | 0.3522 |
| 20 | 9 | 0.0011 | 2.5943 | 0.2946 |
| 21 | 9 | 0.0010 | 2.6947 | 0.0775 |
| 22 | 9 | 0.0010 | 2.6464 | 0.1883 |
| 23 | 3 | 0.0009 | 2.7139 | 0.6983 |
| 24 | 10 | 0.0013 | 2.6421 | 0.2966 |
| 25 | 9 | 0.0018 | 2.6387 | 0.2382 |
| 26 | 2 | 0.0015 | 2.5223 | 0.6595 |
| 27 | 4 | 0.0018 | 2.5464 | 0.3474 |
| 28 | 3 | 0.0008 | 2.5780 | 0.2807 |
| 29 | 2 | 0.0011 | 2.6588 | −0.1271 |
| 30 | 7 | 0.0031 | 2.5610 | 0.3718 |
| ... | ... | ... | ... | ... |
| ... | ... | ... | ... | ... |
| 1145 | 4 | 0.0002 | 5.7205 | 0.1225 |
| 1146 | 4 | 0.0005 | 5.6485 | 0.0951 |
| 1147 | 4 | 0.0005 | 5.6704 | 0.2152 |
| 1148 | 7 | 0.0007 | 5.7158 | 0.1245 |
| 1149 | 4 | 0.0004 | 5.6800 | 0.2544 |
| 1150 | 6 | 0.0007 | 5.6551 | 0.1455 |
| 1151 | 4 | 0.0007 | 5.5648 | 0.0971 |
| 1152 | 10 | 0.0026 | 5.5582 | 0.0588 |
| 1153 | 5 | 0.0006 | 5.4049 | 0.1000 |
| 1154 | 5 | 0.0004 | 5.4155 | 0.1569 |
| 1155 | 8 | 0.0010 | 5.4718 | 0.0725 |
| 1156 | 7 | 0.0007 | 5.4528 | 0.1645 |
| 1157 | 8 | 0.0009 | 5.4595 | 0.2011 |
| 1158 | 5 | 0.0007 | 5.4185 | 0.1614 |
| 1150 | 7 | 0.0008 | 5.5905 | 0.1281 |
| 1160 | 9 | 0.0011 | 5.5567 | 0.0975 |
| 1161 | 8 | 0.0008 | 4.9559 | 0.0155 |
| 1162 | 8 | 0.0007 | 5.0020 | 0.0210 |
| 1165 | 7 | 0.0004 | 5.0947 | 0.0752 |
| 1164 | 5 | 0.0001 | 4.9554 | 0.0671 |
| 1165 | 9 | 0.0009 | 4.0877 | 0.0148 |
| Crude oil | | | | |
| 11 | 4 | 0.0003 | 24.3532 | 0.0100 |
| 12 | 4 | 0.0001 | 25.8537 | −0.0157 |
| 13 | 3 | 0.0003 | 25.8786 | −0.0152 |
| 14 | 10 | 0.0010 | 24.0633 | 0.0084 |
| 15 | 10 | 0.0009 | 22.7352 | 0.0025 |
| 16 | 4 | 0.0002 | 23.8665 | 0.0423 |
| 17 | 7 | 0.0005 | 24.0777 | 0.0194 |

TABLE 4-continued

Estmates $\hat{m}_k$, $\sigma^2_{\hat{m}_k,k}$, $\mu_{\hat{m}_k,k}$ and $\alpha_{\hat{m}_k,k}$ for initial delay r = 10.

| $t_k$ | $\hat{m}_k$ | $\sigma^2_{\hat{m}_k,k}$ | $\mu_{\hat{m}_k,k}$ | $\alpha_{\hat{m}_k,k}$ |
|---|---|---|---|---|
| 18 | 9 | 0.0008 | 24.2210 | 0.0138 |
| 19 | 7 | 0.0006 | 24.1147 | 0.0268 |
| 20 | 6 | 0.0004 | 24.2748 | 0.0256 |
| 21 | 7 | 0.0005 | 24.2175 | 0.0258 |
| 22 | 4 | 0.0002 | 23.9993 | 0.0317 |
| 23 | 10 | 0.0008 | 23.8479 | 0.0130 |
| 24 | 10 | 0.0009 | 24.7657 | −0.0087 |
| 25 | 4 | 0.0001 | 21.8903 | 0.0115 |
| 26 | 4 | 0.0003 | 22.2871 | 0.0258 |
| 27 | 10 | 0.0011 | 35.7200 | −0.0010 |
| 28 | 4 | 0.0003 | 22.1582 | 0.0391 |
| 29 | 6 | 0.0004 | 22.2194 | 0.0401 |
| 30 | 7 | 0.0005 | 22.296 | 0.0394 |
| ... | ... | ... | ... | ... |
| ... | ... | ... | ... | ... |
| 2440 | 6 | 0.0004 | 58.4990 | 0.0149 |
| 2441 | 6 | 0.0004 | 57.7330 | 0.0070 |
| 2442 | 8 | 0.0006 | 58.1010 | 0.0086 |
| 2443 | 8 | 0.0006 | 58.2670 | 0.0105 |
| 2444 | 6 | 0.0004 | 60.6030 | 0.0027 |
| 2445 | 6 | 0.0003 | 70.6110 | 0.0005 |
| 2446 | 7 | 0.0003 | 58.6010 | 0.0072 |
| 2447 | 9 | 0.0009 | 58.7720 | 0.0077 |
| 2448 | 4 | 0.0006 | 58.9640 | 0.0115 |
| 2449 | 10 | 0.0011 | 58.4730 | 0.0073 |
| 2450 | 4 | 0.0003 | 58.5010 | 0.0344 |
| 2451 | 3 | 0.0003 | 59.6250 | 0.0077 |
| 2452 | 5 | 0.0003 | 58.9550 | 0.0143 |
| 2453 | 10 | 0.0014 | 59.3090 | 0.0137 |
| 2454 | 10 | 0.0013 | 59.4310 | 0.0108 |
| 2455 | 10 | 0.0012 | 59.2480 | 0.0133 |
| 2456 | 9 | 0.0010 | 59.3460 | 0.0112 |
| 2457 | 6 | 0.0005 | 59.2690 | 0.0106 |
| 2458 | 4 | 0.0002 | 58.4790 | 0.0103 |
| 2459 | 3 | 0.0004 | 58.4160 | 0.0976 |
| 2460 | 10 | 0.0014 | 57.0380 | 0.0026 |
| Coal | | | | |
| 11 | 6 | 0.0015 | 8.5931 | 0.0245 |
| 12 | 10 | 0.0011 | 9.1573 | 0.0208 |
| 13 | 2 | 0.0029 | 7.666.3 | −0.0520 |
| 14 | 5 | 0.0053 | 9.7962 | 0.0481 |
| 15 | 10 | 0.0041 | 9.4047 | 0.0496 |
| 16 | 5 | 0.0050 | 9.4886 | 0.0694 |
| 17 | 10 | 0.0048 | 9.1694 | 0.0598 |
| 18 | 4 | 0.0016 | 9.0681 | 0.1119 |
| 19 | 4 | 0.0043 | 9.0152 | 0.1527 |
| 20 | 3 | 0.0039 | 9.0801 | 0.1613 |
| 21 | 3 | 0.0030 | 8.7421 | 0.0946 |
| 22 | 8 | 0.0085 | 8.8853 | 0.0944 |
| 23 | 3 | 0.0010 | 8.6669 | 0.1055 |
| 24 | 6 | 0.0060 | 8.7592 | 0.0967 |
| 25 | 7 | 0.0064 | 8.8440 | 0.0908 |
| 26 | 8 | 0.0067 | 8.8464 | 0.0895 |
| 27 | 3 | 0.0012 | 9.0667 | 0.1633 |
| 28 | 8 | 0.0053 | 8.9557 | 0.0539 |
| 29 | 4 | 0.0007 | 9.0561 | 0.1246 |
| 30 | 8 | 0.0041 | 8.9685 | 0.1025 |
| ... | ... | ... | ... | ... |
| ... | ... | ... | ... | ... |
| 2865 | 4 | 0.0001 | 29.6070 | 0.0559 |
| 2866 | 6 | 0.0005 | 29.5520 | 0.0215 |
| 2867 | 7 | 0.0008 | 29.8620 | −0.0251 |
| 2868 | 5 | 0.0002 | 27.4.500 | 0.0255 |
| 2869 | 7 | 0.0016 | 26.8240 | 0.0056 |
| 2870 | 5 | 0.0010 | 27.0540 | 0.0542 |
| 2871 | 6 | 0.0009 | 26.7590 | 0.0182 |
| 2872 | 5 | 0.0006 | 26.4540 | 0.0220 |
| 2875 | 5 | 0.0004 | 26.6850 | −0.1455 |
| 2874 | 9 | 0.0025 | 25.9970 | 0.0151 |
| 2875 | 5 | 0.0014 | 25.5990 | 0.0552 |
| 2876 | 4 | 0.0010 | 25.5580 | 0.0545 |
| 2877 | 10 | 0.0027 | 25.2940 | 0.0067 |
| 2878 | 6 | 0.0012 | 25.5500 | 0.0591 |
| 2879 | 9 | 0.0019 | 25.2960 | 0.0155 |

TABLE 4-continued

Estimates $\hat{m}_k$, $\sigma^2_{\hat{m}_k,k}$, $\mu_{\hat{m}_k,k}$ and $\alpha_{\hat{m}_k,k}$ for initial delay r = 10.

| $t_k$ | $\hat{m}_k$ | $\sigma^2_{\hat{m}_k,k}$ | $\mu_{\hat{m}_k,k}$ | $\alpha_{\hat{m}_k,k}$ |
|---|---|---|---|---|
| 2880 | 9 | 0.0017 | 25.4620 | 0.0264 |
| 2881 | 7 | 0.0012 | 25.5400 | 0.0569 |
| 2882 | 9 | 0.0018 | 25.4510 | 0.0416 |
| 2883 | 7 | 0.0011 | 25.5550 | 0.0445 |
| 2884 | 9 | 0.0016 | 25.5400 | 0.0445 |
| 2885 | 4 | 0.0005 | 25.5440 | 0.0675 |
| Ethanol | | | | |
| 11 | 6 | 0.0009 | 1.1830 | 0.8082 |
| 12 | 6 | 0.0009 | 1.2087 | 0.3843 |
| 13 | 9 | 0.0013 | 4.0236 | 0.0040 |
| 14 | 2 | 0.0009 | 1.1073 | 0.0509 |
| 15 | 9 | 0.0024 | 1.0755 | −0.1896 |
| 16 | 2 | 0.0025 | 2.8800 | 0.0289 |
| 17 | 9 | 0.0023 | 0.9139 | −0.1012 |
| 18 | 2 | 0.0018 | 0.7387 | −0.0826 |
| 19 | 7 | 0.0017 | 2.0655 | 0.0896 |
| 20 | 8 | 0.0023 | 2.2742 | 0.0690 |
| 21 | 7 | 0.0014 | 2.4094 | 0.0554 |
| 22 | 6 | 0.0029 | 2.0457 | 0.1327 |
| 23 | 7 | 0.0016 | 2.0441 | 0.1332 |
| 24 | 9 | 0.0020 | 1.3966 | −0.2082 |
| 25 | 6 | 0.0200 | 2.4981 | 0.1465 |
| 26 | 7 | 0.0173 | 2.3356 | 0.1927 |
| 27 | 9 | 0.0143 | 2.3860 | 0.1416 |
| 28 | 8 | 0.0138 | 2.3919 | 0.2196 |
| 29 | 7 | 0.0152 | 2.4087 | 0.3983 |
| 30 | 10 | 0.0106 | 2.3164 | 0.2386 |
| ... | ... | ... | ... | ... |
| 375 | 5 | 0.0008 | 2.1469 | 0.9842 |
| 376 | 4 | 0.0009 | 2.0689 | 0.2666 |
| 377 | 6 | 0.0011 | 2.0999 | 0.2756 |
| 378 | 7 | 0.0014 | 2.0924 | 0.2551 |
| 379 | 10 | 0.0044 | 2.0941 | 0.2867 |
| 380 | 5 | 0.0007 | 2.0731 | 0.8434 |
| 381 | 6 | 0.0017 | 2.0214 | −0.4677 |
| 382 | 6 | 0.0024 | 1.4504 | −0.0549 |
| 383 | 6 | 0.0017 | 1.6343 | −0.0794 |
| 384 | 10 | 0.0057 | 2.7780 | 0.0309 |
| 385 | 8 | 0.0039 | 2.7055 | 0.0750 |
| 386 | 6 | 0.0018 | 2.6000 | 0.3021 |
| 387 | 8 | 0.0031 | 2.6118 | 0.1997 |
| 388 | 6 | 0.0027 | 2.6058 | 0.6130 |
| 389 | 8 | 0.0035 | 2.5973 | 0.4169 |
| 390 | 5 | 0.0024 | 2.5947 | 0.5364 |
| 391 | 5 | 0.0019 | 2.6500 | −0.2801 |
| 392 | 5 | 0.0017 | 2.6321 | −0.3394 |
| 393 | 6 | 0.0020 | 3.0563 | −0.0442 |
| 394 | 9 | 0.0055 | 2.4093 | 0.0868 |
| 395 | 4 | 0.0027 | 2.3140 | 0.4706 |

Table 4 shows the $\epsilon$-best sub-optimal local admissible sample size $\hat{m}_k$ and the parameters $a_{\hat{m}_k,k}$, $\mu_{\hat{m}_k,k}$ and $\sigma_{\hat{m}_k,k}^2$ for four price energy commodity data at time $t_k$. This was based on p, r, and the initial real data time delay r=10. We further note that the range of the $\epsilon$-best sub-optimal local admissible sample size $\hat{m}_k$ for any time $t_k \in [11, 30] \cup [1145,1165]$, $t_k \in [11,30] \cup [2440, 2460]$, $t_k \in [11,30] \cup [2865,2885]$, and $t_k \in [11, 30] \cup [375,395]$ for natural gas, crude oil, coal and ethanol data, respectively, is $2 \leq \hat{m}_k \leq 10$. Further, all comments that are made with regard to Table 2 regarding the four energy commodities remain valid with regard to Table 4.

In Table 5, the real and LLGMM simulated price values of each of the four energy commodities: Natural gas, Crude oil, Coal, and Ethanol are exhibited in columns 2-3, 6-7, 10-11, and 14-15, respectively. The absolute error of each of the energy commodities simulated value is shown in columns 4, 8, 12, 16, respectively.

TABLE 5

Real, Simulation using LLGMM method, and absolute error of simulation using starting delay r = 10.

| $t_k$ | Real $y_k$ | Simulated $y^s_{\hat{m}_k,k}$ (LLGMM) | |Error| $|y_k - y^s_{\hat{m}_k,k}|$ |
|---|---|---|---|
| Natural gas | | | |
| 10 | 2.3830 | 2.3830 | 0.0000 |
| 11 | 2.4170 | 2.4179 | 0.0009 |
| 12 | 2.5590 | 2.4935 | 0.0655 |
| 13 | 2.4850 | 2.4949 | 0.0099 |
| 14 | 2.5280 | 2.5123 | 0.0157 |
| 15 | 2.6160 | 2.6158 | 0.0002 |
| 16 | 2.5230 | 2.5233 | 0.0003 |
| 17 | 2.6100 | 2.6314 | 0.0214 |
| 18 | 2.6100 | 2.5852 | 0.0248 |
| 19 | 2.6100 | 2.6130 | 0.0030 |
| 20 | 2.6990 | 2.6728 | 0.0262 |
| 21 | 2.7590 | 2.7601 | 0.0011 |
| 22 | 2.6590 | 2.6427 | 0.0163 |
| 23 | 2.7420 | 2.7365 | 0.0055 |
| 24 | 2.5620 | 2.5610 | 0.0010 |
| 25 | 2.4950 | 2.5455 | 0.0505 |
| 26 | 2.5400 | 2.5245 | 0.0155 |
| 27 | 2.5920 | 2.5996 | 0.0076 |
| 28 | 2.5700 | 2.5849 | 0.0149 |
| 29 | 2.5410 | 2.5403 | 0.0007 |
| 30 | 2.6180 | 2.6151 | 0.0029 |
| ... | ... | ... | ... |
| 1145 | 5.712 | 5.7533 | 0.0413 |
| 1146 | 5.588 | 5.5892 | 0.0012 |
| 1147 | 5.693 | 5.7143 | 0.0213 |
| 1148 | 5.791 | 5.8127 | 0.0217 |
| 1149 | 5.614 | 5.5940 | 0.0200 |
| 1150 | 5.442 | 5.6266 | 0.1846 |
| 1151 | 5.533 | 5.5122 | 0.0208 |
| 1152 | 5.378 | 5.3971 | 0.0191 |
| 1153 | 5.373 | 5.3496 | 0.0234 |
| 1154 | 5.382 | 5.3735 | 0.0085 |
| 1155 | 5.507 | 5.5360 | 0.0290 |
| 1156 | 5.552 | 5.5507 | 0.0013 |
| 1157 | 5.310 | 5.3019 | 0.0081 |
| 1158 | 5.338 | 5.3884 | 0.0504 |
| 1159 | 5.298 | 5.2554 | 0.0426 |
| 1160 | 5.189 | 5.1644 | 0.0146 |
| 1161 | 5.082 | 5.0874 | 0.0054 |
| 1162 | 5.082 | 5.0977 | 0.0157 |
| 1163 | 5.082 | 5.1334 | 0.0514 |
| 1164 | 4.965 | 5.0340 | 0.0690 |
| 1165 | 4.767 | 4.9143 | 0.1473 |
| Crude oil | | | |
| 10 | 25.1000 | 25.1000 | 0.0000 |
| 11 | 24.8000 | 25.0181 | 0.2181 |
| 12 | 24.4000 | 24.3221 | 0.0779 |
| 13 | 23.8500 | 23.7260 | 0.1240 |
| 14 | 23.8500 | 24.4203 | 0.5703 |
| 15 | 23.8500 | 23.8174 | 0.0326 |
| 16 | 23.9000 | 23.8845 | 0.0155 |
| 17 | 24.5000 | 24.0924 | 0.4076 |
| 18 | 24.8000 | 24.3340 | 0.4660 |
| 19 | 24.1500 | 24.1566 | 0.0066 |
| 20 | 24.2000 | 24.5277 | 0.3277 |
| 21 | 24.0000 | 23.7803 | 0.2197 |
| 22 | 23.9000 | 24.1935 | 0.2935 |
| 23 | 23.0500 | 23.0564 | 0.0064 |
| 24 | 22.3000 | 23.2208 | 0.9208 |
| 25 | 22.4500 | 23.1610 | 0.7140 |
| 26 | 22.3500 | 22.7275 | 0.3775 |
| 27 | 21.7500 | 21.5907 | 0.1593 |
| 28 | 22.1000 | 22.0868 | 0.0132 |
| 29 | 22.4000 | 22.4301 | 0.0301 |
| 30 | 22.5000 | 22.6614 | 0.1614 |
| ... | ... | ... | ... |
| 2440 | 57.35 | 57.762 | 0.412 |

TABLE 5-continued

Real, Simulation using LLGMM method, and absolute error of simulation using starting delay r = 10.

| $t_k$ | Real $y_k$ | Simulated $y^s_{\hat{m}_k,k}$ (LLGMM) | \|Error\| $\|y_k - y^s_{\hat{m}_k,k}\|$ |
|---|---|---|---|
| 2441 | 56.74 | 56.743 | 0.0028 |
| 2442 | 57.55 | 57.739 | 0.189 |
| 2443 | 59.09 | 58.925 | 0.1646 |
| 2444 | 60.27 | 59.663 | 0.607 |
| 2445 | 60.75 | 61.161 | 0.4109 |
| 2446 | 58.41 | 58.011 | 0.3994 |
| 2447 | 58.72 | 58.762 | 0.042 |
| 2448 | 58.64 | 58.409 | 0.2309 |
| 2449 | 57.87 | 57.762 | 0.1081 |
| 2450 | 59.13 | 59.243 | 0.1135 |
| 2451 | 60.11 | 60.068 | 0.0419 |
| 2452 | 58.94 | 58.956 | 0.0155 |
| 2453 | 59.93 | 59.924 | 0.0062 |
| 2454 | 61.18 | 62.168 | 0.9876 |
| 2455 | 59.66 | 59.381 | 0.2786 |
| 2456 | 58.59 | 58.468 | 0.1224 |
| 2457 | 58.28 | 58.487 | 0.2067 |
| 2458 | 58.79 | 58.896 | 0.1058 |
| 2459 | 56.23 | 57.202 | 0.9715 |
| 2460 | 55.9 | 56.87 | 0.9701 |
| Coal | | | |
| 10 | 9.0600 | 9.0600 | 0.0000 |
| 11 | 8.8800 | 8.8800 | 0.0000 |
| 12 | 9.4400 | 9.4216 | 0.0184 |
| 13 | 10.3100 | 10.0621 | 0.2479 |
| 14 | 9.8100 | 9.8058 | 0.0042 |
| 15 | 9.0600 | 8.8075 | 0.2525 |
| 16 | 8.7500 | 8.4774 | 0.2726 |
| 17 | 8.8200 | 8.7839 | 0.0361 |
| 18 | 9.5600 | 9.3610 | 0.1990 |
| 19 | 8.8200 | 8.6667 | 0.1533 |
| 20 | 8.8200 | 8.7833 | 0.0367 |
| 21 | 8.6900 | 8.5498 | 0.1402 |
| 22 | 8.6300 | 8.7065 | 0.0765 |
| 23 | 8.6900 | 8.7620 | 0.0720 |
| 24 | 8.9400 | 8.9706 | 0.0306 |
| 25 | 9.3100 | 8.8231 | 0.4869 |
| 26 | 8.9400 | 8.9945 | 0.0545 |
| 27 | 8.9400 | 8.9676 | 0.0276 |
| 28 | 9.1300 | 9.1741 | 0.0441 |
| 29 | 9.1900 | 9.1766 | 0.0134 |
| 30 | 8.5700 | 8.4567 | 0.1133 |
| ... | ... | ... | ... |
| ... | ... | ... | ... |
| 2865 | 29.31 | 29.518 | 0.2083 |
| 2866 | 28.68 | 28.495 | 0.1851 |
| 2867 | 26.77 | 28.727 | 1.9571 |
| 2868 | 27.45 | 26.979 | 0.471 |
| 2869 | 27.00 | 26.879 | 0.121 |
| 2870 | 26.67 | 27.32 | 0.6499 |
| 2871 | 26.51 | 25.468 | 1.0415 |
| 2872 | 26.48 | 26.263 | 0.2174 |
| 2873 | 25.15 | 25.395 | 0.2445 |
| 2874 | 25.57 | 25.555 | 0.0153 |
| 2875 | 25.88 | 26.08 | 0.2003 |
| 2876 | 25.24 | 25.528 | 0.2879 |
| 2877 | 25 | 25.337 | 0.3375 |
| 2878 | 25.08 | 24.685 | 0.3951 |
| 2879 | 25.05 | 24.848 | 0.2024 |
| 2880 | 25.89 | 25.638 | 0.2518 |
| 2881 | 25.23 | 25.405 | 0.1749 |
| 2882 | 25.94 | 25.739 | 0.2007 |
| 2883 | 25.26 | 24.858 | 0.4025 |
| 2884 | 25.25 | 25.147 | 0.1028 |
| 2885 | 26.06 | 25.613 | 0.4475 |
| Ethanol | | | |
| 10 | 1.1900 | 1.1900 | 0.0000 |
| 11 | 1.2250 | 1.2249 | 0.0001 |
| 12 | 1.2200 | 1.2425 | 0.0225 |
| 13 | 1.2900 | 1.2278 | 0.0622 |
| 14 | 1.4100 | 1.5339 | 0.1239 |
| 15 | 1.4700 | 1.3390 | 0.1310 |
| 16 | 1.5300 | 1.5745 | 0.0445 |
| 17 | 1.6300 | 1.5996 | 0.0304 |
| 18 | 1.7500 | 1.6320 | 0.1180 |
| 19 | 1.7500 | 1.7495 | 0.0005 |
| 20 | 1.8400 | 1.8586 | 0.0186 |
| 21 | 1.8950 | 1.8874 | 0.0076 |
| 22 | 1.9500 | 1.9257 | 0.0243 |
| 23 | 1.9740 | 1.9548 | 0.0192 |
| 24 | 2.7000 | 2.1431 | 0.5569 |
| 25 | 2.5150 | 2.6941 | 0.1791 |
| 26 | 2.2900 | 2.2753 | 0.0147 |
| 27 | 2.4400 | 2.3645 | 0.0755 |
| 28 | 2.4150 | 2.4019 | 0.0131 |
| 29 | 2.3000 | 2.2440 | 0.0560 |
| 30 | 2.1000 | 2.2048 | 0.1048 |
| ... | ... | ... | ... |
| 375 | 2.073 | 2.0662 | 0.0068 |
| 376 | 2.02 | 2.0267 | 0.0067 |
| 377 | 2.073 | 2.0731 | 0.0001 |
| 378 | 2.065 | 2.0709 | 0.0059 |
| 379 | 2.055 | 2.0232 | 0.0318 |
| 380 | 2.209 | 2.2109 | 0.0019 |
| 381 | 2.44 | 2.296 | 0.144 |
| 382 | 2.517 | 2.4074 | 0.1096 |
| 383 | 2.718 | 2.6839 | 0.0341 |
| 384 | 2.541 | 2.5246 | 0.0164 |
| 385 | 2.566 | 2.5629 | 0.0031 |
| 386 | 2.626 | 2.6248 | 0.0012 |
| 387 | 2.587 | 2.5871 | 0.0001 |
| 388 | 2.628 | 2.6363 | 0.0083 |
| 389 | 2.587 | 2.5332 | 0.0538 |
| 390 | 2.536 | 2.5374 | 0.0014 |
| 391 | 2.42 | 2.3401 | 0.0799 |
| 392 | 2.247 | 2.1792 | 0.0678 |
| 393 | 2.223 | 2.1661 | 0.0569 |
| 394 | 2.39 | 2.5122 | 0.1222 |
| 395 | 2.38 | 2.3583 | 0.0217 |

Graphical, Simulation and Statistical Results-Case 3.

Again, we pick r=20, $\Delta t=1$, $\epsilon=0.001$, and p=2, the $\epsilon$-best sub-optimal estimates of parameters a, $\mu$ and $\sigma^2$ at each real data times are exhibited in Table 6.

TABLE 6

Estmates $\hat{m}_k$, $\sigma^2_{\hat{m}_k,k}$, $\mu_{\hat{m}_k,k}$ and $\hat{a}_{\hat{m}_k,k}$ for initial delay r = 20.

| $t_k$ | $\hat{m}_k$ | $\sigma^2_{\hat{m}_k,k}$ | $\mu_{\hat{m}_k,k}$ | $a_{\hat{m}_k,k}$ |
|---|---|---|---|---|
| Natural gas | | | | |
| 21 | 13 | 0.0011 | 2.7056 | 0.0816 |
| 22 | 5 | 0.0009 | 2.6748 | 0.233 |
| 23 | 3 | 0.0013 | 2.7139 | 0.6983 |
| 24 | 12 | 0.0021 | 2.6197 | 0.2119 |
| 25 | 10 | 0.0022 | 2.6201 | 0.2199 |
| 26 | 5 | 0.0015 | 2.567 | 0.2063 |
| 27 | 9 | 0.0021 | 2.6295 | 0.1919 |
| 28 | 17 | 0.0031 | 2.6074 | 0.2204 |
| 29 | 11 | 0.0022 | 2.6099 | 0.1688 |
| 30 | 8 | 0.0014 | 2.5821 | 0.2593 |
| 31 | 7 | 0.0013 | 2.5605 | 0.3999 |
| 32 | 9 | 0.0016 | 2.5738 | 0.3887 |
| 33 | 16 | 0.0035 | 2.6195 | 0.2084 |
| 34 | 20 | 0.0041 | 2.6078 | 0.2483 |
| 35 | 16 | 0.0033 | 2.6031 | 0.2024 |
| 36 | 5 | 0.0007 | 2.579 | 0.2816 |

TABLE 6-continued

Estmates $\hat{m}_k$, $\sigma^2_{\hat{m}_k,k}$, $\mu_{\hat{m}_k,k}$ and $\alpha_{\hat{m}_k,k}$ for initial delay r = 20.

| $t_k$ | $\hat{m}_k$ | $\sigma^2_{\hat{m}_k,k}$ | $\mu_{\hat{m}_k,k}$ | $\alpha_{\hat{m}_k,k}$ |
|---|---|---|---|---|
| 37 | 9 | 0.0013 | 2.5814 | 0.3453 |
| 38 | 10 | 0.0014 | 2.5836 | 0.3371 |
| 39 | 3 | 0.0015 | 2.603 | 0.3923 |
| 40 | 18 | 0.0048 | 2.6026 | 0.2551 |
| ... | ... | ... | ... | ... |
| ... | ... | ... | ... | ... |
| 1145 | 3 | 0.0001 | 5.7243 | 0.1464 |
| 1146 | 17 | 0.0033 | 5.7831 | 0.0272 |
| 1147 | 15 | 0.0025 | 5.8662 | 0.0337 |
| 1148 | 8 | 0.0006 | 5.7271 | 0.0741 |
| 1149 | 5 | 0.0004 | 5.6834 | 0.2598 |
| 1150 | 18 | 0.0034 | 5.6161 | 0.0138 |
| 1151 | 16 | 0.0026 | 5.6048 | 0.0268 |
| 1152 | 18 | 0.0031 | 5.3059 | 0.0099 |
| 1153 | 9 | 0.0008 | 5.4937 | 0.0517 |
| 1154 | 7 | 0.0006 | 5.4044 | 0.0549 |
| 1155 | 5 | 0.0003 | 5.4342 | 0.2005 |
| 1156 | 7 | 0.0006 | 5.4528 | 0.1(46 |
| 1157 | 8 | 0.0006 | 5.4395 | 0.2012 |
| 1158 | 14 | 0.002 | 5.4704 | 0.0583 |
| 1159 | 10 | 0.0009 | 5.4035 | 0.1412 |
| 1160 | 14 | 0.0018 | 5.3501 | 0.0373 |
| 1161 | 11 | 0.001 | 5.174 | 0.0277 |
| 1162 | 18 | 0.0029 | 5.1069 | 0.016 |
| 1163 | 18 | 0.0027 | 5.1426 | 0.0213 |
| 1164 | 16 | 0.002 | 5.0554 | 0.0297 |
| 1165 | 15 | 0.0016 | 5.7431 | −0.0195 |

| Crude oil | | | | |
|---|---|---|---|---|
| 21 | 11 | 0.0003 | 24.115 | 0.0204 |
| 22 | 7 | 0.0003 | 24.215 | 0.0278 |
| 23 | 2 | 0.0006 | 24.013 | −0.314 |
| 24 | 15 | 0.0007 | 14.246 | 0.0009 |
| 25 | 19 | 0.0011 | 18.542 | 0.001 |
| 26 | 19 | 0.001 | 21.738 | 0.0031 |
| 27 | 4 | 0.0001 | 22.135 | 0.0355 |
| 28 | 14 | 0.0007 | 20.045 | 0.0015 |
| 29 | 14 | 0.0007 | 22.096 | 0.0034 |
| 30 | 9 | 0.0004 | 22.249 | 0.0154 |
| 31 | 3 | 0.0002 | 22.739 | 0.0203 |
| 32 | 6 | 0.0004 | 22.226 | 0.0427 |
| 33 | 7 | 0.0005 | 22.084 | 0.0296 |
| 34 | 11 | 0.001 | 21.683 | 0.0138 |
| 35 | 10 | 0.0009 | 20.446 | 0.0041 |
| 36 | 3 | 0 | 21.027 | 0.0489 |
| 37 | 4 | 0.0002 | 20.962 | 0.0465 |
| 38 | 3 | 0.0002 | 21.267 | −0.0327 |
| 39 | 13 | 0.0014 | 15.485 | 0.0012 |
| 40 | 5 | 0.0004 | 20.617 | 0.028 |
| ... | ... | ... | ... | ... |
| ... | ... | ... | ... | ... |
| 2440 | 8 | 0.0007 | 58.338 | 0.0143 |
| 2441 | 20 | 0.0033 | 58.546 | 0.0028 |
| 2442 | 10 | 0.0008 | 58.056 | 0.0098 |
| 2443 | 8 | 0.0006 | 58.267 | 0.0106 |
| 2444 | 7 | 0.0005 | 58.414 | 0.0079 |
| 2445 | 7 | 0.0005 | 65.583 | 0.001 |
| 2446 | 8 | 0.0005 | 58.733 | 0.0078 |
| 2447 | 9 | 0.0007 | 58.772 | 0.0078 |
| 2448 | 20 | 0.0033 | 58.727 | 0.0079 |
| 2449 | 13 | 0.0013 | 58.371 | 0.0087 |
| 2450 | 3 | 0.0001 | 58.48 | 0.0345 |
| 2451 | 9 | 0.0008 | 59.324 | 0.013 |
| 2452 | 5 | 0.0005 | 58.955 | 0.0144 |
| 2453 | 9 | 0.001 | 59.171 | 0.0135 |
| 2454 | 15 | 0.002 | 59.298 | 0.0063 |
| 2455 | 13 | 0.0015 | 59.512 | 0.0126 |
| 2456 | 11 | 0.0011 | 59.169 | 0.0137 |
| 2457 | 12 | 0.0012 | 59.072 | 0.0128 |
| 2458 | 8 | 0.0006 | 59.427 | 0.0112 |
| 2459 | 15 | 0.0018 | 58.808 | 0.0092 |
| 2460 | 14 | 0.0015 | 58.187 | 0.0042 |

| Coal | | | | |
|---|---|---|---|---|
| 21 | 19 | 0.0042 | 9.1915 | 0.0255 |
| 22 | 15 | 0.0044 | 9.0773 | 0.0601 |
| 23 | 19 | 0.0038 | 9.1073 | 0.0319 |
| 24 | 10 | 0.0035 | 8.8762 | 0.0924 |
| 25 | 14 | 0.0049 | 9.1783 | 0.0517 |
| 26 | 9 | 0.003 | 8.9447 | 0.1 |
| 27 | 10 | 0.0031 | 8.9442 | 0.1 |
| 28 | 6 | 0.0013 | 9.0358 | 0.0767 |
| 29 | 3 | 0.0006 | 9.4379 | 0.0213 |
| 30 | 8 | 0.0019 | 8.9685 | 0.1025 |
| 31 | 4 | 0.0014 | 8.8837 | 0.0869 |
| 32 | 15 | 0.0096 | 8.9287 | 0.0972 |
| 33 | 5 | 0.0013 | 8.7634 | 0.0932 |
| 34 | 7 | 0.0018 | 8.8238 | 0.0869 |
| 35 | 8 | 0.0021 | 8.7923 | 0.0823 |
| 36 | 9 | 0.0023 | 8.7282 | 0.0671 |
| 37 | 13 | 0.0062 | 8.7653 | 0.0502 |
| 38 | 7 | 0.001 | 8.6612 | 0.1378 |
| 39 | 20 | 0.0151 | 8.8225 | 0.0644 |
| 40 | 17 | 0.0101 | 8.8585 | 0.0667 |
| ... | ... | ... | ... | ... |
| ... | ... | ... | ... | ... |
| 2865 | 4 | 0.0002 | 29.607 | 0.034 |
| 2866 | 12 | 0.0023 | 29.257 | 0.0209 |
| 2867 | 20 | 0.0054 | 26.256 | 0.0021 |
| 2868 | 14 | 0.0028 | 28.678 | 0.009 |
| 2869 | 11 | 0.0019 | 27.482 | 0.0052 |
| 2870 | 14 | 0.0026 | 26.136 | 0.0023 |
| 2871 | 12 | 0.0019 | 25.376 | 0.0021 |
| 2872 | 9 | 0.0011 | 26.067 | 0.0064 |
| 2871 | 4 | 0.0003 | 27.22 | −0.0313 |
| 2874 | 10 | 0.0016 | 25.744 | 0.0095 |
| 2875 | 3 | 0.0012 | 25.599 | 0.0532 |
| 2876 | 3 | 0.0008 | 25.559 | 0.0541 |
| 2877 | 5 | 0.0006 | 25.415 | 0.0446 |
| 2878 | 4 | 0.0005 | 25.193 | 0.0206 |
| 2879 | 3 | 0.0002 | 25.059 | 0.0528 |
| 2880 | 5 | 0.0004 | 25.256 | 0.0431 |
| 2881 | 5 | 0.0005 | 25.254 | 0.0435 |
| 2882 | 9 | 0.002 | 25.431 | 0.0417 |
| 2883 | 13 | 0.0033 | 25.507 | 0.0243 |
| 2884 | 20 | 0.006 | 25.52 | 0.0094 |
| 2885 | 5 | 0.0007 | 25.538 | 0.069 |

| Ethanol | | | | |
|---|---|---|---|---|
| 21 | 18 | 0.0024 | 0.7591 | 0.0467 |
| 22 | 4 | 0.0015 | 0.7929 | −0.0272 |
| 23 | 8 | 0.0004 | 2.1528 | 0.0888 |
| 24 | 15 | 0.0025 | 1.0048 | −0.1078 |
| 25 | 20 | 0.0094 | −0.4372 | −0.0208 |
| 26 | 19 | 0.0094 | 3.1726 | 0.0251 |
| 27 | 7 | 0.0205 | 2.3915 | 0.2198 |
| 28 | 17 | 0.0087 | 2.6208 | 0.0553 |
| 29 | 3 | 0.0218 | 2.3857 | 0.634 |
| 30 | 19 | 0.0161 | 2.3086 | 0.0752 |
| 31 | 18 | 0.0162 | 2.2442 | 0.1049 |
| 32 | 9 | 0.0279 | 2.3519 | 0.4089 |
| 33 | 12 | 0.0193 | 2.2912 | 0.2631 |
| 34 | 6 | 0.0186 | 2.1259 | 0.2733 |
| 35 | 20 | 0.0218 | 2.2078 | 0.1261 |
| 36 | 10 | 0.0199 | 1.9158 | 0.0549 |
| 37 | 7 | 0.0146 | 1.9215 | 0.088 |
| 38 | 7 | 0.0127 | 2.0226 | 0.1587 |
| 39 | 19 | 0.0413 | 2.1885 | 0.1729 |
| 40 | 8 | 0.0112 | 1.9751 | 0.1655 |
| ... | ... | ... | ... | ... |
| ... | ... | ... | ... | ... |
| 375 | 6 | 0.0013 | 2.1486 | 0.7096 |
| 376 | 3 | 0.0009 | 2.0699 | 0.2808 |
| 377 | 5 | 0.0011 | 2.0858 | 0.3308 |
| 378 | 11 | 0.007 | 2.1286 | 0.2103 |
| 379 | 3 | 0.0007 | 2.0623 | 0.6096 |
| 380 | 16 | 0.0137 | 2.1586 | 0.1983 |

TABLE 6-continued

Estmates $\hat{m}_k$, $\sigma^2_{\hat{m}_k,k}$, $\mu_{\hat{m}_k,k}$ and $\alpha_{\hat{m}_k,k}$ for initial delay r = 20.

| $t_k$ | $\hat{m}_k$ | $\sigma^2_{\hat{m}_k,k}$ | $\mu_{\hat{m}_k,k}$ | $\alpha_{\hat{m}_k,k}$ |
|---|---|---|---|---|
| 381 | 19 | 0.0185 | 2.2115 | 0.1503 |
| 382 | 11 | 0.0066 | 1.7644 | −0.0401 |
| 383 | 3 | 0.0025 | 2.9233 | 0.1347 |
| 384 | 4 | 0.0025 | 2.5937 | 0.3073 |
| 385 | 5 | 0.0039 | 2.5887 | 0.3099 |
| 386 | 3 | 0.006 | 2.5861 | 0.4792 |
| 387 | 4 | 0.0039 | 2.5882 | 0.4761 |
| 388 | 11 | 0.0087 | 2.6964 | 0.077 |
| 389 | 6 | 0.0038 | 2.5952 | 0.4921 |
| 390 | 10 | 0.0075 | 2.5899 | 0.3122 |
| 391 | 9 | 0.0062 | 2.5817 | 0.4568 |
| 392 | 7 | 0.0038 | 2.6222 | −0.3162 |
| 393 | 15 | 0.0142 | 2.5051 | 0.1102 |
| 394 | 12 | 0.01 | 2.4881 | 0.1156 |
| 395 | 3 | 0.0036 | 2.355 | 0.2939 |

Table 6 shows the ϵ-best sub-optimal local admissible sample size $\hat{m}_k$ and the parameters $a_{\hat{m}_k,k}$, $\mu_{\hat{m}_k,k}$ and $\sigma_{\hat{m}_k,k}^2$ for four price energy commodity data at time $t_k$. This was based on p, r, and the initial real data time delay r=20. We further note that the range of the ϵ-best sub-optimal local admissible sample size $\hat{m}_k$ for any time $t_k \in [21, 40] \cup [1145,1165]$, $t_k \in [21, 40] \cup [2440, 2460]$, $t_k \in [21, 40] \cup [2865, 2885]$, and $t_k \in [21, 40] \cup [375, 395]$ for natural gas, crude oil, coal and ethanol data, respectively, is $3 \le \hat{m}_k \le 20$. Further, all comments that are made with regard to Table 2 regarding the four energy commodities remain valid with regard to Table 6.

In Table 7, the real and LLGMM simulated price values of each of the four energy commodities, including natural gas, crude oil, coal, and ethanol, are shown, respectively. The absolute error of each of energy commodity simulated value is also shown.

TABLE 7

Real, Simulation using LLGMM method, and absolute error of simulation using starting delay r = 20.

| $t_k$ | Real $y_k$ | Simulated $y^s_{\hat{m}_k,k}$ (LLGMM) | \|Error\| $\|y_k - y^s_{\hat{m}_k,k}\|$ |
|---|---|---|---|
| Natural gas | | | |
| 21 | 2.759 | 2.7718 | 0.0128 |
| 22 | 2.659 | 2.6566 | 0.0024 |
| 23 | 2.742 | 2.7353 | 0.0067 |
| 24 | 2.562 | 2.5757 | 0.0137 |
| 25 | 2.495 | 2.5332 | 0.0382 |
| 26 | 2.54 | 2.5336 | 0.0064 |
| 27 | 2.592 | 2.5631 | 0.0289 |
| 28 | 2.57 | 2.5797 | 0.0097 |
| 29 | 2.541 | 2.4846 | 0.0564 |
| 30 | 2.618 | 2.6245 | 0.0065 |
| 31 | 2.564 | 2.5469 | 0.0171 |
| 32 | 2.667 | 2.6763 | 0.0093 |
| 33 | 2.633 | 2.6308 | 0.0022 |
| 34 | 2.515 | 2.5021 | 0.0129 |
| 35 | 2.53 | 2.5136 | 0.0164 |
| 36 | 2.549 | 2.5458 | 0.0032 |
| 37 | 2.603 | 2.5835 | 0.0195 |
| 38 | 2.603 | 2.5822 | 0.0208 |
| 39 | 2.603 | 2.6075 | 0.0045 |
| 40 | 2.815 | 2.8728 | 0.0578 |
| ... | ... | ... | ... |
| 1145 | 5.712 | 5.7577 | 0.0457 |
| 1146 | 5.588 | 5.6488 | 0.0608 |
| 1147 | 5.693 | 5.7062 | 0.0132 |
| 1148 | 5.791 | 5.7917 | 0.0007 |
| 1149 | 5.614 | 5.5799 | 0.0341 |
| 1150 | 5.442 | 5.4099 | 0.0321 |
| 1151 | 5.533 | 5.5035 | 0.0295 |
| 1152 | 5.378 | 5.407 | 0.029 |
| 1153 | 5.373 | 5.3682 | 0.0048 |
| 1154 | 5.382 | 5.3827 | 0.0007 |
| 1155 | 5.507 | 5.4896 | 0.0174 |
| 1156 | 5.552 | 5.5423 | 0.0097 |
| 1157 | 5.31 | 5.318 | 0.008 |
| 1158 | 5.338 | 5.3794 | 0.0414 |
| 1159 | 5.298 | 5.3541 | 0.0561 |
| 1160 | 5.189 | 5.1838 | 0.0052 |
| 1161 | 5.082 | 5.3804 | 0.2984 |
| 1162 | 5.082 | 4.9802 | 0.1018 |
| 1163 | 5.082 | 5.1933 | 0.1113 |
| 1164 | 4.965 | 5.1925 | 0.2275 |
| 1165 | 4.767 | 4.7917 | 0.0247 |
| Crude oil | | | |
| 21 | 24 | 24.025 | 0.025 |
| 22 | 23.9 | 24.093 | 0.193 |
| 23 | 23.05 | 23.051 | 0.001 |
| 24 | 22.3 | 22.887 | 0.587 |
| 25 | 22.45 | 22.126 | 0.324 |
| 26 | 22.35 | 22.409 | 0.059 |
| 27 | 21.75 | 22.12 | 0.37 |
| 28 | 22.1 | 22.137 | 0.037 |
| 29 | 22.4 | 22.315 | 0.085 |
| 30 | 22.5 | 22.531 | 0.031 |
| 31 | 22.65 | 22.712 | 0.062 |
| 32 | 21.95 | 22.003 | 0.053 |
| 33 | 21.6 | 21.853 | 0.253 |
| 34 | 21 | 21.099 | 0.099 |
| 35 | 20.95 | 21.012 | 0.062 |
| 36 | 21.1 | 20.971 | 0.129 |
| 37 | 20.8 | 20.786 | 0.014 |
| 38 | 20.3 | 20.048 | 0.252 |
| 39 | 20.25 | 20.244 | 0.006 |
| 40 | 20.75 | 20.734 | 0.016 |
| ... | ... | ... | ... |
| 2440 | 57.35 | 57.376 | 0.026 |
| 2441 | 56.74 | 56.447 | 0.293 |
| 2442 | 57.55 | 57.523 | 0.027 |
| 2443 | 59.09 | 58.968 | 0.122 |
| 2444 | 60.27 | 60.278 | 0.008 |
| 2445 | 60.75 | 60.737 | 0.013 |
| 2446 | 58.41 | 58.494 | 0.084 |
| 2447 | 58.72 | 58.614 | 0.106 |
| 2448 | 58.64 | 58.95 | 0.31 |
| 2449 | 57.87 | 57.865 | 0.005 |
| 2450 | 59.13 | 58.967 | 0.163 |
| 2451 | 60.11 | 59.937 | 0.173 |
| 2452 | 58.94 | 59.068 | 0.128 |
| 2453 | 59.93 | 60.141 | 0.211 |
| 2454 | 61.18 | 61.53 | 0.35 |
| 2455 | 59.66 | 59.792 | 0.132 |
| 2456 | 58.59 | 58.481 | 0.109 |
| 2457 | 58.28 | 58.224 | 0.056 |
| 2458 | 58.79 | 58.928 | 0.138 |
| 2459 | 56.23 | 56.329 | 0.099 |
| 2460 | 55.9 | 54.676 | 1.224 |
| Coal | | | |
| 21 | 8.69 | 8.6747 | 0.0153 |
| 22 | 8.63 | 8.6175 | 0.0125 |
| 23 | 8.69 | 8.6862 | 0.0038 |
| 24 | 8.94 | 8.9184 | 0.0216 |
| 25 | 9.31 | 9.3069 | 0.0031 |
| 26 | 8.94 | 8.8992 | 0.0408 |
| 27 | 8.94 | 8.8745 | 0.0655 |

TABLE 7-continued

Real, Simulation using LLGMM method, and absolute error of simulation using starting delay r = 20.

| $t_k$ | Real $y_k$ | Simulated $y^s_{\hat{m}_k,k}$ (LLGMM) | \|Error\| $\|y_k - y^s_{\hat{m}_k,k}\|$ |
|---|---|---|---|
| 28 | 9.13 | 9.1162 | 0.0138 |
| 29 | 9.19 | 9.234 | 0.044 |
| 30 | 8.57 | 8.5495 | 0.0205 |
| 31 | 8.69 | 8.7241 | 0.0341 |
| 32 | 8.88 | 8.8866 | 0.0066 |
| 33 | 8.57 | 8.5084 | 0.0616 |
| 34 | 8.75 | 8.7447 | 0.0053 |
| 35 | 8.63 | 8.6003 | 0.0297 |
| 36 | 8.44 | 8.412 | 0.028 |
| 37 | 8.44 | 8.4465 | 0.0065 |
| 38 | 8.94 | 8.9538 | 0.0138 |
| 39 | 9 | 9.0064 | 0.0064 |
| 40 | 8.94 | 8.8655 | 0.0745 |
| ... | ... | ... | ... |
| ... | ... | ... | ... |
| 2865 | 29.31 | 29.291 | 0.019 |
| 2866 | 28.68 | 28.8 | 0.12 |
| 2867 | 26.77 | 26.891 | 0.121 |
| 2868 | 27.45 | 27.316 | 0.134 |
| 2869 | 27 | 27.189 | 0.189 |
| 2870 | 26.67 | 26.812 | 0.142 |
| 2871 | 26.51 | 26.709 | 0.199 |
| 2872 | 26.48 | 26.54 | 0.06 |
| 2873 | 25.15 | 25.313 | 0.163 |
| 2874 | 25.57 | 25.47 | 0.1 |
| 2875 | 25.88 | 26.078 | 0.198 |
| 2876 | 25.24 | 25.208 | 0.032 |
| 2877 | 25 | 25.138 | 0.138 |
| 2878 | 25.08 | 25.306 | 0.226 |
| 2879 | 25.05 | 25.16 | 0.11 |
| 2880 | 25.89 | 25.509 | 0.381 |
| 2881 | 25.23 | 25.278 | 0.048 |
| 2882 | 25.94 | 25.961 | 0.021 |
| 2883 | 25.26 | 25.255 | 0.005 |
| 2884 | 25.25 | 25.298 | 0.048 |
| 2885 | 26.06 | 25.882 | 0.178 |

| Ethanol | | | |
|---|---|---|---|
| 21 | 1.895 | 1.9024 | 0.0074 |
| 22 | 1.95 | 1.9315 | 0.0185 |
| 23 | 1.974 | 1.9788 | 0.0048 |
| 24 | 2.7 | 2.5529 | 0.1471 |
| 25 | 2.515 | 2.5134 | 0.0016 |
| 26 | 2.29 | 2.3306 | 0.0406 |
| 27 | 2.44 | 2.3718 | 0.0682 |
| 28 | 2.415 | 2.3927 | 0.0223 |
| 29 | 2.3 | 2.3311 | 0.0311 |
| 30 | 2.1 | 2.072 | 0.028 |
| 31 | 2.04 | 2.0323 | 0.0077 |
| 32 | 2.16 | 2.1561 | 0.0039 |
| 33 | 2.13 | 2.0796 | 0.0504 |
| 34 | 2.155 | 2.2141 | 0.0591 |
| 35 | 2.01 | 1.9687 | 0.0413 |
| 36 | 1.93 | 1.8762 | 0.0538 |
| 37 | 1.9 | 1.9186 | 0.0186 |
| 38 | 1.975 | 1.9052 | 0.0698 |
| 39 | 1.98 | 2.019 | 0.039 |
| 40 | 2 | 1.9385 | 0.0615 |
| ... | ... | ... | ... |
| ... | ... | ... | ... |
| ... | ... | ... | ... |
| ... | ... | ... | ... |
| 375 | 2.073 | 2.09 | 0.017 |
| 376 | 2.02 | 2.0589 | 0.0389 |
| 377 | 2.073 | 2.0601 | 0.0129 |
| 378 | 2.065 | 2.0312 | 0.0338 |
| 379 | 2.055 | 2.0725 | 0.0175 |
| 380 | 2.209 | 2.2254 | 0.0164 |
| 381 | 2.44 | 2.462 | 0.022 |
| 382 | 2.517 | 2.51 | 0.007 |
| 383 | 2.718 | 2.6979 | 0.0201 |
| 384 | 2.541 | 2.5164 | 0.0246 |
| 385 | 2.566 | 2.5328 | 0.0332 |
| 386 | 2.626 | 2.5831 | 0.0429 |
| 387 | 2.587 | 2.5606 | 0.0264 |
| 388 | 2.628 | 2.6322 | 0.0042 |
| 389 | 2.587 | 2.5651 | 0.0219 |
| 390 | 2.536 | 2.53 | 0.006 |
| 391 | 2.42 | 2.4268 | 0.0068 |
| 392 | 2.247 | 2.2228 | 0.0242 |
| 393 | 2.223 | 2.2072 | 0.0158 |
| 394 | 2.39 | 2.4141 | 0.0241 |
| 395 | 2.38 | 2.4265 | 0.0465 |

Figure 4A:
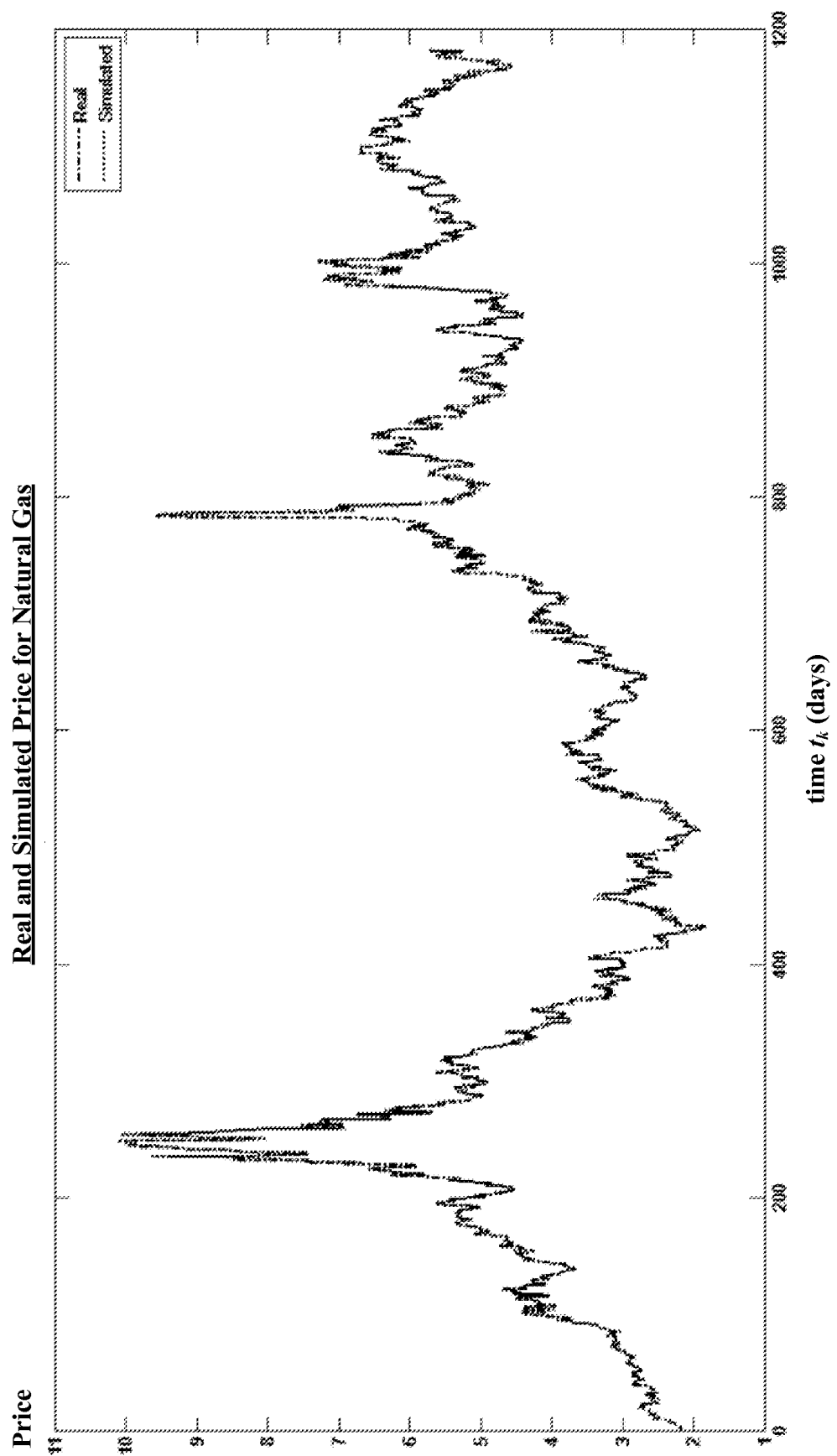
FIG. 4A illustrates real and simulated prices for natural gas using the local lagged adapted generalized method of moments dynamic process according to various aspects of the embodiments described herein.
Figure 4B:
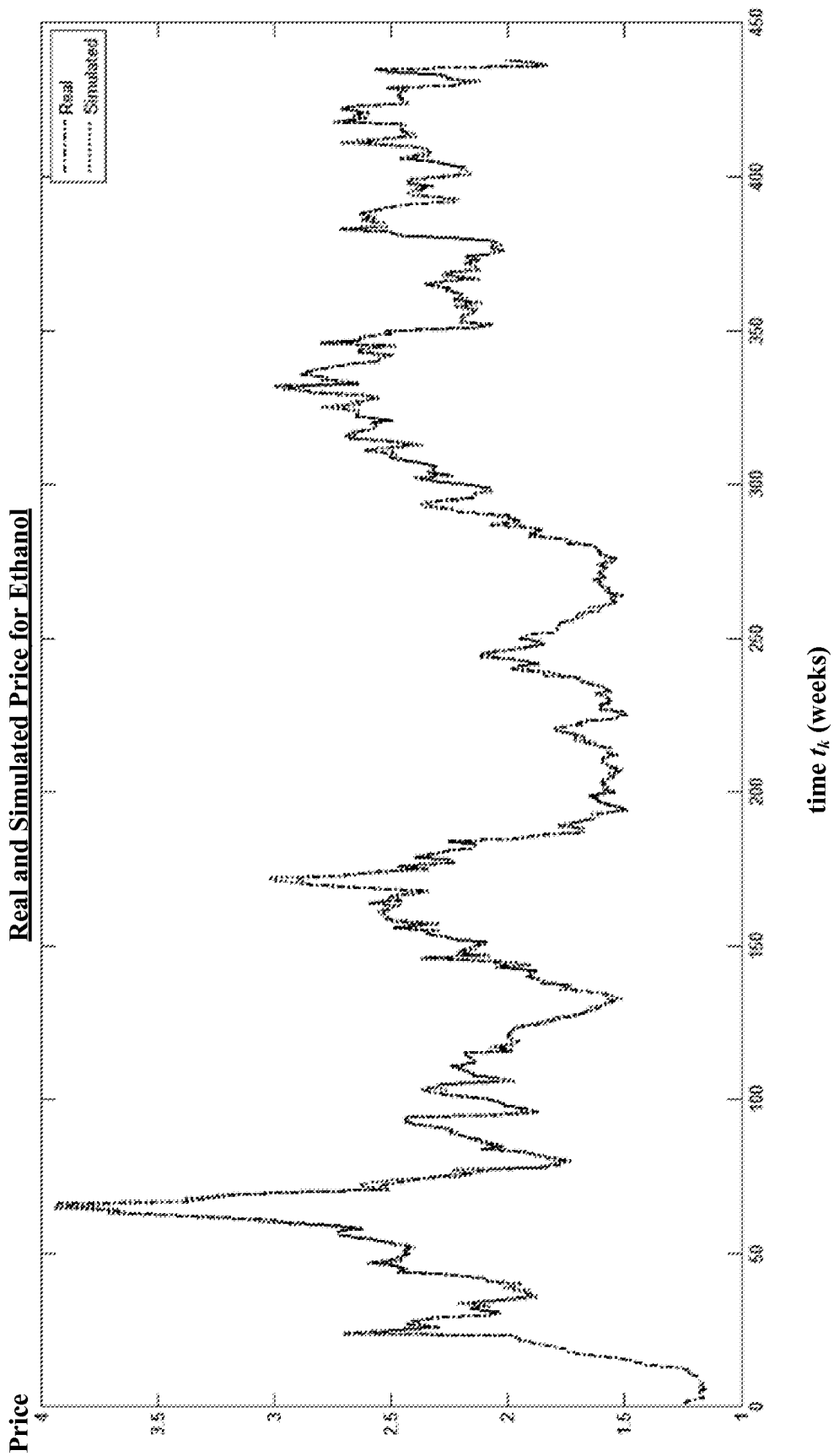
FIG. 4B illustrates real and simulated prices for ethanol using the local lagged adapted generalized method of moments dynamic process according to various aspects of the embodiments described herein.

FIGS. 4A and 4B illustrate real and simulated prices for natural gas and ethanol using the local lagged adapted generalized method of moments dynamic process, respectively, for r=20.

Goodness-of-Ft Measures.

The goodness-of-fit measures are found for four energy commodities, natural gas, crude oil, coal and ethanol. This is achieved by using the following goodness-of-fit measures:

$$\begin{cases} \widehat{RAMSE} = \left[\frac{1}{N}\sum_{t=1}^{N}\frac{1}{S}\sum_{s=1}^{S}(y_t^{(s)} - y_i)^2\right]^{\frac{1}{2}}, \\ \widehat{AMAD} = \frac{1}{N}\sum_{t=1}^{N}\text{median}_s\left(\left|y_i^s - \text{median}_l(y_i^l)\right|\right), \\ \widehat{AMB} = \frac{1}{N}\sum_{i=1}^{N}\left(\left|\text{median}_s(y_i^s) - y_i\right|\right), \end{cases} \quad (69)$$

where $\{y_t^s\}_{t=1, 2, \ldots, N}^{s=1, 2, \ldots, S}$ is a double sequence of simulated values at the data collected/observed time t=1, 2, . . . , N, RAMSE is the root mean square error of the simulated path, AMAD is the average median absolute deviation, and AMB is the the average median bias. The goodness-of-fit measures are computed using S=100 pseudo-data sets. The comparison of the goodness-of-fit measures RAMSE, AMAD, and AMB for the four energy commodities: natural gas, crude oil, coal, and ethanol data are recorded in Table 8.

Remark 23.

As the RAMSE decreases, then the state estimates approach to the true value of the state. As the value of AMAD increases, the influence of the random environmental fluctuations on the state dynamic process increases. In addition, if the value of RAMSE decreases and the value of AMAD increases, then the method of study possesses a greater degree of ability for state and parameter estimation accuracy and greater degree of ability to measure the variability of random environmental perturbations on the state dynamic of system. Further, as RAMSE decreases, AMAD increases, and AMB decreases, the method of study increases its performance under the three goodness of fit measures in a coherent way. On other hand, as the RAMSE increases, the state estimates tend to move away from the true value of the state. As the value of AMAD decreases, the influence of the random environmental fluctuations on state dynamic process decreases.

In addition, if the value of RAMSE increases and the value of AMAD decreases, then the method of study possesses a lesser degree of ability for state and parameter estimation accuracy and lesser degree of ability to measure the variability of random environmental perturbations on the state dynamic of system. Further, as the RAMSE increases, AMAD decreases and the AMB increases, the method of study decreases its performance under the three goodness-of-fit measures in a coherent manner.

The Comparison of Goodness-of-Fit Measures for r=5, r=10, and r=20.

The following table exhibits the goodness-of-fit measures for the energy commodities natural data, crude oil, coal, and ethanol data using the initial delays r=5, r=10, and r=20.

TABLE 8

Goodness-of-fit Measures for r = 5, r = 10 and r = 20

| Goodness-of-fit Measure | Natural gas | Crude oil | Coal | Ethanol |
|---|---|---|---|---|
| r = 5 | | | | |
| $\widehat{RAMSE}$ | 0.1801 | 1.1122 | 1.2235 | 0.1001 |
| | 1.1521 | 24.6476 | 9.4160 | 0.3409 |
| | 1.1372 | 27.2707 | 12.8370 | 0.3566 |
| r = 10 | | | | |
| $\widehat{AMAD}$ | 0.1004 | 0.5401 | 0.8879 | 0.0618 |
| | 1.1330 | 24.5376 | 9.4011 | 0.3233 |
| | 1.1371 | 27.2708 | 12.8369 | 0.3566 |
| r = 20 | | | | |
| $\widehat{AMB}$ | 0.0674 | 0.4625 | 0.4794 | 0.0375 |
| | 1.1318 | 24.5010 | 9.4009 | 0.3213 |
| | 1.1374 | 27.2707 | 12.8370 | 0.3566 |

Remark 24.

From Tables 3, 5, and 7 it is clear that as r increases the absolute error decreases. Furthermore, the comparison of the goodness-of-fit measures in Table 8 for the natural gas, crude oil, coal, and ethanol data the energy commodities using the initial delays r=5, r=10, and r=20 shows that as the delay r increases, the root mean square error decreases significantly, AMAD decreases very slowly, and AMB remains unchanged.

Remark 25.

Computer readable instructions can be designed to exhibit the flowchart shown in FIGS. 2 and 3. For example, computer readable instructions for parameter estimation, simulations, and forecasting can be written and tested using MATLAB®. Due to the online control nature of $m_k$ in our model, it is worth mentioning that the execution times for each of the four commodities: Natural gas, Crude oil, Coal and Ethanol depend on the robustness of the data.

Illustration 2: Application of Presented Approach to U. S. Treasury Bill Yield Interest Rate and U.S. Eurocurrency Exchange Rate Data Set.

Here, the conceptual computational algorithm discussed in Section 4 is applied to estimate the parameters in equation (45) using the real time U.S. Treasury Bill Yield Interest Rate (U.S. TBYIR) and the U.S. Eurocurrency Exchange Rate (U.S. EER) data collected on Forex database.

Graphical, Simulation and Statistical Results.

Using $\epsilon$=0.001, r=20, and p=2, the $\epsilon$-best sub-optimal estimates of parameters $\beta$, $\mu$, $\delta$, $\sigma$ and $\gamma$ for each Treasury bill Yield and U.S. Eurocurrency rate data sets are exhibited in Tables 9 and 10, respectively.

TABLE 9

Estimates for $\hat{m}_k, \beta_{\hat{m}_k,k}, \mu_{\hat{m}_k,k}, \delta_{\hat{m}_k,k}, \sigma_{\hat{m}_k,k}, \gamma_{\hat{m}_k,k}$ for U.S. Treasury Bill Yield Interest Rate data.

| | | | interest rate | | | |
|---|---|---|---|---|---|---|
| $t_k$ | $\hat{m}_k$ | $\beta_{\hat{m}_k,k}$ | $\mu_{\hat{m}_k,k}$ | $\delta_{\hat{m}_k,k}$ | $\sigma_{\hat{m}_k,k}$ | $\gamma_{\hat{m}_k,k}$ |
| 21 | 2 | 1.5199 | −7.0332 | 1.46 | 0.0446 | 0.9078 |
| 22 | 2 | 1.2748 | −5.919 | 1.46 | 0.0941 | 1.5 |
| 23 | 10 | 2.9904 | −13.928 | 1.46 | 0.0576 | 1.5 |
| 24 | 12 | 1.8604 | −8.6515 | 1.46 | 0.0895 | 1.5 |
| 25 | 6 | 2.1606 | −10.076 | 1.46 | 0.1064 | 1.5 |
| 26 | 20 | 0.0199 | −0.0372 | 1.46 | 0.1097 | 1.3872 |
| 27 | 16 | −0.0274 | 0.1991 | 1.46 | 0.1066 | 1.4348 |
| 28 | 4 | −0.1841 | 0.9753 | 1.46 | 0.1345 | 1.2081 |
| 29 | 19 | 0.3261 | −1.3952 | 1.46 | 0.1855 | 0.7006 |
| 30 | 12 | 0.2707 | −1.1525 | 1.46 | 0.1624 | 1.4187 |
| 31 | 13 | 0.543 | −2.4097 | 1.46 | 0.2571 | 1.4986 |
| 32 | 11 | 0.5357 | −2.4098 | 1.46 | 0.1962 | −0.0695 |
| 33 | 11 | 0.4723 | −2.1258 | 1.46 | 0.3494 | 0.097 |
| 34 | 11 | −0.3697 | 1.4705 | 1.46 | 1.4014 | 1.4983 |
| 35 | 4 | −0.7862 | 3.3703 | 1.46 | 0.3488 | 1.4993 |
| 36 | 6 | −0.3375 | 1.3041 | 1.46 | 0.2914 | 1.4711 |
| 37 | 5 | 0.3541 | −2.0609 | 1.46 | 0.2676 | 1.4972 |
| 38 | 14 | 0.2368 | −1.1239 | 1.46 | 0.3201 | 1.4961 |
| 39 | 8 | 1.1109 | −5.5453 | 1.46 | 0.6811 | −0.7462 |
| 40 | 4 | 1.9032 | −9.1187 | 1.46 | 1.1055 | 0.1008 |
| 41 | 11 | 0.4364 | −2.1327 | 1.46 | 0.3532 | 1.4994 |
| 42 | 4 | 0.2942 | −1.3004 | 1.46 | 0.4885 | 1.4975 |
| 43 | 5 | 0.4012 | −1.9198 | 1.46 | 0.3418 | 1.5 |
| 44 | 3 | 0.2605 | −1.2108 | 1.46 | 0.4133 | 1.4705 |
| 45 | 5 | 0.4213 | −2.0086 | 1.46 | 0.3324 | 1.4992 |
| ... | ... | ... | ... | ... | ... | ... |
| ... | ... | ... | ... | ... | ... | ... |
| 420 | 12 | 3.8416 | −18.331 | 1.46 | 0.1187 | 1.4906 |
| 421 | 12 | 2.8918 | −13.821 | 1.46 | 0.6961 | 1.386 |
| 422 | 12 | 0.5602 | −2.6281 | 1.46 | 0.3759 | 1.1741 |
| 423 | 7 | 0.5825 | −2.7201 | 1.46 | 0.1753 | 1.4935 |
| 424 | 7 | 0.7397 | −3.4486 | 1.46 | 0.1687 | 0.5396 |
| 425 | 7 | 0.2488 | −1.1148 | 1.46 | 0.1819 | 0.6161 |
| 426 | 7 | 0.8447 | −3.9535 | 1.46 | 0.4182 | 0.7124 |
| 427 | 11 | −0.2202 | 1.098 | 1.46 | 0.2013 | 0.6577 |
| 428 | 12 | −0.1169 | 0.6256 | 1.46 | 0.1779 | 0.6063 |
| 429 | 9 | 0.1464 | −0.6472 | 1.46 | 0.3672 | 1.2589 |
| 430 | 9 | 0.0343 | −0.117 | 1.46 | 0.3637 | 0.7374 |
| 431 | 9 | 0.1785 | −0.6832 | 1.46 | 0.1395 | 0.5804 |
| 432 | 19 | −0.0031 | 0.1015 | 1.46 | 0.1932 | 1.1832 |
| 433 | 8 | 0.1651 | −0.6463 | 1.46 | 0.1745 | 0.5374 |
| 434 | 19 | 0.4102 | −1.6622 | 1.46 | 0.121 | 0.3774 |
| 435 | 8 | 0.2941 | −1.1608 | 1.46 | 0.1085 | 1.0262 |
| 436 | 19 | 0.3694 | −1.4911 | 1.46 | 0.1547 | 1.4945 |
| 437 | 14 | 1.6473 | −6.6877 | 1.46 | 0.2198 | −0.0071 |
| 438 | 5 | 1.417 | −5.7323 | 1.46 | 0.1406 | −0.1462 |
| 439 | 17 | 1.3024 | −5.3352 | 1.46 | 0.133 | 0.2225 |
| 440 | 9 | 0.2839 | −1.191 | 1.46 | 0.1929 | 0.0883 |
| 441 | 17 | 0.2053 | −0.8785 | 1.46 | 0.2007 | −0.1338 |
| 442 | 17 | −0.4585 | 1.6754 | 1.46 | 0.4803 | 0.944 |
| 443 | 7 | −0.2917 | 0.8858 | 1.46 | 0.5227 | −0.236 |
| 444 | 9 | −0.023 | −0.2999 | 1.46 | 0.5836 | −0.2083 |
| 445 | 13 | −0.3263 | 1.2217 | 1.46 | 0.2632 | −0.1684 |

TABLE 10

Estimates for $\hat{m}_k, \beta_{\hat{m}_k,k}, \mu_{\hat{m}_k,k}, \delta_{\hat{m}_k,k}, \sigma_{\hat{m}_k,k}, \gamma_{\hat{m}_k,k}$ for U.S. Eurocurrency Exchange Rate.

| | | | US Eurocurrency Exchange Rate | | | |
|---|---|---|---|---|---|---|
| $t_k$ | $\hat{m}_k$ | $\beta_{\hat{m}_k,k}$ | $\mu_{\hat{m}_k,k}$ | $\delta_{\hat{m}_k,k}$ | $\sigma_{\hat{m}_k,k}$ | $\gamma_{\hat{m}_k,k}$ |
| 21 | 2 | −0.1282 | 0.1406 | 1.4892 | 0.0235 | −1.4529 |
| 22 | 3 | 8.3385 | −7.7988 | 1.4892 | 0.0256 | 1.4954 |
| 23 | 2 | 3.1279 | −2.9205 | 1.4892 | 0.0286 | 1.4995 |
| 24 | 20 | 0.22 | −0.1976 | 1.4892 | 0.0298 | 1.4948 |
| 25 | 18 | 3.0772 | −2.8778 | 1.4892 | 0.016 | 1.4741 |
| 26 | 4 | 3.8605 | −3.6034 | 1.4892 | 0.0147 | 1.3925 |
| 27 | 13 | 3.7355 | −3.4973 | 1.4892 | 0.0395 | 1.4959 |

TABLE 10-continued

Estimates for $\hat{m}_k, \beta_{\hat{m}_k,k}, \mu_{\hat{m}_k,k}, \delta_{\hat{m}_k,k}, \sigma_{\hat{m}_k,k}, \gamma_{\hat{m}_k,k}$ for U.S. Eurocurrency Exchange Rate.

US Eurocurrency Exchange Rate

| $t_k$ | $\hat{m}_k$ | $\beta_{\hat{m}_k,k}$ | $\mu_{\hat{m}_k,k}$ | $\delta_{\hat{m}_k,k}$ | $\sigma_{\hat{m}_k,k}$ | $\gamma_{\hat{m}_k,k}$ |
|---|---|---|---|---|---|---|
| 28 | 16 | 2.436 | −2.2773 | 1.4892 | 0.0315 | −0.7142 |
| 29 | 17 | 1.8545 | −1.7299 | 1.4892 | 0.0159 | −1.4613 |
| 30 | 3 | 6.4061 | −5.9636 | 1.4892 | 0.0324 | −2.4907 |
| 31 | 12 | 1.0648 | −0.9689 | 1.4892 | 0.0242 | 1.47 |
| 32 | 15 | 0.4861 | −0.4244 | 1.4892 | 0.0285 | 1.5 |
| 33 | 18 | 2.9505 | −2.7502 | 1.4892 | 0.0267 | 1.4943 |
| 34 | 5 | 3.8981 | −3.635 | 1.4892 | 0.0984 | 1.4807 |
| 35 | 4 | 0.4644 | −0.4841 | 1.4892 | 0.1052 | 1.4884 |
| 36 | 3 | 0.753 | −0.7159 | 1.4892 | 0.0474 | 1.4954 |
| 37 | 3 | 0.719 | −0.682 | 1.4892 | 0.0472 | 1.4995 |
| 38 | 3 | −0.7094 | 0.6544 | 1.4892 | 0.0482 | 1.4948 |
| 39 | 5 | 1.221 | −1.1708 | 1.4892 | 0.0649 | 1.4741 |
| 40 | 9 | 6.7537 | −6.4315 | 1.4892 | 0.0395 | 1.4959 |
| 41 | 9 | 1.0019 | −0.9439 | 1.4892 | 0.0566 | 1.4962 |
| 42 | 11 | 5.5279 | −5.2617 | 1.4892 | 0.0309 | 1.499 |
| 43 | 5 | 5.3829 | −5.1253 | 1.4892 | 0.0529 | 0.1514 |
| 44 | 10 | 5.2433 | −4.9934 | 1.4892 | 0.0483 | 0.8817 |
| 45 | 10 | 5.2445 | −4.9945 | 1.4892 | 0.0305 | 1.3425 |
| ... | ... | ... | ... | ... | ... | ... |
| 155 | 2 | 10.779 | −10.219 | 1.4892 | 0.0167 | 0.8188 |
| 156 | 14 | 2.4641 | −2.3297 | 1.4892 | 0.0227 | 0.8437 |
| 157 | 4 | 3.2423 | −3.0622 | 1.4892 | 0.0184 | 1.4906 |
| 158 | 6 | 3.1716 | −3.0016 | 1.4892 | 0.0204 | 0.4736 |
| 159 | 7 | 6.2013 | −5.8656 | 1.4892 | 0.0163 | 0.6027 |
| 160 | 8 | 9.3459 | −8.8311 | 1.4892 | 0.0207 | 0.6834 |
| 161 | 4 | 5.3512 | −5.0566 | 1.4892 | 0.027 | 0.4978 |
| 162 | 16 | −1.3298 | 1.2689 | 1.4892 | 0.0289 | 0.3431 |
| 163 | 12 | 4.7287 | −4.4662 | 1.4892 | 0.0206 | 1.2122 |
| 164 | 18 | 6.22 | −5.8772 | 1.4892 | 0.0184 | 1.0666 |
| 165 | 19 | 13.13 | −12.394 | 1.4892 | 0.021 | 1.4906 |
| 166 | 18 | 7.1076 | −6.6994 | 1.4892 | 0.0211 | 1.386 |
| 167 | 5 | 3.2762 | −3.0824 | 1.4892 | 0.0255 | 1.1741 |
| 168 | 11 | 3.0507 | −2.8403 | 1.4892 | 0.0296 | 1.4935 |
| 169 | 10 | 0.9617 | −0.8742 | 1.4892 | 0.0234 | 0.5396 |
| 170 | 19 | 2.0934 | −1.9275 | 1.4892 | 0.027 | 0.6161 |
| 171 | 5 | 0.0174 | −0.0078 | 1.4892 | 0.0275 | 0.7124 |
| 172 | 7 | 3.2551 | −3.0304 | 1.4892 | 0.0244 | 0.6577 |
| 173 | 19 | 0.909 | −0.8452 | 1.4892 | 0.0258 | 0.6063 |
| 174 | 19 | 0.8669 | −0.807 | 1.4892 | 0.0219 | 1.2589 |
| 175 | 10 | 1.9332 | −1.7976 | 1.4892 | 0.0189 | 0.7374 |
| 176 | 10 | 13.928 | −12.966 | 1.4892 | 0.0235 | 0.5804 |
| 177 | 6 | 8.7675 | −8.1583 | 1.4892 | 0.0232 | 1.1832 |
| 178 | 9 | 1.3481 | −1.2544 | 1.4892 | 0.0198 | 0.5374 |
| 179 | 14 | 0.9565 | −0.8852 | 1.4892 | 0.0232 | 0.3774 |
| 180 | 8 | 0.7656 | −0.5372 | 1.4892 | 0.0132 | 0.2771 |

Tables 9 and 10 show the $\epsilon$-best sub-optimal local admissible sample size $\hat{m}_k$ and the corresponding parameter estimates $\beta_{\hat{m}_k,k}, \mu_{\hat{m}_k,k}, \delta_{\hat{m}_k,k}, \sigma_{\hat{m}_k,k}$, and $\gamma_{\hat{m}_k,k}$ for the U. S. Treasury Bill Yield Interest Rate (US-TBYIR) and U. S. Eurocurrency Exchange Rate (US-EER) data at each time $t_k$, respectively. This is based on p≤r, and the initial real data time-delay r=20. That is, the data schedule time $t_r=t_{20}$. Furthermore, note that the range of the $\epsilon$-best sub-optimal local admissible sample size for the U. S. TBYIR and U. S. EER data for time $t_k \in [21,45] \cup [420,445]$ and $t_k \in [21,45] \cup [155,180]$, respectively, is $2 \leq \hat{m}_k \leq 20$. All comments made with regard to Table 2 remain valid with regard to Tables 9 and 10 in the context of the the U. S. treasury bill Yield Interest Rate and the U. S. Eurocurrency Exchange Rate data at time $t_k$ and the LLGMM approach.

Figure 5A:
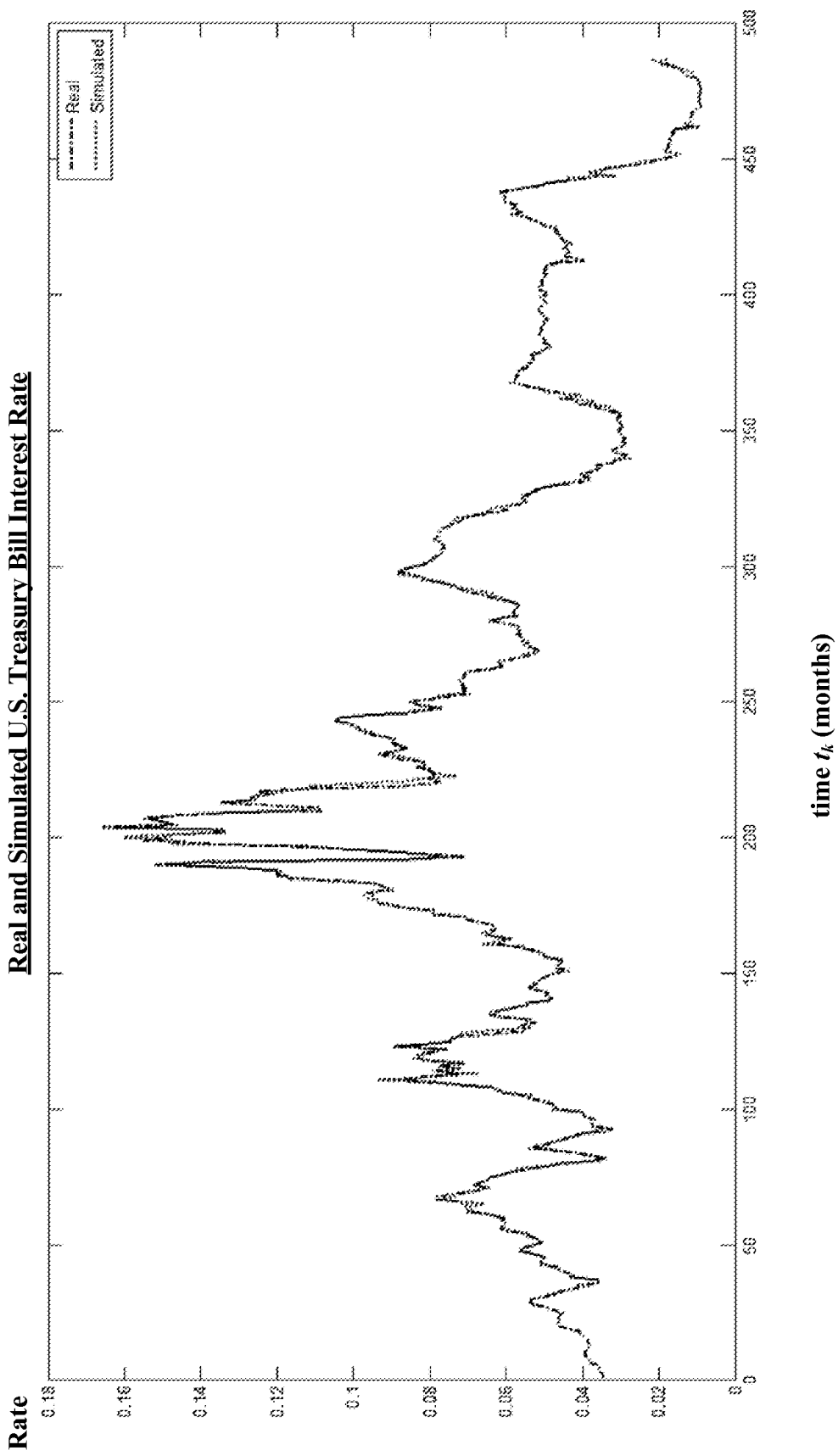
FIG. 5A illustrates real and simulated U.S. treasury bill interest rates using the local lagged adapted generalized method of moments dynamic process according to various aspects of the embodiments described herein.
Figure 5B:
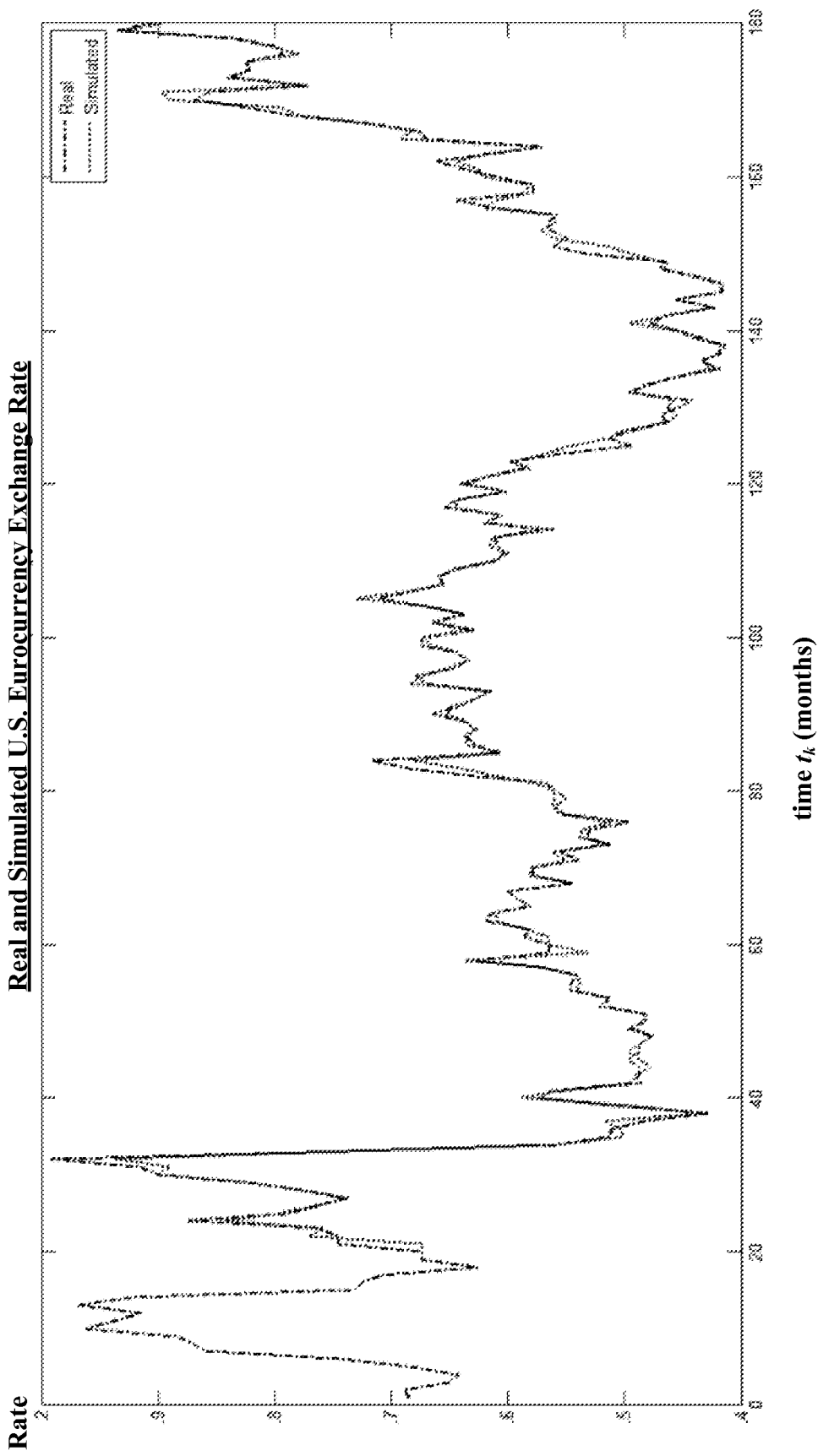
FIG. 5B illustrates real and simulated U.S. eurocurrency exchange rates using the local lagged adapted generalized method of moments dynamic process according to various aspects of the embodiments described herein.

FIGS. 5A and 5B illustrate real and simulated U.S. treasury bill interest rates and U.S. eurocurrency exchange rates using the local lagged adapted generalized method of moments dynamic process, respectively, with r=20.

Comparison of Goodness-of-Fit Measures for U. S. TBYIR and U. S. EER Using r=20.

Table 11 compares the Goodness-of-fit Measures for the U. S. TBYIR and U. S. EER data using r=20.

TABLE 11

Goodness-of-fit Measures for the U. S. TBYIR and U. S. EER data using r = 20.

| | r = 20 | |
|---|---|---|
| Goodness of-fit Meaure | U. S. TBYIR | U. S. EER |
| $\widehat{RAMSE}$ | 0.0024 | 0.0137 |
| $\widehat{AMAD}$ | 0.0148 | 0.0718 |
| $\widehat{AMB}$ | 0.0165 | 0.1033 |

5. Forecasting

Referring back to FIG. 2, at reference numeral 216, the process 200 further includes forecasting at least one future state value of the stochastic model of the continuous-time dynamic process using the optimal $m_k$-local moving sequence. Further, at reference numeral 218, the process 200 includes determining an interval of confidence associated with the at least one future state value. In those contexts, the application of the LLGMM approach to robust forecasting and the confidence interval problems is outlined in this section. It does not require a large data size or any type of stationary conditions. First, an outline about forecasting problems is outlined. The $\epsilon$-best sub-optimal simulated value $y_{\hat{m}_k,k}^s$ at time $t_k$ is used to define a forecast $y_{\hat{m}_k,k}^f$ for $y_k$ at the time $t_k$ for each of the Energy commodity model, and the U. S. TBYIR and U.S. EER.

5.1. Forecasting for Energy Commodity Model

In the context of the illustration in Section 3.5, we begin forecasting from time $t_k$. Using the data up to time $t_{k-1}$, we compute $\hat{m}_i$, $\sigma_{\hat{m}_i,i}^2$, $a_{\hat{m}_i,i}$ and $\mu_{\hat{m}_i,i}$ for $i \in I_0(k-1)$. We assume that we have no information about the real data $\{y_i\}_{i=k}^N$. Under these considerations, imitating the computational procedure outlined in Section 4 and using equation (43), we find the estimate of the forecast $y_{\hat{m}_k,k}^f$ at time $t_k$ by employing the following discrete time iterative process:

$$y_{\hat{m}_k,k}^f = y_{\hat{m}_{k-1},k-1}^s + a_{\hat{m}_{k-1},k-1} y_{\hat{m}_{k-1},k-1}^s (\mu_{\hat{m}_{k-1},k-1} - y_{\hat{m}_{k-1},k-1}^s) \Delta t + \sigma_{\hat{m}_{k-1},k-1} y_{\hat{m}_{k-1},k-1}^s \Delta W_k, \quad (70)$$

where the estimates $\sigma_{\hat{m}_{k-1},k-1}^2$, $a_{\hat{m}_{k-1},k-1}$ and $\mu_{\hat{m}_{k-1},k-1}$ are defined in (43) with respect to the known past data up to the time $t_{k-1}$. We note that $y_{\hat{m}_k,k}^f$ is the $\epsilon$-sub-optimal estimate for $y_k$ at time $t_k$.

To determine $y_{\hat{m}_{k+1},k+1}^f$, we need $\sigma_{\hat{m}_k,k}^2$, $a_{\hat{m}_k,k}$ and $\mu_{\hat{m}_k,k}$. Since we only have information of real data up to time $t_{k-1}$, we use the forecasted estimate $y_{\hat{m}_k,k}^f$ as the estimate of $y_k$ at time $t_k$, and to estimate $\sigma_{\hat{m}_k,k}^2$, $a_{\hat{m}_k,k}$ and $\mu_{\hat{m}_k,k}$. Hence, we can write $a_{\hat{m}_k,k}$ as $$a_{\hat{m}_k,k} \equiv a_{\hat{m}_k, y_{k-\hat{m}_k+1}, y_{k-\hat{m}_k+2}, \ldots, y_{k-1}, y_{\hat{m}_k,k}^f}.$$

We can also re-write $$\mu_{\hat{m}_k,k} \equiv \mu_{\hat{m}_k, y_{k-\hat{m}_k+1}, y_{k-\hat{m}_k+2}, \ldots, y_{k-1}, y_{\hat{m}_k,k}^f}.$$

To find $y_{\hat{m}_{k+2},k-2}^f$, we use the estimates $$a_{\hat{m}_{k+1},k+1} \equiv a_{\hat{m}_{k+1},y_{k-\hat{m}_k+2},y_{k-\hat{m}_k+3},\ldots,y_{k-1},y_{\hat{m}_k,k}^f y_{\hat{m}_{k+1},k+1}^f}$$

and $$\mu_{\hat{m}_{k+1},k+1} \equiv \mu_{\hat{m}_{k+1},y_{k-\hat{m}_k+2},y_{k-\hat{m}_k+3},\ldots,y_{k-1},y_{\hat{m}_k,k}^f y_{\hat{m}_{k+1},k+1}^f}.$$

Continuing this process in this manner, we use the estimates $$a_{\hat{m}_{k+i-1},k+i-1} \equiv a_{\hat{m}_{k+i-1},y_{k-\hat{m}_k+i},y_{k-\hat{m}_k+i+1},\ldots,y_{k-1},y_{\hat{m}_k,k}^f,y_{\hat{m}_{k+1},k+1}^f,\ldots,y_{\hat{m}_{k+1},k+i-1}^f}$$

and $$\mu_{\hat{m}_{k+i-1},k+i-1} \equiv \mu_{\hat{m}_{k+i-1},y_{k-\hat{m}_k+i},y_{k-\hat{m}_k+i+1},\ldots,y_{k-1},y_{\hat{m}_k,k}^f,y_{\hat{m}_{k+1},k+1}^f,\ldots,y_{\hat{m}_{k+1},k+i-1}^f}$$

to estimate $y_{\hat{m}_{k+i},k+i}^f$.

5.1.1. Prediction/Confidence Interval for Energy Commodities

In order to be able to assess the future certainty, we also discuss about the prediction/confidence interval. We define the $100(1-\alpha)\%$ confidence interval for the forecast of the state $y_{\hat{m}_i,i}^f$ at time $t_i$, i≥k, as $y_{\hat{m}_i,i}^f \pm z_{1-\alpha/2}(s_{\hat{m}_{i-1},i-1}^2)^{1/2} y_{\hat{m}_{i-1},i-1}^f$ where $(s_{\hat{m}_{i-1},i-1}^2)^{1/2} y_{\hat{m}_{i-1},i-1}^f$ is the estimate for the sample standard deviation for the forecasted state derived from the following iterative process $$y_{\hat{m}_k,k}^f = y_{\hat{m}_{k-1},k-1}^f + a_{\hat{m}_{k-1},k-1} y_{\hat{m}_{k-1},k-1}^f (\mu_{\hat{m}_{k-1},k-1} - y_{\hat{m}_{k-1},k-1}^f) \Delta t + \sigma_{\hat{m}_{k-1},k-1} y_{\hat{m}_{k-1},k-1}^f \Delta W_k. \quad (71)$$

It is clear that the 95% confidence interval for the forecast at time $t_i$ is $$\left(y_{\hat{m}_i,i}^f - 1.96(s_{\hat{m}_{i-1},i-1}^2)^{1/2} y_{\hat{m}_{i-1},i-1}^f, y_{\hat{m}_i,i}^f + 1.96(s_{\hat{m}_{i-1},i-1}^2)^{1/2} y_{\hat{m}_{i-1},i-1}^f\right),$$

where the lower end denotes the lower bound of the state estimate and the upper end denotes the upper bound of the state estimate.

Figure 6A:
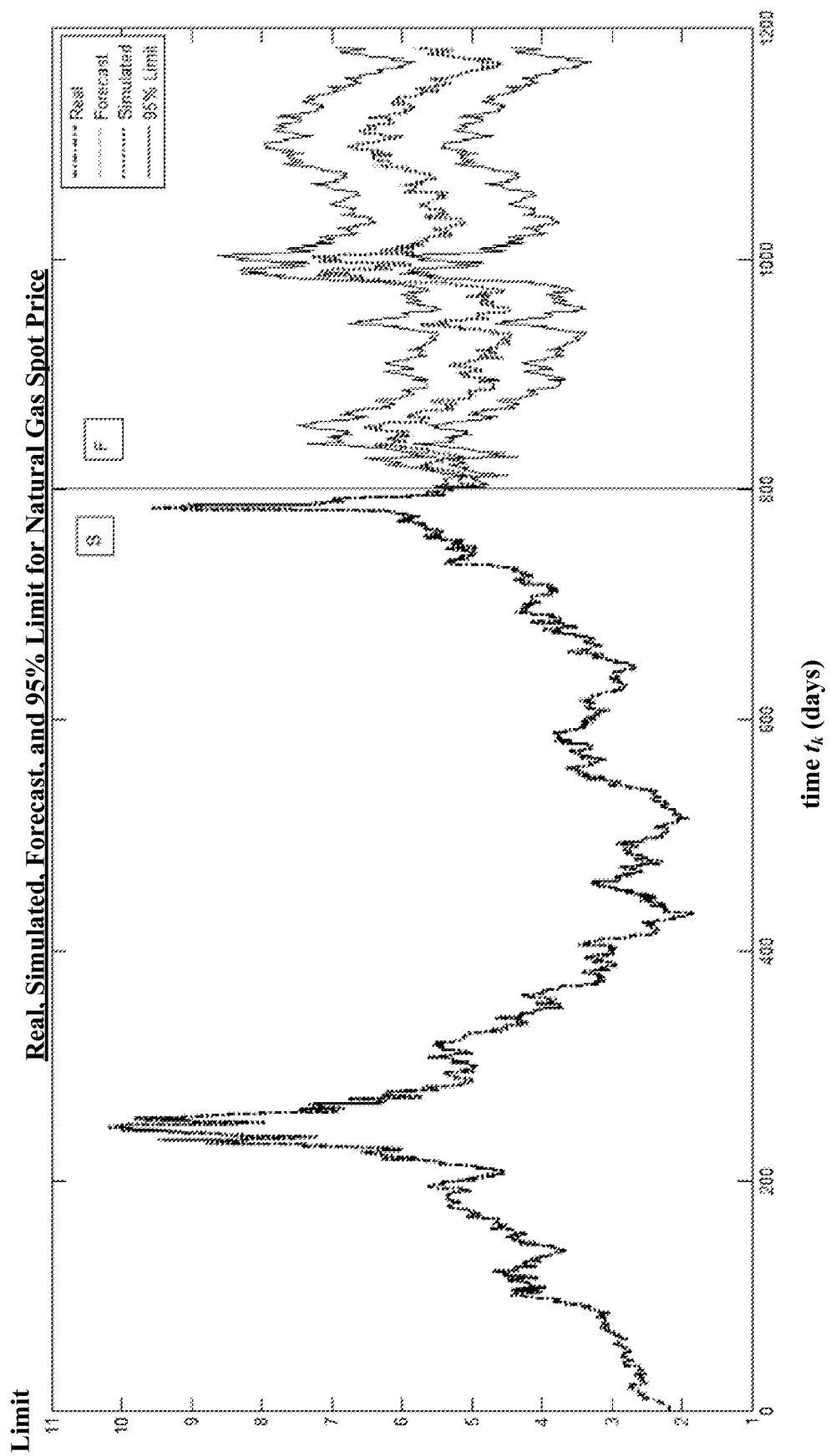
FIG. 6A illustrates the real, simulated, forecast, and 95% limit natural gas spot prices using the local lagged adapted generalized method of moments dynamic process according to various aspects of the embodiments described herein.
Figure 6B:
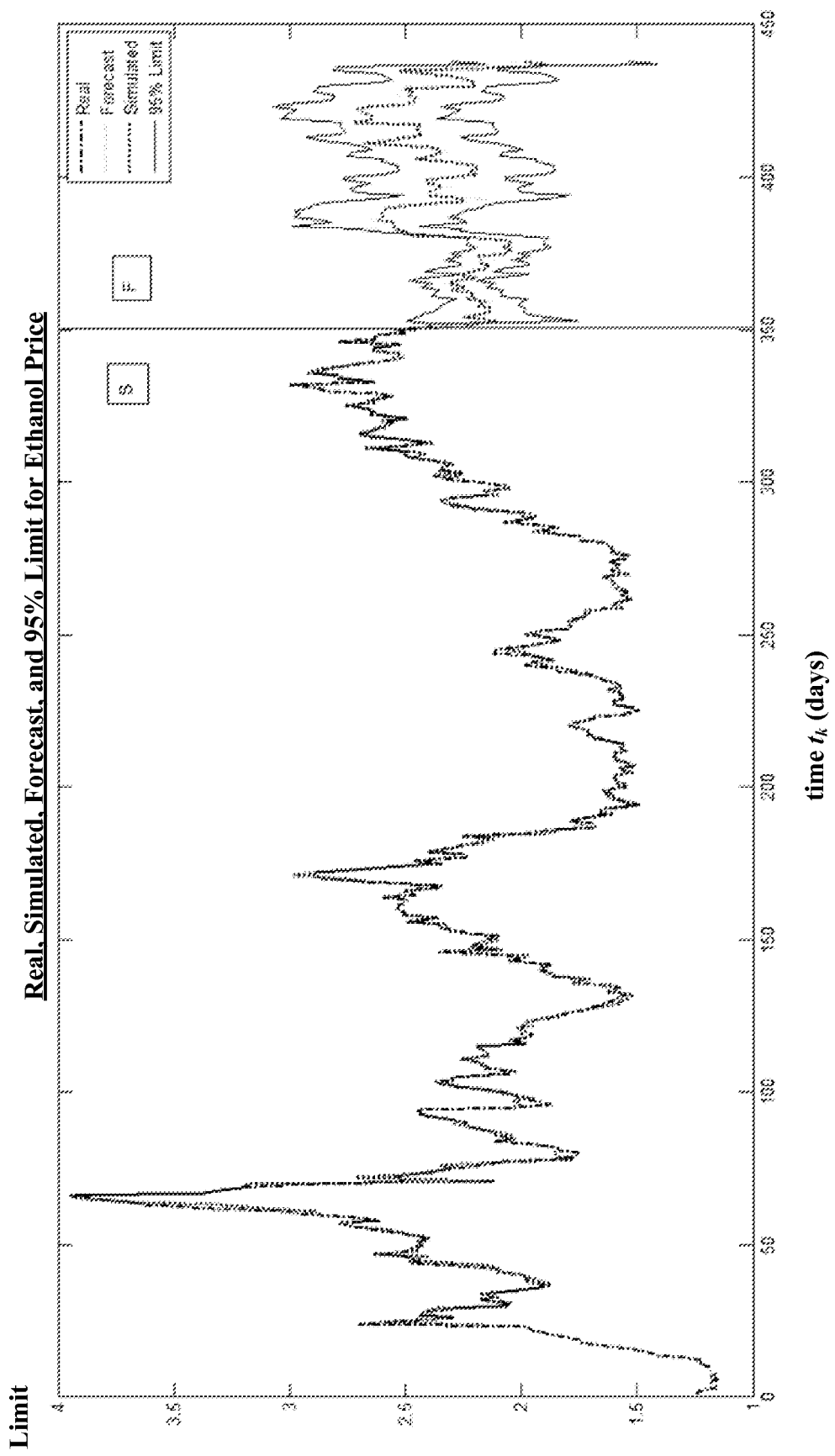
FIG. 6B illustrates the real, simulated, forecast, and 95% limit ethanol prices using the local lagged adapted generalized method of moments dynamic process according to various aspects of the embodiments described herein.

FIGS. 6A and 6B show the graphs of the forecast and 95 percent confidence limit for the daily Henry Hub Natural gas and weekly Ethanol data, respectively. Further, 6A and 6B show two regions: the simulation region S and the forecast region F. For the simulation region S, we plot the real data together with the simulated data. For the forecast region F, we plot the estimate of the forecast as explained in Section 5. The upper and the lower simulated sketches in FIGS. 6A and 6B are corresponding to the upper and lower ends of the 95% confidence interval. Next, we show graphs which exhibit the bounds of the estimates of the forecast for the four energy commodity.

Figure 7A:
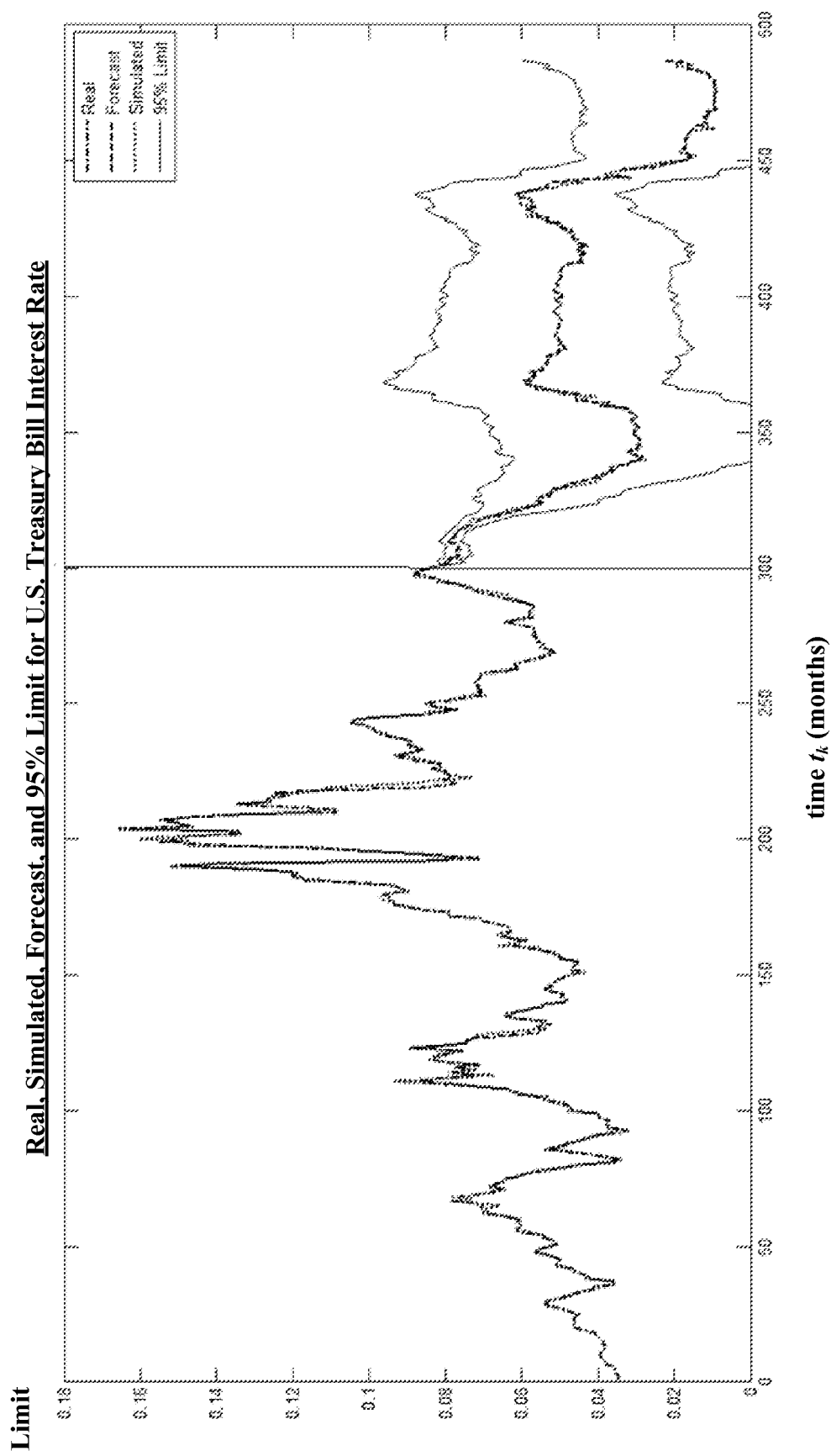
FIG. 7A illustrates the real, simulated, forecast, and 95% limit U.S. treasury bill interest rates using the local lagged adapted generalized method of moments dynamic process according to various aspects of the embodiments described herein.
Figure 7B:
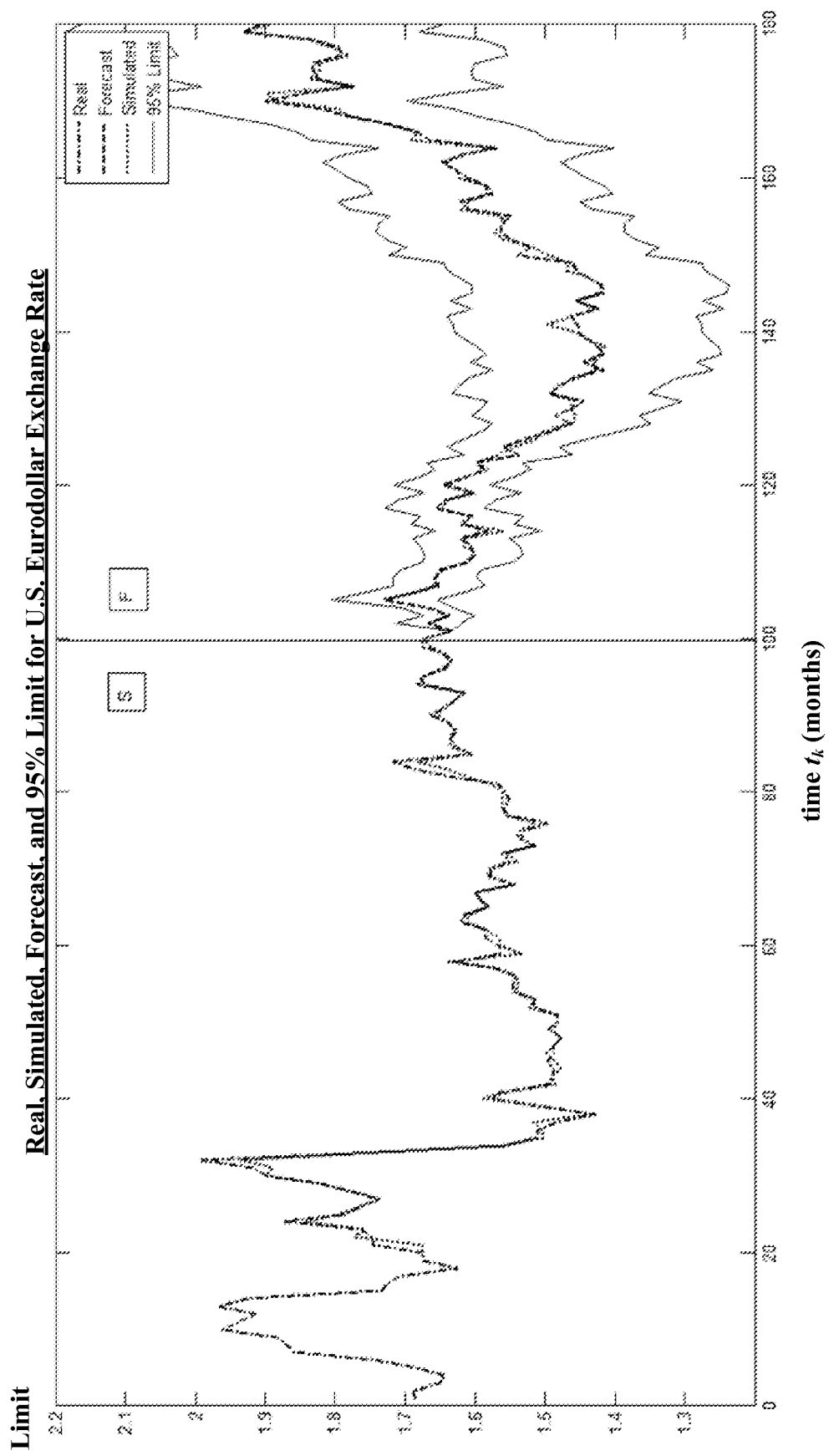
FIG. 7B illustrates the real, simulated, forecast, and 95% limit U.S. Eurodollar exchange rates using the local lagged adapted generalized method of moments dynamic process according to various aspects of the embodiments described herein.

5.2. Prediction/Confidence Interval for U. S. Treasury Bill Yield Interest Rate and U. S. Eurocurrency Rate Following the same procedure explained in Section 5.1, we show the graph of the real, simulated, forecast and 95% confidence limit for the U. S. TBYIR and U.S. EER for the initial delay r=20. FIG. 7A shows the real, simulated, forecast, and 95 percent confidence limit for the Interest rate data, and FIG. 7B shows the real, simulated, forecast, and 95% confidence level for the U. S. EER.

6. The Byproduct of the Llgmm Approach

The DTIDMLSMVSP not only plays role (a) to initiate ideas for the usage of discrete time interconnected dynamic approach parallel to the continuous-time dynamic process, (b) to speed-up the computation time, and (c) to significantly reduce the state error estimates, but it also provides an alternative approach to the GARCH(1,1) model and comparable results with ex post volatility results of Chan et al. Furthermore, the LLGMM directly generates a GMM based method (e.g., Remark 12, Section 3). In this section, we briefly discuss these comparisons in the context of four energy commodity and U.S. TBYIR and EER data.

6.1 Comparison Between DTIDMLSMVSP and GARCH Model

In this subsection, we briefly compare the applications of DTIDMLSMVSP and GARCH in the context of four energy commodities. In reference to Remark 6, we compare the estimates $s_{\hat{m}_k,k}^2$ with the estimate derived from the usage of a GARCH(1,1) model described defined by $$z_t | \mathcal{F}_t \sim \mathcal{N}(0, h_t), \quad (72)$$
$$h_t = \alpha_0 + \alpha_1 h_{t-1} + \beta_1 z_{t-1}^2, \alpha_0 > 0, \alpha_1, \beta_1 \geq 0.$$

The parameters $\alpha_0$, $\alpha_1$, and $\beta_1$ of the GARCH(1,1) conditional variance model (72) for the four commodities natural gas, crude oil, coal, and ethanol are estimated. The estimates of the parameters are given in Table 12.

TABLE 12

Parameter estimates for Garch(1,1) Model (72).

| Data Set | $\alpha_0$ | $\alpha_1$ | $\beta_1$ |
|---|---|---|---|
| Natural Gas | $6.863 \times 10^{-5}$ | 0.853 | 0.112 |
| Crude Oil | $9.622 \times 10^{-5}$ | 0.917 | 0.069 |
| Coal | $3.023 \times 10^{-5}$ | 0.903 | 0.081 |
| Ethanol | $4.152 \times 10^{-4}$ | 0.815 | 0.019 |

We later show a side by side comparison of $s_{\hat{m}_k,k}^2$ and the volatility described by GARCH(1,1) model described in (72) with coefficients in Table 12. The GARCH model does not estimate volatility but instead demonstrated insensitivity.

6.2 Comparison of DTIDMLSMVSP with Chan et al

In this subsection, using the U.S. TBYIR and U.S. EER data, the comparison between the DTIDMLSMVSP and ex post volatility of Chan et al is made. According to the work of Chan et al, we define the ex post volatility by the absolute value of the change in U.S. TBYIR data. Likewise, we define simulated volatility by the square root of the conditional variance implied by the estimates of the model (45). Using (45), we calculate our simulated volatility as $$\sigma_{\hat{m}_k,k} \left(y_{\hat{m}_k,k}^s\right)^{\delta_{\hat{m}_k,k}}.$$

We compare our work (DTIDMLSMVSP) with FIG. 1 of Chan et al. Their model does not clearly estimate volatility. It demonstrated insensitivity in the sense that it was unable to capture most of the spikes in the interest rate ex post volatility data.

6.3 Formulation of Aggregated Generalized Method of Moment (AGMM)

In this subsection, using the theoretical basis of the LLGMM and Remark 12 (Section 3), we develop a GMM based method for state and parameter estimation problems.

6.3.1. AGMM Method Applied to Energy Commodities

Using the aggregated parameter estimates $\bar{a}$, $\bar{\mu}$, and $\overline{\sigma^2}$ described by the mean value of the estimated samples $\{a_{\hat{m}_i,i}\}_{i=0}^{N}$, $\{\mu_{\hat{m}_i,i}\}_{i=0}^{N}$ and $\{\sigma_{\hat{m}_i,i}^2\}_{i=0}^{N}$, respectively, we discuss the simulated price values for the four energy commodities. We define $$\bar{a} = \frac{1}{N}\sum_{i=0}^{N} a_{\hat{m}_i,i},\ \bar{\mu} = \frac{1}{N}\sum_{i=0}^{N} \mu_{\hat{m}_i,i},\ \text{and}\ \overline{\sigma^2} = \frac{1}{N}\sum_{i=0}^{N} \sigma_{\hat{m}_i,i}^2,$$

respectively. Further, $\bar{a}$, $\bar{\mu}$, and $\overline{\sigma^2}$ are referred to as aggregated parameter estimates of a, $\mu$, and $\sigma^2$ over the given entire finite interval of time, respectively.

These estimates are derived using the following discretized system:

$$y_i^{ag} = y_{i-1}^{ag} + \bar{a}(\bar{\mu} - y_{i-1}^{ag})y_{i-1}^{ag}\Delta t + \overline{\sigma^2}^{1/2} y_{i-1}^{ag}\Delta W_i, \tag{73}$$

where $y_k^{ag}$ denotes the simulated value for $y_k$ at time $t_k$ at time. The overall descriptive data statistic regarding the four energy commodity prices and estimated parameters are recorded in the Table 13.

TABLE 13

Descriptive statistics for a, μ and σ² with time delay r = 20.

| Data Set Y | $\overline{Y}$ | Std (Y) | $\overline{\Delta\ln(Y)}$ | var (Δln(Y)) | $\bar{a}$ | Std (a) | $\bar{\mu}$ | Std (μ) | $\overline{\sigma^2}$ | std (σ²) | 95% C.I. $\bar{\mu}$ |
|---|---|---|---|---|---|---|---|---|---|---|---|
| Nat. Gas | 4.5504 | 1.5090 | 0.0008 | 0.0015 | 0.1867 | 0.3013 | 4.5538 | 2.3565 | 0.0013 | 0.0017 | (4.4196, 4.6880) |
| Crude Oil | 54.0093 | 31.0248 | 0.0003 | 0.0006 | 0.0215 | 0.0517 | 54.0307 | 37.4455 | 0.0005 | 0.0008 | (51.8978, 56.1636) |
| Coal | 27.1441 | 17.8394 | 0.0003 | 0.0015 | 0.0464 | 0.0879 | 27.0567 | 21.3506 | 0.0014 | 0.0022 | (25.8405, 28.2729) |
| Ethanol | 2.1391 | 0.4455 | 0.0011 | 0.0020 | 0.3167 | 0.8745 | 2.1666 | 0.7972 | 0.0018 | 0.0030 | (2.0919, 2.2414) |

Table 13 shows the descriptive statistics for a, μ and σ² with time delay r=20. Further, $\bar{\mu}$ is approximately close to the overall descriptive statistics of the mean $\overline{Y}$ of the real data for each of the energy commodities shown in column 2. Also, $\overline{\sigma^2}$ is approximately close to the overall descriptive statistics of the variance of $\Delta \ln(Y) = \ln(Y_i) - \ln(Y_{i-1})$ in column 5. Further, column 12 shows that the mean of the actual data set in Column 2 falls within the 95% confidence interval of $\bar{\mu}$. This exhibits that the parameter $\mu_{\hat{m}_k,k}$ is the mean level of $y_k$ at time $t_k$.

Using the aggregated parameter estimates $\bar{a}$, $\bar{\mu}$, and $\overline{\sigma^2}$ in Table 13 (columns 6, 8, and 10), the simulated price values for the four energy commodities are shown in columns 3, 6, 9 and 12 of Table 14.

TABLE 14

Real, Simulation using AGMM with r = 20.

| | Natural gas | | | Crude oil | | | Coal | | | Ethanol | |
|---|---|---|---|---|---|---|---|---|---|---|---|
| $t_k$ | Real | Simulated $y_k^{ag}$ (AGMM) | $t_k$ | Real | Simulated $y_k^{ag}$ (AGMM) | $t_k$ | Real | Simulated $y_k^{ag}$ (AGMM) | $t_k$ | Real | Simulated $y_k^{ag}$ (AGMM) |
| 21 | 2.759 | 2.649 | 21 | 24.00 | 23.974 | 21 | 8.690 | 9.111 | 21 | 1.895 | 1.834 |
| 22 | 2.659 | 2.651 | 22 | 23.900 | 24.204 | 22 | 8.630 | 9.028 | 22 | 1.950 | 1.854 |
| 23 | 2.742 | 2.636 | 23 | 23.050 | 25.229 | 23 | 8.690 | 9.192 | 23 | 1.974 | 1.798 |
| 24 | 2.562 | 2.625 | 24 | 22.300 | 25.586 | 24 | 8.940 | 9.032 | 24 | 2.700 | 1.858 |
| 25 | 2.495 | 2.593 | 25 | 22.450 | 26.470 | 25 | 9.310 | 8.938 | 25 | 2.515 | 1.830 |
| 26 | 2.54 | 2.525 | 26 | 22.350 | 25.953 | 26 | 8.940 | 8.792 | 26 | 2.290 | 1.954 |
| 27 | 2.592 | 2.513 | 27 | 21.750 | 26.229 | 27 | 8.940 | 9.035 | 27 | 2.440 | 1.926 |
| 28 | 2.57 | 2.399 | 28 | 22.100 | 26.555 | 28 | 9.130 | 9.255 | 28 | 2.415 | 1.939 |
| 29 | 2.541 | 2.485 | 29 | 22.400 | 26.402 | 29 | 9.190 | 9.018 | 29 | 2.300 | 1.883 |
| 30 | 2.618 | 2.506 | 30 | 22.500 | 27.34 | 30 | 8.570 | 8.687 | 30 | 2.100 | 1.880 |
| 31 | 2.564 | 2.460 | 31 | 22.650 | 26.24 | 31 | 8.690 | 8.985 | 31 | 2.040 | 1.817 |
| 32 | 2.667 | 2.295 | 32 | 21.950 | 26.765 | 32 | 8.880 | 9.339 | 32 | 2.160 | 1.810 |
| 33 | 2.633 | 2.534 | 33 | 21.600 | 26.358 | 33 | 8.570 | 9.359 | 33 | 2.130 | 1.774 |
| 34 | 2.515 | 2.514 | 34 | 21.000 | 26.87 | 34 | 8.750 | 9.310 | 34 | 2.155 | 1.717 |
| 35 | 2.53 | 2.573 | 35 | 20.950 | 26.835 | 35 | 8.630 | 9.302 | 35 | 2.010 | 1.658 |
| 36 | 2.549 | 2.592 | 36 | 21.100 | 26.725 | 36 | 8.440 | 9.543 | 36 | 1.930 | 1.607 |
| 37 | 2.603 | 2.456 | 37 | 20.800 | 26.439 | 37 | 8.440 | 9.288 | 37 | 1.900 | 1.645 |
| 38 | 2.603 | 2.428 | 38 | 20.300 | 26.916 | 38 | 8.940 | 9.155 | 38 | 1.975 | 1.635 |

TABLE 14-continued

Real, Simulation using AGMM with r = 20.

| | Natural gas | | | Crude oil | | | Coal | | | Ethanol | |
|---|---|---|---|---|---|---|---|---|---|---|---|
| $t_k$ | Real | Simulated $y_k^{ag}$ (AGMM) | $t_k$ | Real | Simulated $y_k^{ag}$ (AGMM) | $t_k$ | Real | Simulated $y_k^{ag}$ (AGMM) | $t_k$ | Real | Simulated $y_k^{ag}$ (AGMM) |
| 39 | 2.603 | 2.505 | 39 | 20.250 | 26.989 | 39 | 9.000 | 8.469 | 39 | 1.980 | 1.629 |
| 40 | 2.815 | 2.526 | 40 | 20.750 | 26.759 | 40 | 8.940 | 8.899 | 40 | 2.00 | 1.745 |
| ... | ... | ... | ... | ... | ... | ... | ... | ... | ... | ... | ... |
| ... | ... | ... | ... | ... | ... | ... | ... | ... | ... | ... | ... |
| 1145 | 5.712 | 5.218 | 2440 | 57.350 | 48.179 | 2865 | 29.310 | 17.839 | 375 | 2.073 | 2.625 |
| 1146 | 5.588 | 5.414 | 2441 | 56.740 | 48.239 | 2866 | 28.680 | 18.563 | 376 | 2.02 | 2.784 |
| 1147 | 5.693 | 5.460 | 2442 | 57.550 | 46.984 | 2867 | 26.770 | 19.577 | 377 | 2.073 | 2.558 |
| 1148 | 5.791 | 5.464 | 2443 | 59.090 | 47.418 | 2868 | 27.450 | 19.841 | 378 | 2.065 | 2.670 |
| 1149 | 5.614 | 5.544 | 2444 | 60.270 | 48.137 | 2869 | 27.000 | 18.876 | 379 | 2.055 | 2.565 |
| 1150 | 5.442 | 5.700 | 2445 | 60.750 | 49.185 | 2870 | 26.670 | 18.465 | 380 | 2.209 | 2.796 |
| 1151 | 5.533 | 5.710 | 2446 | 58.410 | 48.271 | 2871 | 26.510 | 18.139 | 381 | 2.44 | 2.783 |
| 1152 | 5.378 | 5.936 | 2447 | 58.720 | 48.384 | 2872 | 26.480 | 17.963 | 382 | 2.517 | 2.659 |
| 1153 | 5.373 | 5.869 | 2448 | 58.640 | 47.509 | 2873 | 25.150 | 18.151 | 383 | 2.718 | 2.739 |
| 1154 | 5.382 | 5.778 | 2449 | 57.870 | 48.654 | 2874 | 25.570 | 17.987 | 384 | 2.541 | 2.681 |
| 1155 | 5.507 | 5.732 | 2450 | 59.130 | 46.883 | 2875 | 25.880 | 18.393 | 385 | 2.566 | 2.631 |
| 1156 | 5.552 | 5.816 | 2451 | 60.110 | 46.403 | 2876 | 25.240 | 18.492 | 386 | 2.626 | 2.638 |
| 1157 | 5.31 | 6.000 | 2452 | 58.940 | 45.564 | 2877 | 25.000 | 18.621 | 387 | 2.587 | 2.542 |
| 1158 | 5.338 | 6.162 | 2453 | 59.930 | 44.177 | 2878 | 25.080 | 18.806 | 388 | 2.628 | 2.491 |
| 1159 | 5.298 | 5.899 | 2454 | 61.180 | 43.112 | 2879 | 25.050 | 19.384 | 389 | 2.587 | 2.392 |
| 1160 | 5.189 | 6.008 | 2455 | 59.660 | 43.47 | 2880 | 25.890 | 20.131 | 390 | 2.536 | 2.393 |
| 1161 | 5.082 | 6.175 | 2456 | 58.590 | 41.531 | 2881 | 25.230 | 21.099 | 391 | 2.42 | 2.534 |
| 1162 | 5.082 | 6.191 | 2457 | 58.280 | 40.452 | 2882 | 25.940 | 21.499 | 392 | 2.247 | 2.687 |
| 1163 | 5.082 | 5.814 | 2458 | 58.790 | 41.968 | 2883 | 25.260 | 21.38 | 393 | 2.223 | 2.701 |
| 1164 | 4.965 | 5.701 | 2459 | 56.230 | 44.359 | 2884 | 25.250 | 20.786 | 394 | 2.39 | 2.703 |
| 1165 | 4.767 | 5.871 | 2460 | 55.90 | 44.679 | 2885 | 26.060 | 20.892 | 395 | 2.38 | 2.655 |
| 1166 | 4.675 | 5.998 | 2461 | 56.420 | 43.081 | 2886 | 26.030 | 21.269 | 396 | 2.366 | 2.559 |
| 1167 | 4.79 | 5.952 | 2462 | 58.010 | 44.235 | 2887 | 26.660 | 20.371 | 397 | 2.335 | 2.575 |
| 1168 | 4.631 | 5.782 | 2463 | 57.280 | 43.199 | 2888 | 27.120 | 19.822 | 398 | 2.428 | 2.466 |
| 1169 | 4.658 | 5.673 | 2464 | 60.30 | 42.655 | 2889 | 26.400 | 19.644 | 399 | 2.409 | 2.369 |
| 1170 | 4.57 | 5.936 | 2465 | 60.970 | 43.498 | 2890 | 26.940 | 20.602 | 400 | 2.29 | 2.222 |

TABLE 15

Comparison of Goodness-of-fit Measures for the LLGMM and AGMM method using initial delay r = 20.

| Goodness of-fit Measure | LLGMM | | | | AGMM | | | |
|---|---|---|---|---|---|---|---|---|
| | Natural Gas | Crude Oil | Coal | Ethanol | Natural gas | Crude oil | Coal | Ethanol |
| $\widehat{RAMSE}$ | 0.0674 | 0.4625 | 0.4794 | 0.0375 | 1.4968 | 30.7760 | 17.7620 | 0.4356 |
| $\widehat{AMAD}$ | 1.1318 | 24.5010 | 9.4009 | 0.3213 | 0.0068 | 0.0857 | 0.0833 | 0.0035 |
| $\widehat{AMB}$ | 1.1371 | 27.2707 | 12.8370 | 0.3566 | 1.2267 | 27.3050 | 13.1060 | 0.3579 |

6.3.2. Formulation of Aggregated Generalized Method of Moment (AGMM) for U.S. Treasury Bill and U.S. Eurocurrency Rate The overall descriptive statistics of data sets regarding U.S. Treasury Bill Yield Interest Rate and U.S. Eurocurrency Exchange Rate are recorded in the following table for initial delay r=20.

TABLE 17

| $\overline{Y}$ | Std (Y) | $\overline{\beta}$ | Std ($\beta$) | $\overline{\mu}$ | Std ($\mu$) | $\overline{\delta}$ | Sts ($\delta$) | $\overline{\sigma}$ | Std ($\sigma$) | $\overline{\gamma}$ | Std ($\gamma$) |
|---|---|---|---|---|---|---|---|---|---|---|---|
| Descriptive statistics for $\beta, \overline{\mu}, \delta, \sigma,$ and $\gamma$ for the U.S. TBYIR data with initial delay r = 20 | | | | | | | | | | | |
| 0.05667 | 0.0268 | 0.8739 | 1.8129 | −3.8555 | 8.7608 | 1.4600 | 0.00 | 0.3753 | 0.5197 | 1.4877 | 0.1357 |
| Descriptive statistics for $\beta, \overline{\mu}, \delta, \sigma,$ and $\gamma$ for the U.S. Eurocurrency Exchange Rate data with initial delay r = 20 | | | | | | | | | | | |
| 1.6249 | 0.1337 | 1.5120 | 2.1259 | −1.1973 | 1.6811 | 1.4892 | 0.00 | 0.0243 | 0.0180 | 1.08476 | 1.0050 |

In Tables 16 and 17, the real and the LLGMM simulated rates of the U.S. TBYIR and the U. S. Eurocurrency Exchange Rate (US-EER) are exhibited in the first and second columns, respectively. Using the aggregated parameter estimates $\bar{\beta}, \bar{\mu}, \bar{\delta}, \bar{\sigma}$ and $\hat{\gamma}$ in the respective Tables 16 (columns: 3, 5, 7, 9 and 11) and Table 17 (columns: 3, 5, 7, 9, and 11), the simulated rates for the U.S. TYBIR and the U.S. EER are shown in the column 3 of Table 18. These estimates are derived using the following discretized system:

$$y_i^{ag} = y_{i-1}^{ag} + (\bar{\beta} y_{i-1}^{ag} + \bar{\mu}(y_{i-1}^{ag})^{\bar{\delta}}) + \bar{\sigma}(y_{i-1}^{af})^{\hat{\gamma}} \Delta W_i, \tag{74}$$

where AGMM, $y_k^{ag}$, $y_k$ at time $t_k$ are defined in (73).

In Table 18, we show a side by side comparison of the estimates for the simulated value using LLGMM and AGMM methods for U.S. Treasury Bill Yield Interest Rate and U.S. Eurocurrency Exchange Rate, respectively: initial delay r=20.

7. Comparisons of LLGMM with OCBGMM

In this section, we briefly compare LLGMM and OCB-GMM in the frame-work of the conceptual, computational, mathematical, and statistical results coupled with role, scope and applications. For this purpose, to better appreciate and understand the comparative work, we utilize the state and parameter estimation problems for the stochastic dynamic model of interest rate that has been studied extensively in the

TABLE 18

Estimates for Real, Simulated value using LLGMM and AGMM methods for U.S. TYBIR and the U.S. EER, respectively for initial delay r = 20.

| | Interest Rate Data | | | | Eurocurrency Rate | | |
|---|---|---|---|---|---|---|---|
| $t_k$ | Real | Simulated LLGMM | Simulated AGMM | $t_k$ | Real Real | Simulated LLGMM | Simulated AGMM |
| 21 | 0.0465 | 0.0459 | 0.0326 | 21 | 1.7448 | 1.6732 | 1.655 |
| 22 | 0.0459 | 0.0467 | 0.0299 | 22 | 1.7465 | 1.7711 | 1.6588 |
| 23 | 0.0462 | 0.0463 | 0.0342 | 23 | 1.7638 | 1.7588 | 1.6096 |
| 24 | 0.0464 | 0.0463 | 0.034 | 24 | 1.874 | 1.8423 | 1.6251 |
| 25 | 0.045 | 0.0457 | 0.0365 | 25 | 1.7902 | 1.7971 | 1.6221 |
| 26 | 0.048 | 0.048 | 0.0447 | 26 | 1.7635 | 1.7668 | 1.5984 |
| 27 | 0.0496 | 0.0496 | 0.0449 | 27 | 1.74 | 1.7362 | 1.6368 |
| 28 | 0.0537 | 0.053 | 0.0538 | 28 | 1.7763 | 1.7755 | 1.5795 |
| 29 | 0.0535 | 0.0529 | 0.0535 | 29 | 1.8219 | 1.8224 | 1.5708 |
| 30 | 0.0532 | 0.0536 | 0.0489 | 30 | 1.8985 | 1.9002 | 1.6174 |
| 31 | 0.0496 | 0.0495 | 0.0575 | 31 | 1.9166 | 1.8897 | 1.6403 |
| 32 | 0.047 | 0.0479 | 0.0548 | 32 | 1.992 | 1.9361 | 1.6425 |
| 33 | 0.0456 | 0.0453 | 0.0385 | 33 | 1.7741 | 1.7738 | 1.6409 |
| 34 | 0.0426 | 0.0423 | 0.042 | 34 | 1.5579 | 1.5601 | 1.6759 |
| 35 | 0.0384 | 0.0413 | 0.0339 | 35 | 1.5138 | 1.5017 | 1.5287 |
| 36 | 0.036 | 0.0363 | 0.0384 | 36 | 1.5102 | 1.5028 | 1.5445 |
| 37 | 0.0354 | 0.0358 | 0.0457 | 37 | 1.4832 | 1.5171 | 1.6334 |
| 38 | 0.0421 | 0.0434 | 0.0321 | 38 | 1.4276 | 1.4353 | 1.6666 |
| 39 | 0.0427 | 0.043 | 0.023 | 39 | 1.51 | 1.4972 | 1.606 |
| 40 | 0.0442 | 0.044 | 0.0299 | 40 | 1.5734 | 1.588 | 1.662 |
| 41 | 0.0456 | 0.0463 | 0.0301 | 41 | 1.5633 | 1.5556 | 1.6305 |
| 42 | 0.0473 | 0.0462 | 0.0365 | 42 | 1.4966 | 1.4856 | 1.5987 |
| 43 | 0.0497 | 0.0512 | 0.0341 | 43 | 1.4868 | 1.4914 | 1.5832 |
| 44 | 0.05 | 0.0505 | 0.042 | 44 | 1.4864 | 1.4785 | 1.621 |
| 45 | 0.0498 | 0.0497 | 0.0451 | 45 | 1.4965 | 1.4854 | 1.6208 |
| ... | ... | ... | ... | | ... | ... | ... |
| ... | ... | ... | ... | ... | ... | ... | ... |
| 420 | 0.045 | 0.0449 | 0.0337 | 155 | 1.5581 | 1.5635 | 1.6326 |
| 421 | 0.0457 | 0.045 | 0.0309 | 156 | 1.6097 | 1.6195 | 1.574 |
| 422 | 0.0455 | 0.0459 | 0.0389 | 157 | 1.6435 | 1.6089 | 1.6232 |
| 423 | 0.0472 | 0.047 | 0.0306 | 158 | 1.5793 | 1.5817 | 1.6669 |
| 424 | 0.0468 | 0.0464 | 0.0385 | 159 | 1.5782 | 1.5826 | 1.649 |
| 425 | 0.0486 | 0.0481 | 0.0179 | 160 | 1.6108 | 1.6206 | 1.5725 |
| 426 | 0.0507 | 0.0499 | 0.0191 | 161 | 1.6368 | 1.6256 | 1.6879 |
| 427 | 0.052 | 0.0514 | 0.0257 | 162 | 1.662 | 1.644 | 1.6681 |
| 428 | 0.0532 | 0.0539 | 0.029 | 163 | 1.6115 | 1.6156 | 1.6534 |
| 429 | 0.0555 | 0.0546 | 0.0379 | 164 | 1.571 | 1.5708 | 1.6387 |
| 430 | 0.0569 | 0.0588 | 0.0404 | 165 | 1.6692 | 1.6912 | 1.6243 |
| 431 | 0.0566 | 0.056 | 0.0487 | 166 | 1.6766 | 1.6832 | 1.5822 |
| 432 | 0.0579 | 0.0587 | 0.0432 | 167 | 1.7188 | 1.7224 | 1.5764 |
| 433 | 0.0569 | 0.0571 | 0.0436 | 168 | 1.7856 | 1.7285 | 1.6206 |
| 434 | 0.0596 | 0.0602 | 0.0393 | 169 | 1.8225 | 1.7952 | 1.6044 |
| 435 | 0.0609 | 0.0601 | 0.04 | 170 | 1.8699 | 1.8896 | 1.6792 |
| 436 | 0.06 | 0.0601 | 0.0483 | 171 | 1.8562 | 1.8964 | 1.5417 |
| 437 | 0.0611 | 0.0604 | 0.0292 | 172 | 1.772 | 1.7717 | 1.6087 |
| 438 | 0.0617 | 0.0617 | 0.031 | 173 | 1.8398 | 1.8372 | 1.5426 |
| 439 | 0.0577 | 0.0583 | 0.0379 | 174 | 1.8207 | 1.8214 | 1.6147 |
| 440 | 0.0515 | 0.0509 | 0.0464 | 175 | 1.8248 | 1.8242 | 1.6544 |
| 441 | 0.0488 | 0.05 | 0.0476 | 176 | 1.7934 | 1.7795 | 1.5929 |
| 442 | 0.0442 | 0.0441 | 0.0516 | 177 | 1.7982 | 1.8056 | 1.5845 |
| 443 | 0.0387 | 0.0445 | 0.0675 | 178 | 1.8335 | 1.835 | 1.6625 |
| 444 | 0.0362 | 0.0313 | 0.0484 | 179 | 1.934 | 1.9301 | 1.5832 |
| 445 | 0.0349 | 0.0386 | 0.0484 | 180 | 1.9054 | 1.8939 | 1.5472 | frame-work of orthogonality condition vector based generalized method of moments (OCBGMM). Recall that the LLGMM approach is based on seven interactive components (Section 1). On the other hand, the existing OCBGMM (GMM and IRGMM) approach and its extensions are based on five components (Section 3). The basis for the formation of orthogonality condition parameter vectors (OCPV) in the LLGMM (Section 3) and OCBGMM (GMM/IRGMM) are different. In the existing OCBGMM (GMM/IRGMM), the orthogonality condition vectors are formed on the basis of algebraic manipulation coupled with econometric specification-based discretization scheme (OCPV-Algebraic) rather than stochastic calculus and a continuous-time stochastic dynamic model based OCPV-Analytic. This motivates to extend a couple of OCBGMM-based state and parameter estimation methods.

Using the stochastic calculus based formation of the OCPV-Analytic in the context of the continuous-time stochastic dynamic model (Section 3), two new OCBGMM based methods are developed for the state and parameter estimation problems. The proposed OCBGMM methods are direct extensions of the existing OCBGMM method and its extension IRGMM in the context of the OCPV. In view of this difference and for the sake of comparison, the newly developed OCBGMM and the existing OCBGMM methods are referred to as the OCBGMM-Analytic and OCBGMM-Algebraic, respectively. In particular, the GMM and IRGMM with OCPV-algebraic are denoted as GMM-Algebraic and IRGMM-Algebraic and corresponding extensions under the OCPV-Analytic as GMM-Analytic and IRGMM-Analytic, respectively.

Furthermore, using LLGMM based method, the aggregated generalized method of moments (AGMM) introduced in Subsection 3.5 and described in Subsection 6.3 is also compared along with the above stated methods, namely GMM-Algebraic, GMM-Analytic, IRGMM-Algebraic, and IRGMM-Analytic. A comparative analysis of the results of GMM-Algebraic, GMM-Analytic, IRGMM-Algebraic, IRGMM-Analytic and AGMM methods with the LLGMM for the state and parameter estimation problems of the interest rate and energy commodities stochastic dynamic models are briefly outlined in the subsequent subsections. First, based on Sections 1, 2, 3 and 4, we briefly summarize the comparison between the LLGMM and OCBGMM methods.

7.1 Theoretical Comparison Between LLGMM and OCBGMM

Based on the foundations of the analytical, conceptual, computational, mathematical, practical, statistical, and theoretical motivations and developments outlined in Sections 2, 3, 4 and 5, we summarize the comparison between the innovative approach LLGMM with the existing and newly developed OCBGMM methods in separate tables in a systematic manner.

Table 19 outlines the differences between the LLGMM method and existing orthogonality condition based GMM/IRGMM-Algebraic and the newly formulated GMM/IRGMM-Analytic methods together with the AGMM.

TABLE 19

Mathematical Comparison Between the LLGMM and OCBGMM

| Feature | LLGMM | OCBGMM-Algebraic | OCGMM-Analytic | Justifications |
|---|---|---|---|---|
| Composition: | Seven components | Five components | Five components | Sections 1. 3 |
| Model: | Development | Selection | Development/Selection | Sections 1, 3 |
| Goal: | Validation | Specification/Testing | Validation/Testing | Sections 1, 3 |
| Discrete-Time Scheme: | Constructed from SDE | Using Econometric specification | Constructed from SDE | Remarks 8,15 |
| Formation of Orthogonality Vector: | Using stochastic calculus | Formed using algebraic manipulation | Using Stochastic calculus | Remarks 7, 8, 9, 14, 15 |

TABLE 20

Intercomponent Interaction Comparison Between LLGMM and OCBGMM

| Feasture | LLGMM | OCBGMM-Algebraic | OCGMM-Analytic | Justifications |
|---|---|---|---|---|
| Moment Equations: | Local Lagged adaptive process | Single/global system | Single/global system | Remarks 5, 8, 18a, and 18b |
| Type of Moment Equations: | Local lagged adaptive process | Single-shot | Single-shot | Remarks 5, 8, 13, 15, and 16 |
| Component Interconnections: | Strongly connected | Weakly connected | Weakly connected | Remarks 8, 13, 14, 15, 16, and 18 |
| Dynamic and Static: | Discrete-time Dynamic | Static | Static | Remarks 5, 8, 18 and Lemma 1 (Section 2) |

TABLE 21

Conceptual Computational Comparison Between LLGMM and OCBGMM

| Feature | LLGMM | OCBGMM-Algebraic | OCGMM-Analytic | Justifications |
|---|---|---|---|---|
| Local admissible Lagged Data Size: | Multi-choice | Single-choice/data size | Singe-choice/data size | Definition 10, Remark 18, Subsection 4.2 |
| Local admissible class of lagged finite restriction sequences | Multi-choice | Single-choice/data sequence | Single-choice/data sequence | Adapted finite restricted sample data: Definition 11, Remark 18, Subsection 4.2 |
| Local admissible finite sequence parameter estimates: | Multi-choice | Single-shot estimate | Single-shot estimates | Subsection 4.2 |
| Local admissible sequence of finite state simulation values: | Multi-choice | Single-choice | Single-choice | Remark 18, Subsection 4.3 |
| Quadratic Mean Square $\epsilon$-sub-optimal errors: | Multi-choice | Single-error | Single-error | Remark 18, Subsection 4.3 |
| $\epsilon$-sub-optimal local lagged sample size: | Multi-choice | Single-choice | Single-choice | Definition 12, Remark 18, Subsection 4.3 |
| $\epsilon$-best sub optimal sample size: | $\epsilon$-best sub optimal choice | No-choice | No-choice | Remark 18, Subsection 4.3 |
| $\epsilon$-best sub optimal parameter estimated: | $\epsilon$-best estimators | No-choice | No-choice | Remark 18, Subsection 4.3 |
| $\epsilon$-best sub optimal state estimate | $\epsilon$-best sub optimal choice | No-choice | No-choice | Remark 18, Subsection 4.3 |

TABLE 22

Theoretical Performance Comparison Between LLGMM and OCBGMM

| Feature | LLGMM | OCBGMM-Algebraic | OCGMM-Analytic | Justifications |
|---|---|---|---|---|
| Data Size: | Reasonable Size | Large Data Size | Large Data Size | For Respectable results |
| Stationary Condition: | Not required | Need Ergotic/Asympotic stationary | Need Ergodic/Asymptotic | For Reasonable results |
| Multi-level optimization: | At least 2 level hierarchical optimization | Single-shot | Single-shot | Not comparable |
| Admissible Strategies: | Multi-choices | Single-shot | Single-shot | Not comparable |
| Computational Stability: | Algorithm Converges in a single/double digit trials | Single-choice | Single-choice | Simulation results |
| Significance of lagged adaptive process: | Stabilizing agent | Non-existence of the feature | Non-existence | Not comparable |
| Operation: | Operates like Discrete time Dynamic Process | Operates like a static dynamic process | Operates like static process | Obvious, details see Sections 4, 5, 6 and 7 |

7.2 Comparisons of LLGMM Method with Existing Methods Using Interest Rate Stochastic Model The continuous-time interest rate process is described by a nonlinear Itô-Doob-type stochastic differential equation:

$$dy=(\alpha+\beta y)dt+\sigma y^\gamma dW(t). \quad (75)$$

The energy commodities stochastic dynamic model is described in (27), in Subsection 3.5. These models would be utilized to further compare the role, scope and merit of the LLGMM and OCBGMM methods in the frame-work of the graphical, computational and statistical results and applications to forecasting and prediction with certain degree of confidence.

Remark 26.

The continuous-time interest rate model (75) was chosen so that we can compare our LLGMM method with the OCBGMM method. Our proposed model for the continuous-time interest rate model is described in (45). We will later compare the results derived using model (75) with the results using (45) from Subsections 3.6 and 4.6.

Descriptive Statistic for Time-Series Data Set.

For this purpose, first, we consider one month risk free rates from the Monthly Interest rate data sets for the period Jun. 30, 1964 to Dec. 31, 2004. Table 23 below shows some statistics of the data set shown in FIG. 19.

TABLE 23

Statistics for the Interest Rate data for Jun. 30, 1964 to Dec. 31, 2004.

| Variable | N | Mean | Std dev | $\rho_1$ | $\rho_2$ | $\rho_3$ | $\rho_4$ | $\rho_5$ | $\rho_6$ |
|---|---|---|---|---|---|---|---|---|---|
| $y_t$ | 487 | 0.0592 | 0.0276 | 0.9809 | 0.9508 | 0.9234 | 0.8994 | 0.8764 | 0.8519 |
| $\Delta y_t$ | 486 | −0.00003 | 0.0050 | 0.3305 | −0.0919 | −0.1048 | −0.0351 | 0.0403 | −0.1877 |

Mean, standard deviations, and autocorrelations of monthly Treasury bill yields (US TBYIR) and yield changes $\rho_j$ denotes the autocorrelation coefficient of order j, N represents the total number of observations used.

The Orthogonality Condition Vector for (75).

First, we present the orthogonality condition parameter vectors (OCPV) for the GMM-Algebraic, GMM-Analytic, IRGMM-Algebraic, and IRGMM-Analytic methods. These orthogonality vectors are then used for the state and parameter estimation problems. For this, we need to follow the procedure (Section 3) for obtaining the analytic orthogonality condition parameter vector (OCPV-Analytic). We consider the Lyapunov functions ( $$V_1(t, y) = \frac{1}{2} y^2$$

and $$V_2(t, y) = \frac{1}{3} y^3.$$

The Itô-differential of $V_1$ and $V_2$ with respect to (75) are:

$$\begin{cases} d\left(\frac{1}{2} y^2\right) = \left[\alpha y + \beta y^2 + \frac{1}{2}\sigma^2 y^{2\gamma}\right]dt + \sigma y^{\gamma+1} dW(t) \\ d\left(\frac{1}{3} y^3\right) = \left[\alpha y^2 + \beta y^3\right) + \sigma^2 y^{2\gamma+1}\right]dt + \sigma y^{\gamma+2} dW(t) \end{cases} \quad (76)$$

The component of orthogonality condition vector (OCPV-Analytic) is described by:

$$\begin{cases} \Delta y_t - (\mathbb{E}[y_t | \mathcal{F}_{t-1}] - y_{t-1}) \\ \frac{1}{2}\Delta(y_t^2) - \frac{1}{2}(\mathbb{E}[y_t^2 | \mathcal{F}_{t-1}] - y_{t-1}^2) \\ \frac{1}{3}\Delta(y_t^3) - \frac{1}{3}(\mathbb{E}[y_t^3 | \mathcal{F}_{t-1}] - y_{t-1}^3) \\ \mathbb{E}[(\Delta y_t - \mathbb{E}[\Delta y_t | \mathcal{F}_{t-1}])^2 | \mathcal{F}_{t-1}] - \sigma^2 y_{t-1}^{2\gamma} \Delta t. \end{cases} \quad (77)$$

where $$\begin{cases} \mathbb{E}[y_t | \mathcal{F}_{t-1}] - y_{t-1} & = (\alpha + \beta y)\Delta t \\ \frac{1}{2}(\mathbb{E}[y_t^2 | \mathcal{F}_{t-1}] - y_{t-1}^2) & = \left[\alpha y_{t-1} + \beta y_{t-1}^2 + \frac{1}{2}\sigma^2 y_{t-1}^{2\gamma}\right]\Delta t \\ \frac{1}{3}(\mathbb{E}[y_t^3 | \mathcal{F}_{t-1}] - y_{t-1}^3) & = \left[\alpha y_{t-1}^2 + \beta y_{t-1}^3 + \sigma^2 y_{t-1}^{2\gamma+1}\right]\Delta t \\ \mathbb{E}[(\Delta y_t - \mathbb{E}[\Delta y_t | \mathcal{F}_{t-1}])^2 | \mathcal{F}_{t-1}] & = \sigma^2 y_{t-1}^{2\gamma} \Delta t \end{cases} \quad (78)$$

On the other hand, using discrete time econometric specification coupled with algebraic manipulations, the components of orthogonality condition parameter vector (OCPV-Algebraic) are as follows:

$$\begin{cases} y_t - y_{t-1} - (\alpha + \beta y)\Delta t \\ y_{t-1}(y_t - y_{t-1} - (\alpha + \beta y)\Delta t) \\ (y_t - y_{t-1} - (\alpha + \beta y)\Delta t)^2 - \sigma^2 y_{t-1}^{2\gamma} \\ y_{t-1}\left[(y_t - y_{t-1} - (\alpha + \beta y)\Delta t)^2 - \sigma^2 y_{t-1}^{2\gamma}\right] \end{cases} \quad (79)$$

We apply the GMM-Algebraic, IRGMM-Algebraic, GMM-Analytic, and IRGMM-Analytic methods.

Parameter Estimates of (75) Using LLGMM Method.

Using the LLGMM method, the parameter estimates $\alpha_{\hat{m}_k,k}$, $\beta_{\hat{m}_k,k}$, $\sigma_{\hat{m}_k,k}$, and $\gamma_{\hat{m}_k,k}$ are shown in Table 24. Here, we use $\epsilon=0.001$, p=2, and initial delay r=20.

TABLE 24

Estimates for $\hat{m}_k$, $\alpha_{\hat{m}_k,k}$, $\beta_{\hat{m}_k,k}$, $\sigma_{\hat{m}_k,k}$, $\gamma_{\hat{m}_k,k}$ for U. S. Treasury Bill Yield Interest Rate data using LLGMM.

| | | Interest Rate | | | |
|---|---|---|---|---|---|
| $t_k$ | $\hat{m}_k$ | $\alpha_{\hat{m}_k,k}$ | $\beta_{\hat{m}_k,k}$ | $\sigma_{\hat{m}_k,k}$ | $\gamma_{\hat{m}_k,k}$ |
| 21 | 2 | 0.0334 | −0.7143 | 0.0446 | 1.5 |
| 22 | 3 | 0.0427 | −0.9254 | 0.0766 | 1.5 |
| 23 | 4 | 0.0425 | −0.9198 | 0.0914 | 1.5 |
| 24 | 5 | 0.0413 | −0.8937 | 0.09 | 1.5 |
| 25 | 4 | 0.1042 | −2.2619 | 0.1003 | 1.5 |
| 26 | 19 | 0.0002 | 0.0083 | 0.1043 | 1.5 |
| 27 | 14 | 0.0024 | −0.0359 | 0.1281 | 1.5 |
| 28 | 5 | −0.023 | 0.5207 | 0.3501 | 1.5 |
| 29 | 13 | 0.0037 | −0.0573 | 0.1652 | 1.5 |
| 30 | 18 | 0.0008 | 0.001 | 0.1447 | 1.5 |
| 31 | 3 | −0.3827 | 7.1316 | 0.26 | 1.5 |
| 32 | 19 | 0.006 | −0.1213 | 0.1828 | 1.5 |
| 33 | 6 | 0.0063 | −0.1359 | 0.343 | 1.5 |
| 34 | 19 | 0.0081 | −0.1705 | 0.1993 | 1.5 |
| 35 | 4 | −0.0166 | 0.2984 | 0.3509 | 1.5 |
| 36 | 4 | −0.0059 | 0.0721 | 0.2318 | 1.5 |
| 37 | 9 | −0.0035 | 0.0324 | 0.3114 | 1.5 |
| 38 | 14 | 0.0051 | −0.1186 | 0.3385 | 1.5 |

TABLE 24-continued

Estimates for $\hat{m}_k$, $\alpha_{\hat{m}_k,k}$, $\beta_{\hat{m}_k,k}$, $\sigma_{\hat{m}_k,k}$, $\gamma_{\hat{m}_k,k}$ for U. S. Treasury Bill Yield Interest Rate data using LLGMM.
Interest Rate

| $t_k$ | $\hat{m}_k$ | $\alpha_{\hat{m}_k,k}$ | $\beta_{\hat{m}_k,k}$ | $\sigma_{\hat{m}_k,k}$ | $\gamma_{\hat{m}_k,k}$ |
|---|---|---|---|---|---|
| 39 | 20 | 0.0059 | −0.1294 | 0.282 | 1.5 |
| 40 | 12 | 0.0075 | −0.185 | 0.3447 | 1.5 |
| 41 | 12 | 0.0099 | −0.2379 | 0.3579 | 1.5 |
| 42 | 4 | −0.0089 | 0.2335 | 0.3562 | 1.5 |
| 43 | 7 | 0.0074 | −0.1289 | 0.4654 | 1.5 |
| 44 | 7 | 0.0182 | −0.3677 | 0.4206 | 1.5 |
| 45 | 6 | 0.0106 | −0.2031 | 0.2356 | 1.5 |
| ... | ... | ... | ... | ... | ... |
| ... | ... | ... | ... | ... | ... |
| 420 | 3 | 0.0836 | −1.9 | 0.1006 | 1.5 |
| 421 | 8 | 0.0428 | −0.9671 | 0.783 | 1.5 |
| 422 | 3 | 0.0359 | −0.7857 | 0.1702 | 1.5 |
| 423 | 8 | 0.0127 | −0.2766 | 0.1719 | 1.5 |
| 424 | 6 | 0.0178 | −0.3857 | 0.1636 | 1.5 |
| 425 | 6 | 0.0177 | −0.3685 | 0.1829 | 1.5 |
| 426 | 18 | 0.0146 | −0.3172 | 0.3871 | 1.5 |
| 427 | 8 | 0.0017 | −0.012 | 0.1788 | 1.5 |
| 428 | 4 | 0.009 | −0.1489 | 0.1341 | 1.5 |
| 429 | 9 | −0.0059 | 0.1469 | 0.1616 | 1.5 |
| 430 | 13 | −0.0046 | 0.116 | 0.191 | 1.5 |
| 431 | 9 | 0.0039 | −0.0532 | 0.1369 | 1.5 |
| 432 | 9 | 0.0027 | −0.0287 | 0.1109 | 1.5 |
| 433 | 3 | 0.0857 | −1.5 | 0.0952 | 1.5 |
| 434 | 9 | 0.0102 | −0.1661 | 0.1197 | 1.5 |
| 435 | 9 | 0.0075 | −0.114 | 0.107 | 1.5 |
| 436 | 5 | 0.029 | −0.485 | 0.1446 | 1.5 |
| 437 | 4 | 0.0476 | −0.784 | 0.2163 | 1.5 |
| 438 | 9 | 0.0122 | −0.1966 | 0.1054 | 1.5 |
| 439 | 4 | 0.1626 | −2.6824 | 0.1248 | 1.5 |
| 440 | 20 | 0.0072 | −0.1278 | 0.1916 | 1.5 |
| 441 | 19 | 0.0084 | −0.1502 | 0.2016 | 1.5 |
| 442 | 17 | 0.0024 | −0.0479 | 0.2369 | 1.5 |
| 443 | 7 | −0.0153 | 0.2236 | 0.2687 | 1.5 |
| 444 | 3 | 0.0054 | −0.2188 | 0.3887 | 1.5 |
| 445 | 16 | −0.0076 | 0.1177 | 0.2528 | 1.5 |

Table 24 shows the parameter estimates of $\hat{m}_k$, $\alpha_{\hat{m}_k,k}$, $\beta_{\hat{m}_k,k}$, $\sigma_{\hat{m}_k,k}$, $\gamma_{\hat{m}_k,k}$ in the model (75) for U.S. Treasury Bill Yield Interest Rate data. As noted before, the range of the $\epsilon$-best sub-optimal local admissible sample size $\hat{m}_k$ for any time $t_k \in [21,45] \cup [420,445]$ is $2 \leq \hat{m}_k \leq 20$. We also draw the similar conclusions (a) to (e) as outlined in Remark 20.

Parameter Estimates of (75) Using OCBGMM Methods.

Following Remark 12, we define the average $\bar{\alpha}$, $\bar{\beta}$, $\bar{\sigma}$, and $\bar{\gamma}$ by $$\begin{cases} \bar{\alpha} = \frac{1}{N} \sum_{k=1}^{N} \alpha_{\hat{m}_k,k}, \\ \bar{\beta} = \frac{1}{N} \sum_{k=1}^{N} \beta_{\hat{m}_k,k}, \\ \bar{\sigma} = \frac{1}{N} \sum_{k=1}^{N} \sigma_{\hat{m}_k,k}, \\ \bar{\gamma} = \frac{1}{N} \sum_{k=1}^{N} \gamma_{\hat{m}_k,k}, \end{cases} \quad (80)$$

where the parameters $\alpha_{\hat{m}_k,k}$, $\beta_{\hat{m}_k,k}$, $\sigma_{\hat{m}_k,k}$, $\gamma_{\hat{m}_k,k}$ are each estimated in Table 25 at time $t_k$ using LLGMM method.

Imitating the argument used in Subsection 6.3, the parameters and state are also estimated. These parameter estimates are shown in the row of AGMM approach in Table 25. We also estimate the parameters in (75) by following both the GMM-algebraic and GMM-analytic frame-work. Similarly, the parameter estimates (75) are determined under the IRGMM-algebraic and IRGMM-analytic approaches. These parameter estimates are recorded in rows of GMM-algebraic, GMM-analytic, IRGMM-algebraic, and IRGMM-analytic approaches, respectively, in Table 25.

Comparison of Goodness-of-Fit Measures.

In order to statistically compare the different estimation techniques we estimate the statistics RAMSE, AMAD, and AMB defined in (69). The goodness-of-fit measures are computed using S=100 pseudo-data sets of the same sample size, and the real data set, N=487 months. The t-statistics of each parameter estimate is in parenthesis, the smallest value of RAMSE for all method is italicized. The goodness-of-fit measures RAMSE, AMAD and AMB are recorded under the columns 6, 7, and 8 respectively.

TABLE 25

Comparison of parameter estimates of model (75) and the goodness-of-fit measures RAMSE, AMAD, and AMB under the usage of GMM-Algebraic, GMM-Analytic, IRGMM-Algebraic, IRGMM-Analytic, AGMM, and LLGMM methods.

| Method | $\alpha$ | $\beta$ | $\sigma$ | $\gamma$ | $\widehat{RAMSE}$ | $\widehat{AMAD}$ | $\widehat{AMB}$ |
|---|---|---|---|---|---|---|---|
| GMM-Algebraic | 0.0017 (1.53) | −0.0308 (−1.33) | 0.4032 (1.55) | 1.5309 (3.21) | 0.0424 | 0.0098 | 0.0195 |
| GMM-Analytic | 0.0009 (1.06) | −0.0153 (−0.90) | 0.0184 (1.25) | 0.4981 (1.73) | 0.0315 | 0.0161 | 0.0190 |
| IRGMM-Algebraic | 0.0020 (0.32) | −0.0410 (−0.21) | 0.207 (0.25) | 1.3031 (1.02) | 0.03186 | 0.00843 | 0.01972 |
| IRGMM-Analytic | 0.0084 (0.44) | −0.1436 (−0.40) | 0.1075 (0.22) | 1.3592 (1.01) | 0.0278 | 0.0028 | 0.01968 |
| AGMM | 0.0084 (0.41) | −0.1436 (−0.33) | 0.1075 (0.25) | 1.3592 (0.98) | 0.0288 | 0.0047 | 0.0207 |
| LLGMM | | | | | 0.0027* | 0.0146 | 0.0178 |

The LLGMM estimates are derived using initial delay r=20, p=2 and $\epsilon$=0.001. Among these stated methods, the LLGMM method generates the smallest RAMSE value. In fact, the RAMSE value is smaller than the one tenth of any other RAMSE values. Further, second, third and fourth smaller RAMSE values are due to the IRGMM-Analytic, AGMM and GMM-Analytic methods, respectively. This exhibits the superiority of the LLGMM method over all other methods. We further observe that the LLGMM approach yields the smallest AMB in comparison with the OCBGMM approaches. The GMM-Analytic, IRGMM-Analytic and IRGMM-Algebraic rank the second, third and fourth smaller values, respectively. The high value of AMAD for the LLGMM method signifies that the LLGMM captures the influence of random environmental fluctuations on the dynamic of interest rate process. We further note that the first, second, third, and fourth smaller AMB values are due to the GMM-Analytic, LLGMM, IRGMM-Algebraic, and GMM-Algebraic methods, respectively. Again, from Remark 23, the smallest RAMSE, higher AMAD, and smallest AMB value under the LLGMM method exhibit the superior performance under the three goodness-of-fit measures. We also notice that the performance of stochastic calculus based-OCPV-Analytic methods, namely, GMM-Analytic, IRGMM-Analytic and AGMM is better than the performance of OCPV-Algebraic based, GMM-Algebraic, and IRGMM-Algebraic approaches. In short, this suggests that the OCPV-Analytic based GMM methods are more superior than the OCPV-Algebraic based GMM methods.

TABLE 26

Parameter estimates and goodness of fit tests for one month risk free rates for periods June 1964-December 1981 and January 1982-December 2004.

| Orthogonality Condition | June 1964-December 1981 $\widehat{RAMS}E$ | January 1982-December 2004 $\widehat{RAMS}E$ |
|---|---|---|
| GMM-Algebraic | 0.0468 | 0.0377 |
| GMM-Analytic | 0.0315 | 0.0347 |
| IRGMM-Algebraic | 0.0307 | 0.0326 |
| IRGMM-Analytic | 0.0200 | 0.0215 |
| LLCIMM | 0.0030* | 0.0017* |

Table 26 shows the goodness-of-fit measures RAMSE using GMM-Algebraic, GMM-Analytic, IRGMM-Algebraic, IRGMM-Analytic, and LLGMM method for two separate sub-periods: 06/1964-12/1981 and 01/1982-12/2004. Among all methods, the LLGMM method generates the smallest RAMSE value for each sub-period. Further, the goodness-of-fit measure RAMSE regarding the LLGMM method is less than the one sixth, and one twelfth of any other RAMSE value, respectively. The IRGMM-Analytic, IRGMM-Algebraic, GMM-Analytic, and GMM-Algebraic methods are in second, third, fourth and fifth place.

Comparative Analysis of Forecasting with 95% Confidence Intervals.

Using data set June 1964 to December 1989, the parameters of model (75) are estimated. Using these parameter estimates, we forecasted the monthly interest rate for Jan. 1, 1990 to Dec. 31, 2004.

TABLE 27

Parameter estimates in (75) in the context of the data from June 1964 to December 1989.

| Method | α | β | σ | γ |
|---|---|---|---|---|
| GMM-Algebraic | 0.0033 | −0.051 | 0.4121 | 1.5311 |
| GMM-Analytic | 0.0009 | −0.0155 | 0.0197 | 0.4854 |
| IRGMM-Algebraic | 0.0023 | −0.0421 | 0.3230 | 1.3112 |
| IRGMM-Analytic | 0.0084 | −0.1436 | 0.1073 | 1.3641 |
| AGMM | 0.01.54 | −0.2497 | 0.2949 | 1.4414 |

7.3 Comparisons of LLGMM Method with Existing and Newly Introduced OCBGMM Methods Using Energy Commodity Stochastic Model Using the stochastic dynamic model in (27) of energy commodity represented by the stochastic differential equation $$dy = ay(\mu - y)dt + \sigma(t, y_t)y dW(t), y(t_0) = y_0, \tag{81}$$

the orthogonality condition parameter vector (OCPV) is described in (30) in Remark 9.

Based on a discretized scheme using the econometric specification, the orthogonality condition parameter vector in the context of algebraic manipulation is as:

$$\begin{cases} y_t - y_{t-1} - ay_{t-1}(\mu - y_{t-1})\Delta t \\ y_{t-1}(y_t - y_{t-1} - ay_{t-1}(\mu - y_{t-1})\Delta t) \\ (y_t - y_{t-1} - ay_{t-1}(\mu - y_{t-1})\Delta t)^2 - \sigma^2 y_{t-1}^2 \end{cases} \tag{82}$$

The goodness-of-fit measures are computed using pseudo-data sets of the same sample size as the real data set: (i) N=1184 days for natural gas data, (ii) N=4165 days for crude oil data, (iii) N=3470 for coal data, and (iv) N=438 weeks for ethanol data. The smallest value of RAMSE for all method is italicized.

TABLE 28

Parameter estimates of model (75) and the goodness-of-fit measures RAMSE, AMAD, and AMB using GMM-Algebraic, GMM-Analytic, IRGMM-Algebraic, IRGMM-Analytic, AGMM and LLGMM methods for natural gas data

| Method | a | μ | σ² | $\widehat{RAMS}E$ | $\widehat{AMAD}$ | $\widehat{AMB}$ |
|---|---|---|---|---|---|---|
| GMM-Algebraic | 0.0023 | 5.3312 | 0.0019 | 1.5119 | 0.0663 | 1.1488 |
| GMM-Analytic | 0.0018 | 5.4106 | 0.0015 | 1.5014 | 0.0538 | 1.1677 |
| IRGMM-Algebraic | 0.2000 | 4.4996 | 0.0010 | 1.4985 | 0.0050 | 1.2299 |
| IRGMM-Analytic | 0.1998 | 4.4917 | 0.0011 | 1.4901 | 0.0044 | 1.2329 |
| AGMM | 0.1867 | 4.5538 | 0.0013 | 1.4968 | 0.0068 | 1.2267 |
| LLGMM | | | | 0.0674* | 1.1318 | 1.1371 |

TABLE 29

Parameter estimates of model (75) and the goodness-of-fit measures RAMSE, AMAD, and AMB using GMM-Algebraic, GMM-Analytic, IRGMM-Algebraic, IRGMM-Analytic, AGMM and LLGMM methods for crude oil data

| Method | a | μ | σ² | $\widehat{RAMS}E$ | $\widehat{AMAD}$ | $\widehat{AMB}$ |
|---|---|---|---|---|---|---|
| GMM-Algebraic | 0.0023 | 54.4847 | 0.0005 | 39.2853 | 0.3577 | 29.1587 |
| GMM-Analytic | 0.0021 | 51.2145 | 0.0006 | 38.8007 | 0.5181 | 28.7414 |
| IRGMM-Algebraic | 0.0000 | 88.5951 | 0.0005 | 30.7511 | 0.0920 | 27.5791 |
| IRGMM-Analytic | 0.0021 | 51.2195 | 0.0005 | 28.9172 | 0.2496 | 27.3564 |
| AGMM | 0.0215 | 54.0307 | 0.0005 | 30.776 | 0.0857 | 27.3050 |
| LLGMM | | | | 0.4625* | 24.501 | 27.2707 |

TABLE 30

Parameter estimates of model (75) and the goodness-of-fit measures RAMSE, AMAD, and AMB using GMM-Algebraic, GMM-Analytic, IRGMM-Algebraic, IRGMM-Analytic, AGMM and LLGMM methods for coal data

| Method | a | μ | σ² | $\widehat{RAMSE}$ | $\widehat{AMAD}$ | $\widehat{AMB}$ |
|---|---|---|---|---|---|---|
| GMM-Algebraic | 0.0000 | 94.4847 | 0.0006 | 22.6866 | 0.2015 | 16.3444 |
| GMM-Analytic | 0.0000 | 94.4446 | 0.0006 | 21.6564 | 0.2121 | 16.3264 |
| IRGMM-Algebraic | 0.0027 | 34.4838 | 0.0013 | 17.6894 | 0.3438 | 13.4981 |
| IRGMM-Analytic | 0.0021 | 23.1151 | 0.0005 | 17.6869 | 0.3448 | 13.4989 |

TABLE 30-continued

Parameter estimates of model (75) and the goodness-of-fit measures RAMSE, AMAD, and AMB using GMM-Algebraic, GMM-Analytic, IRGMM-Algebraic, IRGMM-Analytic, AGMM and LLGMM methods for coal data

| Method | a | μ | σ² | $\widehat{RAMSE}$ | $\widehat{AMAD}$ | $\widehat{AMB}$ |
|---|---|---|---|---|---|---|
| AGMM | 0.0464 | 27.0567 | 0.0014 | 17.7620 | 0.0833 | 13.106 |
| LLGMM | | | | 0.4794* | 9.4009 | 12.8370 |

TABLE 31

Parameter estimates of model (75) and the goodness-of-fit measures RAMSE, AMAD, and AMB using GMM-Algebraic, GMM-Analytic, IRGMM-Algebraic, IRGMM-Analytic, AGMM and LLGMM methods for ethanol

| Method | a | μ | σ² | $\widehat{RAMSE}$ | $\widehat{AMAD}$ | $\widehat{AMB}$ |
|---|---|---|---|---|---|---|
| GMM-Algebraic | 0.0000 | 94.4847 | 0.0006 | 22.6866 | 0.2015 | 16.3444 |
| GMM-Analytic | 0.0000 | 94.4446 | 0.0006 | 21.6564 | 0.2121 | 16.3264 |
| IRGMM-Algebraic | 0.0014 | 3.4506 | 0.0026 | 0.5844 | 0.0322 | 0.4346 |
| IRGMM-Analytic | 0.0015 | 3.4506 | 0.0026 | 0.5813 | 0.0336 | 0.4303 |
| AGMM | 0.3167 | 2.166 | 0.0018 | 0.4356 | 0.0035 | 0.3579 |
| LLGMM | | | | 0.0375* | 0.3213 | 0.3566 |

Tables 28, 29, 30, and 31 show a comparison parameter estimates of model (75) and the goodness-of-fit measures RAMSE, AMAD, and AMB using GMM-Algebraic, GMM-Analytic, IRGMM-Algebraic, IRGMM-Analytic, AGMM and LLGMM methods for the daily natural gas data, daily crude oil data, daily coal data, and weekly ethanol data, respectively. The LLGMM estimates are derived using initial delay r=20, p=2 and ϵ=0.001. Among all methods under study, the LLGMM method generates the smallest RAMSE value. In fact, the RAMSE value is smaller than the 1/22, 1/62, 1/36, and 1/10 of any other RAMSE values regarding the natural gas, crude oil, coal and ethanol, respectively. This exhibits the superiority of the LLGMM method over all other methods. We further observe that the LLGMM approach yields the smallest AMB and highest AMAD value regarding the natural gas, crude oil, coal and ethanol. The high value of AMAD for the LLGMM method signifies that the LLGMM captures the influence of random environmental fluctuations on the dynamic of energy commodity process. From Remark 23, the smallest RAMSE, highest AMAD, and smallest AMB value under the LLGMM method exhibit the superior performance under the three goodness-of-fit measures.

Ranking of Methods Under Goodness of Fit Measure.

TABLE 32

Ranking of natural gas, crude oil, coal, and ethanol under three statistical measures
RANK OF METHODS UNDER GOODNESS OF FIT MEASURE

| | Natural gas | | | Crude oil | | | Coal | | | Ethanol | | |
|---|---|---|---|---|---|---|---|---|---|---|---|---|
| Method | $\widehat{RAMSE}$ | $\widehat{AMAD}$ | $\widehat{AMB}$ | $\widehat{RAMSE}$ | $\widehat{AMAD}$ | $\widehat{AMB}$ | $\widehat{RAMSE}$ | $\widehat{AMAD}$ | $\widehat{AMB}$ | $\widehat{RAMSE}$ | $\widehat{AMAD}$ | $\widehat{AMB}$ |
| GMM-Algebraic | 6 | 2 | 2 | 6 | 3 | 6 | 6 | 5 | 6 | 6 | 3 | 6 |
| GMM-Analytic | 5 | 3 | 3 | 5 | 2 | 5 | 5 | 4 | 5 | 5 | 2 | 5 |
| IRGMM-Algebraic | 4 | 5 | 5 | 3 | 5 | 4 | 4 | 3 | 3 | 4 | 5 | 4 |
| IRGMM-Analytic | 2 | 6 | 6 | 2 | 4 | 3 | 3 | 2 | 4 | 3 | 4 | 3 |
| AGMM | 3 | 4 | 4 | 4 | 6 | 2 | 2 | 6 | 2 | 2 | 6 | 2 |
| LLGMM | 1 | 1 | 1 | 1 | 1 | 1 | 1 | 1 | 1 | 1 | 1 | 1 |

Remark 27.

The ranking of LLGMM is top one in all three goodness-of-fit statistical measures for all four energy commodity data sets. Further, one of the IRGMM-Analytic and AGMM is ranked either as top 2nd or 3rd under RAMSE measure. This exhibits the influence of the usage of stochastic calculus based orthogonality condition parameter vectors (OCPV-Analytic).

7.4 Comparison of Goodness of Fit Measures of Model (45) with (75) Using LLGMM Method As stated in Remark 26, we compare the Goodness of fit Measures RAMSE, AMAD, and AMB using the U.S. Treasury Bill Interest Rate data and the LLGMM applied to the model validation problems of two proposed continuous-time dynamic models of U.S. Treasury Bill Interest Rate process described by (45) and (75). The LLGMM state estimates of (45) and (75) are computed under the same initial delay r=20, p=2, and ϵ=0.001. The results are recorded in the following table.

TABLE 33

Comparison of goodness of fit measure of model (45) with model (75)

| LLGMM | $\widehat{RAMSE}$ | $\widehat{AMAD}$ | $\widehat{AMB}$ |
|---|---|---|---|
| Model (45) | 0.0024* | 0.0145 | 0.0178 |
| Model (75) | 0.0027 | 0.0146 | (10178 |

Table 33 shows that the goodness-of-fit measures RAMSE, AMAD, and AMB of the LLGMM method using both models (75) and (45) are very close. Model (45) appears to have the least RAMSE value. This shows that the LLGMM result performs better using model (45) than using model (75) since it has a lower root mean square error. The AMAD value using (75) is larger than the value using (45). This suggests that the influence of the random environmental fluctuations on state dynamic model (75) is higher than using the model (45). The AMB value derived using both models appeared to be the same, indicating that both model give the same average median bias estimates. Based on this statistical analysis, we conclude that (45) is most appropriate continuous-time stochastic dynamic model for the short-term riskless rate model which includes many well-known interest rate models.

8. Comparison of LLGMM with Existing Nonparametric Statistical Methods

In this section, we compare our LLGMM method with existing nonparametric methods. We consider the following existing nonparametric methods.

8.1 Nonparametric Estimation of Nonlinear Dynamics by Metric-Based Local Linear Approximation (LLA)

The LLA method assumes no functional form of a given model but estimates from experimental data by approximating the curve implied by the function by the tangent plane around the neighborhood of a tangent point. Suppose the state of interest $x_t$ at time t is differentiable with respect to t and satisfies $dx_t = f(x_t)dt$, where $f: \Re^k \to \Re$ is a smooth map, $x_t \in \Re^k$. The approximation of the curve $f(x_t)$ in a neighbourhood $U_\epsilon(x_0) = \{x: d(x, x_0) < \epsilon\}$ is defined by a tangent plane at $x_0$ $$y_r = f(x_0) + \sum_{i=1}^{k} \frac{\partial f}{\partial x_i}(x_0)(x_i - x_0),$$

where d is a metric on $\Re^k$. Allowing error in the equation and assigning a weight $w(x_t)$ to each error terms $\epsilon_t$, the method reduces to estimating parameters $$\beta_i = \frac{\partial f}{\partial x_i}(x_0), \, 1 = 1, 2, \ldots, k$$

in the equation $$w(t)y_t = \beta_0 \cdot w(x_t) + \sum_{i=1}^{k} \beta_i \cdot w(x_t)(x_{t,i} - x_{0,i}).$$

Applying the standard linear regression approach, the least square estimate $\hat{\beta}$ is given by $$\hat{\beta} = (\tilde{X}^T \tilde{X})^{-1} \tilde{X}^T \tilde{Y}, \quad (83)$$

where $$\tilde{x}_i = (w(x_{t_1})(x_{t_1,1} - x_{0,i}), \ldots, w(x_{t_n})(x_{t_n,i} - x_{0,i}))^T, \, i = 1, \ldots, k.$$
$$\tilde{w} = (w(x_{t_1}), \ldots, w(x_{t_n}))^T$$
$$\tilde{Y} = (w(x_{t_1})y_{t_1}, \ldots, w(x_{t_n})y_{t_n})^T$$
$$\tilde{X} = (\tilde{w}, \tilde{x}_1, \ldots, \tilde{x}_k).$$

Particularly, the trajectory $f(x_{t_i})$ is estimated by choosing $x_0 = x_{t_i}$, for each $i=1, 2, \ldots, n$, respectively. We use $d(x, x_0) = |x - x_0|$, where $|\cdot|$ is the standard Euclidean metric on $\Re^k$, and $w(x) = \phi(d(x, x_0))$, where $\phi(u) = K(u/\epsilon)$ and K is the Epanechnikov Kernel $K(x) = 0.75(1-x^2)_+$.

8.2 Risk Estimation and Adaptation after Coordinate Transformation (REACT) Method Given n pairs of observations $(x_1, Y_1), \ldots, (x_n, Y_n)$, the REACT method, the response variable Y is related to the covariate x (called a feature) by the equation $$Y_i = r(x_i) + \sigma \epsilon_i, \quad (84)$$

where $\epsilon_i \sim N(0, 1)$ are IID, and $x_i = i/n$, $i=1, 2, \ldots, n$. The function $r(x)$ is approximated using orthogonal cosine basis $\phi_i$, $i=1, 2, 3, \ldots$ of $[0,1]$ described by $$\phi_1(x) \equiv 1, \, \phi_j(x) = \sqrt{2}\cos((j-1)\pi x), j \geq 2. \quad (85)$$

The function $r(x)$, expanded as $$r(x) = \sum_{j=1}^{\infty} \theta_j \phi_j(x) \quad (86)$$

where $$\theta_j = \int_0^1 \phi_j(x) r(x) \, dx$$

is approximated. The function estimator $$\hat{r}(x) = \sum_{j=1}^{J} Z_j \phi_j(x)$$

where $$Z_j = \frac{1}{n} \sum_{i=1}^{n} Y_i \phi_j(x_i), \, j = 1, 2, \ldots, n$$

and $\hat{J}$ is found so that the risk estimator $$\hat{R}(J) = \frac{J \hat{\sigma}^2}{n} + \sum_{j=J+1}^{n} \left( Z_j^2 - \frac{\hat{\sigma}^2}{n} \right)$$

is minimized, $\hat{\sigma}^2$ is the estimator of variance of $Z_j$.

8.3 Exponential Moving Average Method (EMA)

The EMA for an observation $y_t$ at time t may be calculated recursively as $$S_t = \alpha y_t + (1-\alpha) S_{t-1}, \, t=1,2,3,\ldots,n, \quad (87)$$

where $0 < \alpha \leq 1$ is a constant that determines the depth of memory of $S_t$.

8.4 Goodness-of-Fit Measures for the LLA, REACT, and EMA Methods

In this subsection, we show the goodness-of-fit measures for the LLA, REACT, and EMA methods. We use $\hat{J} = 183$ for the REACT method and $\alpha = 0.5$ for the EMA method.

TABLE 34

Goodness-of-fit measures for the LLA, REACT, and EMA methods.

| Goodness of-fit Measure | Natural gas | Crude oil | Coal | Ethanol |
|---|---|---|---|---|
| LLGMM method | | | | |
| $\widehat{RAMS}E$ | 0.0674 | 0.4625 | 0.4794 | 0.0375 |
| $\widehat{AMAD}$ | 1.1318 | 24.5010 | 9.4009 | 0.3213 |
| $\widehat{AMB}$ | 1.1371 | 27.2707 | 12.8370 | 0.3566 |
| LLA Method | | | | |
| $\widehat{RAMS}E$ | 0.3114 | 1.9163 | 2.1645 | 0.2082 |
| $\widehat{AMAD}$ | 1.1406 | 24.3266 | 9.4511 | 0.3290 |
| $\widehat{AMB}$ | 1.2375 | 27.2713 | 12.8388 | 0.3677 |
| REACT method | | | | |
| $\widehat{RAMS}E$ | 0.1895 | 2.0377 | 2.0162 | 0.0775 |
| $\widehat{AMAD}$ | 1.1779 | 24.6967 | 9.3791 | 0.3291 |
| $\widehat{AMB}$ | 1.12352 | 27.2711 | 12.8369 | 0.3566 |
| EMA method | | | | |
| $\widehat{RAMS}E$ | 0.1222 | 0.7845 | 0.8233 | 0.0682 |
| $\widehat{AMAD}$ | 1.1336 | 24.5858 | 9.4183 | 0.3159 |
| $\widehat{AMB}$ | 1.2352 | 27.2710 | 12.8370 | 0.3567 |

Comparison of the results derived using these non-parametric methods with the LLGMM method show that the results derived using the LLGMM method is far better than results of the nonparametric methods.

Figure 8:
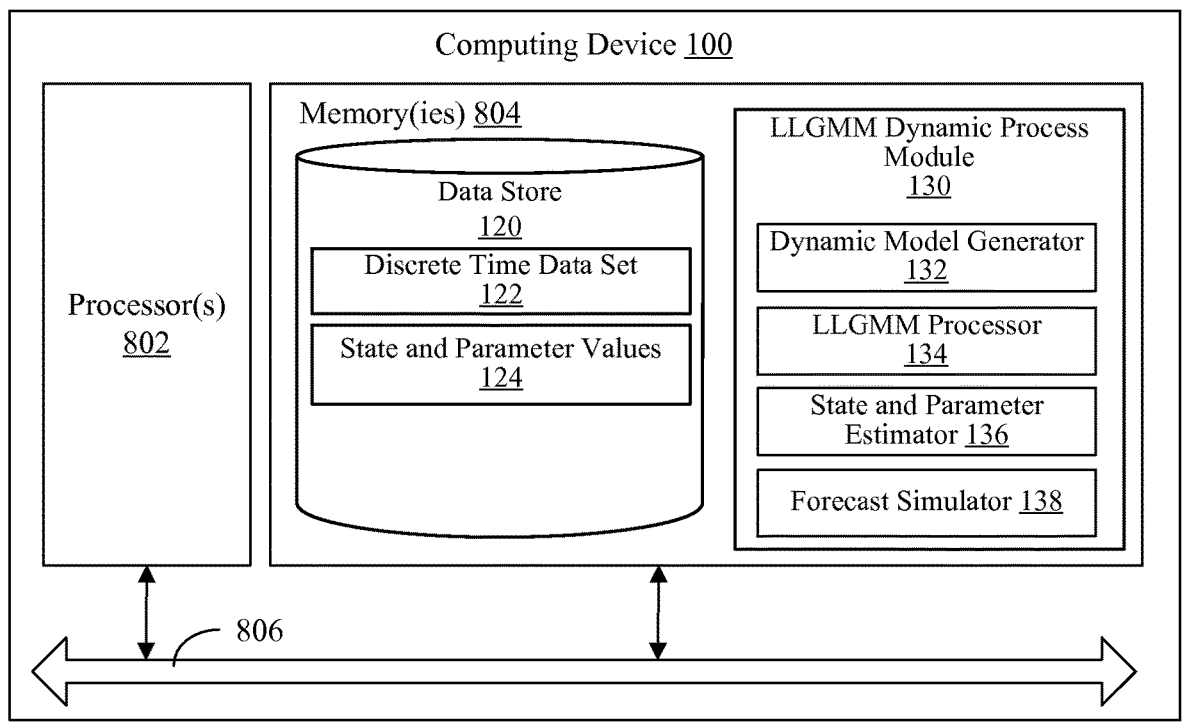
FIG. 8 illustrates an example schematic block diagram of the computing device 100 shown in FIG. 1 according to various embodiments described herein.

FIG. 8 illustrates an example schematic block diagram of the computing device 100 shown in FIG. 1 according to various embodiments described herein. The computing device 100 includes at least one processing system, for example, having a processor 802 and a memory 804, both of which are electrically and communicatively coupled to a local interface 806. The local interface 806 can be embodied as a data bus with an accompanying address/control bus or other addressing, control, and/or command lines.

In various embodiments, the memory 804 stores data and software or executable-code components executable by the processor 802. For example, the memory 804 can store executable-code components associated with the visualization engine 130 for execution by the processor 802. The memory 804 can also store data such as that stored in the device data store 120, among other data.

It is noted that the memory 804 can store other executable-code components for execution by the processor 802. For example, an operating system can be stored in the memory 804 for execution by the processor 802. Where any component discussed herein is implemented in the form of software, any one of a number of programming languages can be employed such as, for example, C, C++, C #, Objective C, JAVA®, JAVASCRIPT®, Perl, PHP, VISUAL BASIC®, PYTHON®, RUBY, FLASH®, or other programming languages.

As discussed above, in various embodiments, the memory 804 stores software for execution by the processor 802. In this respect, the terms "executable" or "for execution" refer to software forms that can ultimately be run or executed by the processor 802, whether in source, object, machine, or other form. Examples of executable programs include, for example, a compiled program that can be translated into a machine code format and loaded into a random access portion of the memory 804 and executed by the processor 802, source code that can be expressed in an object code format and loaded into a random access portion of the memory 804 and executed by the processor 802, or source code that can be interpreted by another executable program to generate instructions in a random access portion of the memory 804 and executed by the processor 802, etc.

An executable program can be stored in any portion or component of the memory 804 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 804 can include both volatile and nonvolatile memory and data storage components. Volatile components are those that do not retain data values upon loss of power. Nonvolatile components are those that retain data upon a loss of power. Thus, the memory 804 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 802 can be embodied as one or more processors 802 and the memory 804 can be embodied as one or more memories 804 that operate in parallel, respectively, or in combination. Thus, the local interface 806 facilitates communication between any two of the multiple processors 802, between any processor 802 and any of the memories 804, or between any two of the memories 804, etc. The local interface 806 can include additional systems designed to coordinate this communication, including, for example, a load balancer that performs load balancing.

As discussed above, the LLGMM dynamic process module 130 can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIGS. 2 and 3 are representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 802. The machine code can be converted from the source code, etc. Further, each block can represent, or be connected with, a circuit or a number of interconnected circuits to implement a certain logical function or process step.

Although the flowchart or process diagrams in FIGS. 2 and 3 illustrate a specific order, it is understood that the order can differ from that which is depicted. For example, an order of execution of two or more blocks can be scrambled relative to the order shown. Also, two or more blocks shown in succession in FIGS. 2 and 3 can be executed concurrently or with partial concurrence. Further, in some embodiments, one or more of the blocks shown in FIGS. 2 and 3 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the LLGMM dynamic process module 130 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIGS. 2 and 3. In the context of the present disclosure, a "non-transitory computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phases are not generally intended to, and should not, imply that certain embodiments require at least one of either X, Y, or Z to be present, but not, for example, one X and one Y. Further, such phases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A local lagged adapted generalized method of moments (LLGMM) process to simulate a forecast using measured data, the process to simulate comprising:

developing a stochastic model of a continuous time dynamic process;

obtaining a discrete time data set measured for at least one commodity as past state information of the continuous time dynamic process over a time interval;

generating a discrete time interconnected dynamic model of local sample mean and variance statistic processes (DTIDMLSMVSP) based on the stochastic model of the continuous time dynamic process and the discrete time data set measured for at least one commodity;

calculating, by at least one computer, a plurality of admissible parameter estimates for the stochastic model of the continuous time dynamic process, to forecast a price of the at least one commodity, using the DTIDMLSMVSP;

for each of the plurality of admissible parameter estimates, calculating, by the at least one computer, a state value of the stochastic model of the continuous time dynamic process to gather a plurality of state values of the stochastic model of the continuous time dynamic process; and determining an optimal admissible parameter estimate among the plurality of admissible parameter estimates that results in a minimum error among the plurality of state values, wherein generating the DTIDMLSMVSP further comprises:

at each time point in a partition of the time interval, selecting, by the at least one computer, an $m_k$-point sub-partition of the partition, the $m_k$-point sub-partition having a local admissible lagged sample observation size based on an order of a model, a response delay associated with the continuous time dynamic process, and a sub-partition time observation index size; and for each $m_k$-point in each sub-partition, selecting, by the at least one computer, an $m_k$-local moving sequence in the sub-partition to gather an $m_k$-class of admissible restricted finite sequences.

2. The LLGMM process according to claim 1, wherein generating the DTIDMLSMVSP further comprises:

for each $m_k$-local moving sequence, calculating, by the at least one computer, an $m_k$-local average to generate an $m_k$-moving average process; and for each $m_k$-local moving sequence, calculating, by the at least one computer, an $m_k$-local variance to generate an $m_k$-local moving variance process.

3. The LLGMM process according to claim 2, wherein generating the DTIDMLSMVSP further comprises:

transforming the stochastic model of the continuous time dynamic process into a stochastic model of a discrete time dynamic process utilizing a discretization scheme; and developing a system of generalized method of moments equations from the stochastic model of the discrete time dynamic process.

4. The LLGMM process according to claim 2, further comprising identifying an optimal $m_k$-local moving sequence among the $m_k$-class of admissible restricted finite sequences based on the minimum error.

5. The LLGMM process according to claim 4, wherein determining the optimal admissible parameter estimate comprises:
identifying one $m_k$-local moving sequence among the m-class of admissible restricted finite sequences as the optimal $m_k$-local moving sequence when the one $m_k$-local moving sequence is associated with the minimum error; and
selecting a largest $m_k$-local moving sequence among the $m_k$-class of admissible restricted finite sequences as the optimal $m_k$-local moving sequence when more than one $m_k$-local moving sequence in the $m_k$-class of admissible restricted finite sequences is associated with the minimum error.

6. The LLGMM process according to claim 4, further comprising forecasting at least one future state value of the stochastic model of the continuous-time dynamic process using the optimal $m_k$-local moving sequence.

7. The LLGMM process according to claim 6, further comprising determining an interval of confidence associated with the at least one future state value.

8. A local lagged adapted generalized method of moments (LLGMM) system to simulate a forecast using measured data, comprising:
a memory that stores a discrete time data set measured for at least one commodity as past state information of a continuous time dynamic process over a time interval and computer readable instructions for an LLGMM process; and
at least one computing device coupled to the memory and configured, through the execution of the computer readable instructions for the LLGMM process, to:
generate a discrete time interconnected dynamic model of local sample mean and variance statistic processes (DTIDMLSMVSP) based on a stochastic model of a continuous time dynamic process and the discrete time data set measured for at least one commodity;
calculate a plurality of admissible parameter estimates for the stochastic model of the continuous time dynamic process, to forecast a price of the at least one commodity, using the DTIDMLSMVSP;
for each of the plurality of admissible parameter estimates, calculate a state value of the stochastic model of the continuous time dynamic process to gather a plurality of state values of the stochastic model of the continuous time dynamic process;
determine an optimal admissible parameter estimate among the plurality of admissible parameter estimates that results in a minimum error among the plurality of state values;
at each time point in a partition of the time interval, select an $m_k$-point sub-partition of the partition, the $m_k$-point sub-partition having a local admissible lagged sample observation size based on an order of a model, a response delay associated with the continuous time dynamic process, and a sub-partition time observation index size; and
for each $m_k$-point in each sub-partition, select an $m_k$-local moving sequence in the sub-partition to gather an $m_k$-class of admissible restricted finite sequences.

9. The LLGMM system according to claim 8, wherein the at least one computing device is further configured to:
for each $m_k$-local moving sequence, calculate an mA-local average to generate an $m_k$-moving average process; and
for each $m_k$-local moving sequence, calculate an mA-local variance to generate an $m_k$-local moving variance process.

10. The LLGMM system according to claim 9, wherein the at least one computing device is further configured to:
transform the stochastic model of the continuous time dynamic process into a stochastic model of a discrete time dynamic process utilizing a discretization scheme; and
develop a system of generalized method of moments equations from the stochastic model of a discrete time dynamic process.

11. The LLGMM system according to claim 9, wherein the at least one computing device is further configured to identify an optimal $m_k$-local moving sequence among the $m_k$-class of admissible restricted finite sequences based on the minimum error.

12. The LLGMM system according to claim 11, wherein the at least one computing device is further configured to:
identify one $m_k$-local moving sequence among the $m_k$-class of admissible restricted finite sequences as the optimal $m_k$-local moving sequence when the one $m_k$-local moving sequence is associated with the minimum error; and
select a largest $m_k$-local moving sequence among the m-class of admissible restricted finite sequences as the optimal $m_k$-local moving sequence when more than one $m_k$-local moving sequence in the $m_k$-class of admissible restricted finite sequences is associated with the minimum error.

13. The LLGMM process according to claim 11, wherein the at least one computing device is further configured to forecast at least one future state value of the stochastic model of the continuous-time dynamic process using the optimal $m_k$-local moving sequence.

14. A non-transitory computer readable medium including computer readable instructions stored thereon that, when executed by at least one computing device, direct the at least one computing device to perform a local lagged adapted generalized method of moments (LLGMM) process to simulate a forecast using measured data, the process to simulate comprising:
obtaining a discrete time data set measured for at least one commodity as past state information of a continuous time dynamic process over a time interval;
generating a discrete time interconnected dynamic model of local sample mean and variance statistic processes (DTIDMLSMVSP) based on a stochastic model of a continuous time dynamic process and the discrete time data set measured for at least one commodity;
calculating, by the at least one computing device, a plurality of admissible parameter estimates for the stochastic model of the continuous time dynamic process, to forecast a price of the at least one commodity, using the DTIDMLSMVSP;
for each of the plurality of admissible parameter estimates, calculating, by the at least one computer, a state value of the stochastic model of the continuous time dynamic process to gather a plurality of state values of the stochastic model of the continuous time dynamic process; and determining an optimal admissible parameter estimate among the plurality of admissible parameter estimates that results in a minimum error among the plurality of state values, wherein generating the DTIDMLSMVSP further comprises:

at each time point in a partition of the time interval, selecting, by at least one computer, an $m_k$-point sub-partition of the partition, the $m_k$-point sub-partition having a local admissible lagged sample observation size based on an order of a model, a response delay associated with the continuous time dynamic process, and a sub-partition time observation index size;

for each $m_k$-point in each sub-partition, selecting, by the at least one computer, an $m_k$-local moving sequence in the sub-partition to gather an $m_k$-class of admissible restricted finite sequences;

for each $m_k$-local moving sequence, calculating, by the at least one computer, an $m_k$-local average to generate an $m_k$-moving average process; and for each $m_k$-local moving sequence, calculating, by the at least one computer, an $m_k$-local variance to generate an $m_k$-local moving variance process.

* * * * *